(12) United States Patent
Takada

(10) Patent No.: US 8,629,936 B2
(45) Date of Patent: Jan. 14, 2014

(54) MOVING REGION DETECTION DEVICE

(75) Inventor: Jun Takada, Tokyo (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 12/864,053

(22) PCT Filed: Feb. 13, 2009

(86) PCT No.: PCT/JP2009/052398
§ 371 (c)(1),
(2), (4) Date: Jul. 22, 2010

(87) PCT Pub. No.: WO2009/102010
PCT Pub. Date: Aug. 20, 2009

(65) Prior Publication Data
US 2010/0315547 A1  Dec. 16, 2010

(30) Foreign Application Priority Data

Feb. 14, 2008  (JP) ................................ 2008-033042

(51) Int. Cl.
*H04N 7/50* (2006.01)
*H04N 7/24* (2011.01)

(52) U.S. Cl.
USPC ...................................... 348/416.1; 375/240

(58) Field of Classification Search
USPC ....................................................... 375/240
See application file for complete search history.

(56) References Cited

U.S. PATENT DOCUMENTS 5,552,823 A * 9/1996 Kageyama ..................... 348/155
6,983,020 B2 * 1/2006 Christiansen ............ 375/240.16

FOREIGN PATENT DOCUMENTS

| JP | 2003173179 A | 6/2003 |
| JP | 2004503862 A | 2/2004 |
| JP | 2004129099 A | 4/2004 |
| JP | 2005522083 A | 7/2005 |

OTHER PUBLICATIONS

International Search Report for PCT/JP2009/052398 mailed May 19, 2009.

* cited by examiner

*Primary Examiner* — Sath V Perungavoor
*Assistant Examiner* — Howard D Brown, Jr.

(57) ABSTRACT

To provide a moving region detection device capable of rapidly and accurately detecting a main moving region from plot data on a computer screen. A moving region detection unit (122) detects, as a moving region, an identical or similar image region which exist in both a previous frame and a current frame and whose position on a screen changes. Specifically, an initial candidate decision unit (301) decides an initial candidate for a moving region. Next, a moving region decision unit (302) decides a moving region for use in motion compensation, from among the initial candidate for the moving region determined by the initial candidate decision unit (301) and another at least one candidate for the moving region obtained by changing the size of the moving region of the initial candidate.

24 Claims, 39 Drawing Sheets

| HASH VALUE | APPEARANCE FREQUENCY | FINAL APPEARANCE COORDINATE | PIXEL VALUE |
|---|---|---|---|
| 0 | 0 | — | — |
| 1 | 0 | — | — |
| 2 | 0 | — | — |
| 3 | 0 | — | — |
| 4 | 1 | (5, 1) | 127, 128, 127 |
| 5 | 0 | — | — |
| ⋮ | ⋮ | ⋮ | ⋮ |
| 2047 | 0 | — | — |

| HASH VALUE | APPEARANCE FREQUENCY | FINAL APPEARANCE COORDINATE | PIXEL VALUE |
|---|---|---|---|
| 0 | 0 | — | — |
| 1 | 0 | — | — |
| 2 | 0 | — | — |
| 3 | 0 | — | — |
| 4 | 1 | (5, 8) | 125, 123, 129 |
| 5 | 0 | — | — |
| ⋮ | ⋮ | ⋮ | ⋮ |
| 2047 | 0 | — | — |

Fig. 8

| ESTIMATED VALUE OF MOTION VECTOR = (0, −7) | |
|---|---|
| FEATURE POINT PAIR | |
| PREVIOUS FRAME | CURRENT FRAME |
| (5, 8) | (5, 1) |
| (10, 9) | (10, 2) |
| (18, 15) | (18, 8) |
| ⋮ | ⋮ |

Fig. 9

MOVING REGION DETECTION DEVICE

This application is the National Phase of PCT/JP2009/052398, filed Feb. 13, 2009, which is based upon and claims the benefit of priority from Japanese patent application No. 2008-033042, filed on Feb. 14, 2008, the disclosure of which is incorporated herein in its entirety by reference.

TECHNICAL FIELD

The present invention relates to a moving region detection device, and more particularly, to a moving region detection device that detects a main moving region from plot data on a computer screen.

BACKGROUND ART

In recent years, thin client systems have been introduced in which all applications to be received, output, and displayed on a terminal device are executed by a server device and all files generated in association with this process are managed also by the server device, so as to prevent leakage of information from a terminal device of a computer and facilitate application management on the terminal side, for example.

In such thin client systems, plot data of an application program to be executed by the server device is transferred to the terminal device on the client side via a network such as a LAN (Local Area Network), and is displayed on the screen of the terminal device. Accordingly, if the amount of plot data to be processed increases, or if the number of terminal devices connected to the server device increases, the load imposed on the server device to transfer the plot data to the terminal device increases. This causes a problem such as deterioration of a response time or a great limitation on the number of terminal devices to be connected.

In this regard, there is proposed a display control technique for plot data using software, in which only a rectangular plot region containing a plot data part plotted and updated within one screen is clipped, and is further compressed as needed and transferred, thereby reducing the amount of data associated with the transfer of plot data on the computer screen and alleviating the load imposed on the server device (e.g., see Patent Document 1). However, along with an increase in definition of plot data and remarkable improvement in monitor resolution, the amount of plot data to be processed on a computer screen has been increasing. For this reason, there is a demand for further reduction in processing load without deterioration of drawing quality.

[Patent Document 1] Published Japanese Translation of PCT International Publication for Patent Application, No. 2004-503862

[Patent Document 2] Japanese Unexamined Patent Application Publication No. 2004-129099

DISCLOSURE OF INVENTION

Technical Problem

In a moving picture coding system such as MPEG (Moving Picture Experts Group), motion compensation is performed using a motion vector indicating that a pixel block to be encoded resembles which position of a reference image, thereby reducing the amount of code to be transmitted. A method called full search method is generally used for detection of a motion vector and a moving region. In the full search method, a template block which is an image to be searched is compared with all search windows to be searched. In other words, detection of a motion vector and a moving region is performed in units of blocks of 8 pixels×8 pixels, for example. The comparison is made such that sums of absolute difference values of pixel values are sequentially calculated while search windows are scanned, and a motion relative to a location where the absolute difference value is minimum is detected. However, the full search method requires a considerable amount of calculation. Thus, there is also proposed a high-speed method in which search is initially performed roughly and broadly, and the search is narrowed down according to evaluation results, thereby performing the search with high precision (e.g., see Patent Document 2).

Also in the case of transferring plot data on a computer screen from a server device to a terminal device in a thin client system, a motion of an object such as a window is detected to carry out motion compensation. Therefore, a large reduction in the amount of transfer data can be expected. However, since a computer screen has a resolution much higher than a typical moving picture, a search of a motion vector in real time requires a high calculation load not only when the full search method is used but also when the high-speed method is used. Further, a computer screen has a large monochromatic region, and objects having the same shape, such as characters, are usually present at multiple locations within the screen. Therefore, performing a search in units of pixel blocks is likely to produce a local solution. This leads to a problem that a large number of different moving regions are detected even when a single window is moved, for example.

There is another problem that when a large object such as a window is moved, it is necessary to perform a process for obtaining an entire moving region by connecting a large number of moving regions detected in units of blocks.

An object of the present invention is to provide a moving region detection device capable of rapidly and accurately detecting a main moving region from plot data on a computer screen.

Technical Solution

A moving region detection device according to the present invention includes:

initial candidate decision means for deciding an initial candidate for detecting a moving region which is an identical or similar image region whose position changes between a current frame and a previous frame, the previous frame being a frame preceding the current frame;

moving region candidate generation means for generating another at least one candidate for a moving region by changing a size of the moving region of the initial candidate; and moving region decision means for deciding a moving region for use in motion compensation, from among the initial candidate for the moving region decided by the initial candidate decision means and the candidate for the moving region generated by the moving region candidate generation means.

Advantageous Effects

According to the present invention, it is possible to obtain a moving region detection device capable of rapidly and accurately detecting a main moving region from plot data on a computer screen.

BRIEF DESCRIPTION OF DRAWINGS

FIG. 8 is a diagram showing an example of a hash table for a previous frame used in the motion vector detection unit according to the first exemplary embodiment;

FIG. 9 is a diagram showing an example of detection results of the motion vector detection unit according to the first exemplary embodiment;

EXPLANATION OF REFERENCE

100 VIDEO SIGNAL CODING DEVICE
101 IMAGE INPUT DEVICE
102 DATA STORAGE DEVICE
103 DATA PROCESSING DEVICE
104 CODE OUTPUT DEVICE
111 CODING TARGET FRAME STORAGE UNIT
112 REFERENCE FRAME STORAGE UNIT
113 WORK AREA
121 MOTION VECTOR DETECTION UNIT
122 MOVING REGION DETECTION UNIT
123 MOTION COMPENSATION UNIT
124 UPDATE REGION DETECTION AREA SETTING UNIT
125 UPDATE REGION DETECTION UNIT
126 REGION CODING UNIT
131 CURRENT FRAME
132 REFERENCE FRAME
134 MOTION VECTOR
135 REGION
136 REGION
137 REFERENCE FRAME
138 UPDATE REGION
139 UPDATE REGION
201 EDGE EXTRACTION UNIT
202 FEATURE POINT EXTRACTION UNIT
203 FEATURE POINT PAIR EXTRACTION UNIT
204 MOTION VECTOR CALCULATION UNIT
205 MOTION VECTOR CANDIDATE GENERATION UNIT
206 MOTION VECTOR SELECTION UNIT
301 INITIAL CANDIDATE DECISION UNIT
302 MOVING REGION DECISION UNIT
401 MOVING REGION PRESENCE/ABSENCE DETERMINATION UNIT
402 MOVING DIRECTION DETERMINATION UNIT
403 DIVISION UNIT
411 MOVING REGION PRESENCE/ABSENCE DETERMINATION UNIT
412 MOVING REGION OVERLAP DETERMINATION UNIT
413 MOVING DIRECTION DETERMINATION UNIT
414 DIVISION UNIT
501 MOVING REGION PRESENCE/ABSENCE DETERMINATION UNIT
502 DIVISION UNIT
511 MOVING REGION PRESENCE/ABSENCE DETERMINATION UNIT
512 MOVING REGION OVERLAP DETERMINATION UNIT
513 DIVISION UNIT
601 PIXEL COMPARISON UNIT
602 UPDATE REGION EXTRACTION UNIT
R1, R2, R3, R4 SCREEN
R11, R12, R13, R14, R20, R20a, R20b, R20c, R21, R30, R30a, R30b, R30c, R30d MOVING REGION
R22, R23, R24, R25, R26, R31, R32, R331, R332, R333, R334, R341, R342, R343, R344, R345, R346, R351, R352, R361, R362, R363, R364, R365, R366, R367, R40, R41, R42, R43 UPDATE REGION
L221, L241, L242, L251, L252, L253, L281, L282, L283, L291, L292, L293, L294, L295, L296, L341, L342, L351, L352, L371, L372, L373, L374, L381, L382, L383, L384, L391, L392, L393, L394, L395, L396 PARTITION LINE

BEST MODE FOR CARRYING OUT THE INVENTION

Figure 1:
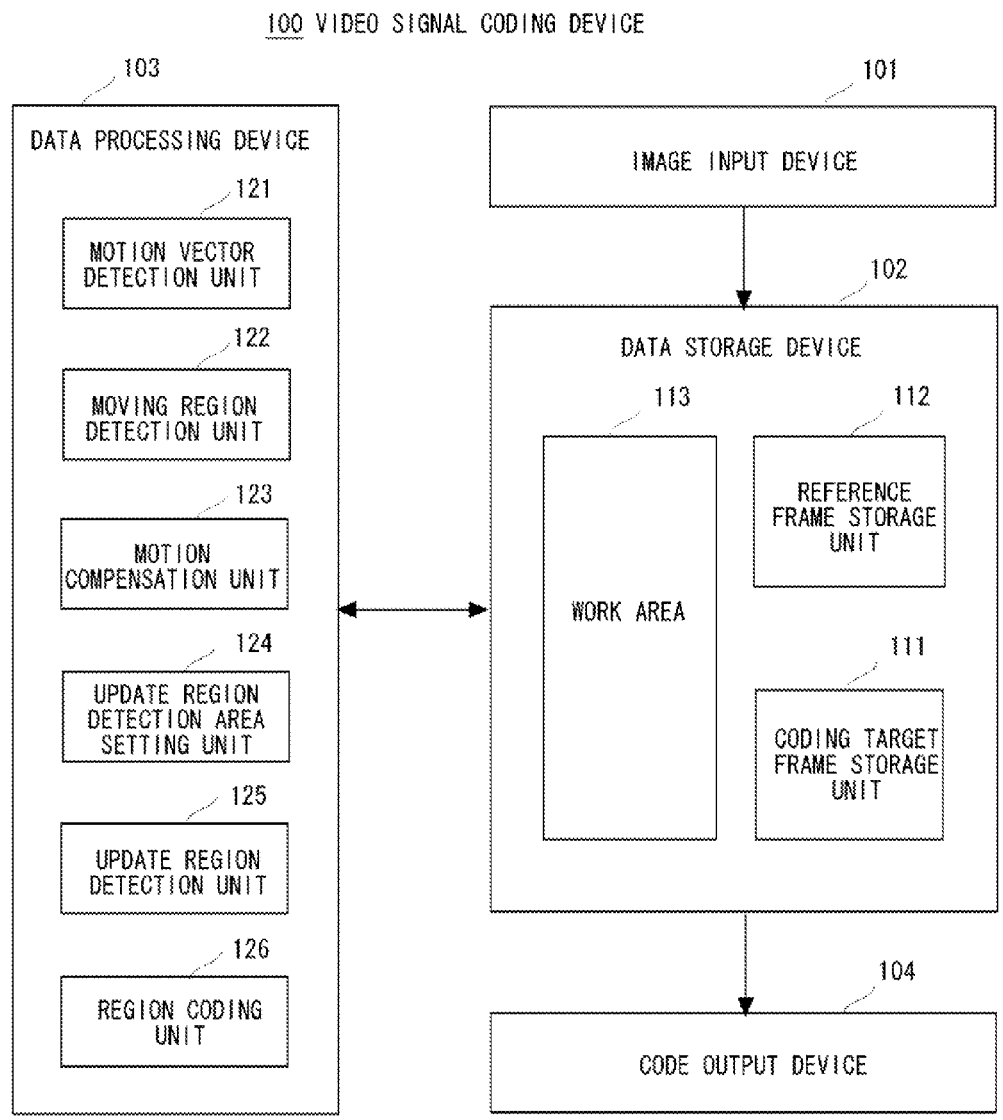
FIG. 1 is a block diagram of a video signal coding device according to an exemplary embodiment of the present invention.

Referring to FIG. 1, an example of a video signal coding device 100 according to an exemplary embodiment of the present invention includes an image input device 101, a data storage device 102, a data processing device 103, and a code output device 104.

The image input device 101 is a device that receives a video signal to be encoded, carries out, for example, analog capture or digital capture of a color video signal on a display screen of a computer which is not shown, and stores it to the data storage device 102. A captured video signal corresponding to one screen is called a frame or screen data.

The data storage device 102 includes a coding target frame storage unit 111 that stores a frame received from the image input device 101, a reference frame storage unit 112 that stores a reference frame used for coding the frame stored in the coding target frame storage unit 111, and a work area 113 that holds various data which are referred to and updated as needed in the process of frame coding.

The data processing device 103 is a device that encodes a coding target frame stored in the data storage device 102, and includes a motion vector detection unit 121, a moving region detection unit 122, a motion compensation unit 123, an update region detection area setting unit 124, an update region detection unit 125, and a region coding unit 126. Each unit has functions as outlined below.

The motion vector detection unit 121 has a function of comparing a coding target frame with a previous frame to detect a single main motion vector. In other words, the main motion vector means a dominant motion vector among at least one motion vector. For example, when map scrolling and mouse cursor movement occur concurrently on a screen of a computer, the major part of the moving region is occupied by ones associated with map scrolling. Thus, the motion vector associated with map scrolling is the main motion vector.

The moving region detection unit 122 has a function of detecting, as a moving region, an identical or similar image region which is present in both a coding target frame and a preceding frame and whose position on the screen is changed by the motion vector detected by the motion vector detection unit 121.

The motion compensation unit 123 has a function of copying the moving region detected by the moving region detection unit 122 to a destination indicated by the motion vector in a reference frame used for encoding the coding target frame, to thereby generate a reference frame after motion compensation.

The update region detection area setting unit 124 has a function of setting at least one update region detection area on a frame.

The update region detection unit 125 has a function of detecting, as an update region, a region where the reference frame after motion compensation differs from the coding target frame, for each update region detection area set by the update region detection area setting unit 124.

The region coding unit 126 generates a code by encoding, as an image, the update region detected by the update region detection unit 125, by using a given coding method.

The code output device 104 is a device that reads out and outputs, from the work area 113 of the data storage device 102, the code generated for the coding target frame, and is composed of, for example, a communication device that communicates with a client terminal which is not shown. The code generated for one coding target frame includes a code of an update region generated by the region coding unit 126 and moving region information (a coordinate and a motion vector of a source region) detected by the motion vector detection unit 121 and the moving region detection unit 122.

The motion vector detection unit 121, the moving region detection unit 122, the motion compensation unit 123, the update region detection area setting unit 124, the update region detection unit 125, and the region coding unit 126 can be implemented by a computer constituting the data processing device 103 and by a program that runs on the computer. The program is provided in a form recorded on a computer-readable recording medium such as a CD-ROM, and is loaded into the computer upon start-up of the computer, for example, to control operations of the computer, thereby implementing each unit on the computer.

Next, the overall operation of the video signal coding device 100 according to this exemplary embodiment will be described.

Figure 2:
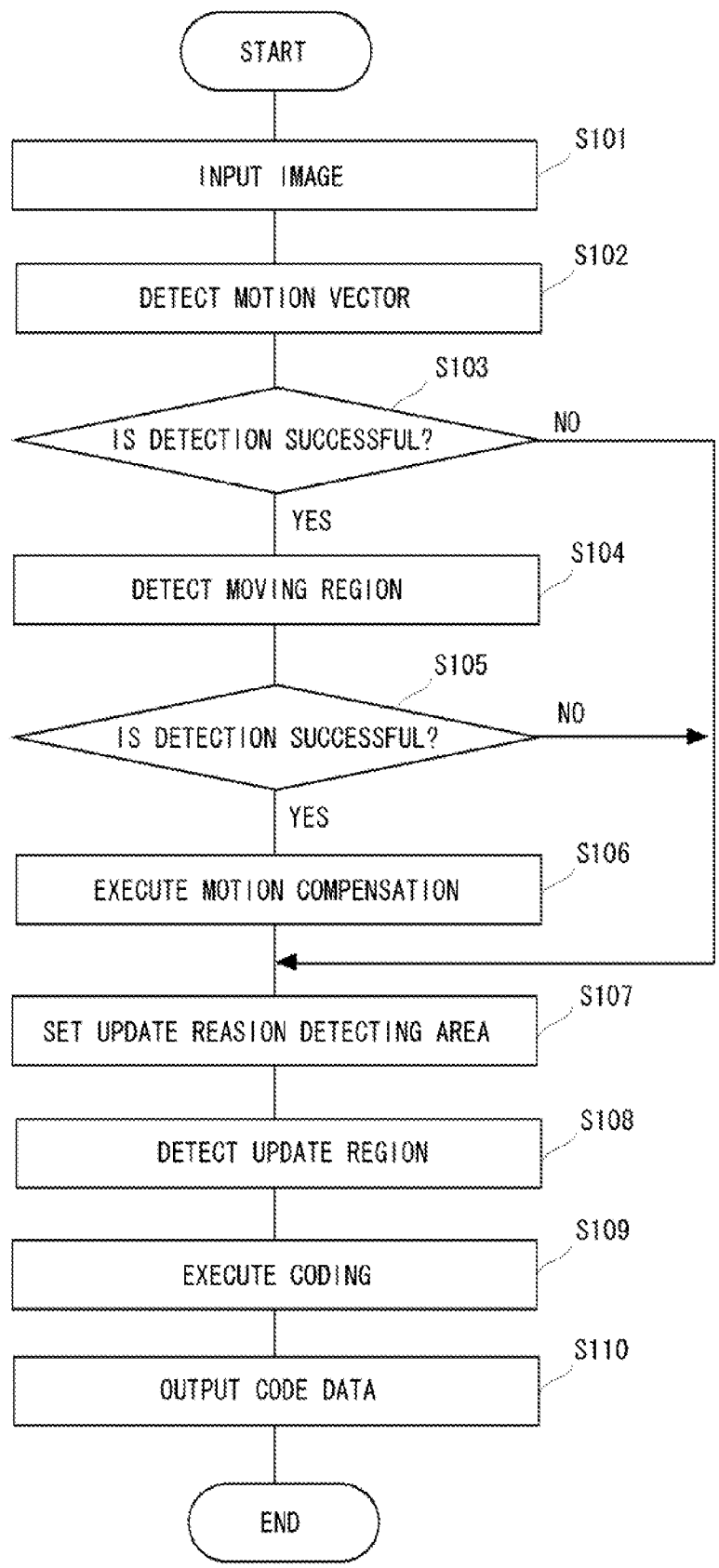
FIG. 2 is a flowchart showing a process flow of the video signal coding device according to an exemplary embodiment of the present invention.

The image input device 101 of the video signal coding device 100 captures a frame to be encoded, and stores it as a current frame to the coding target frame storage unit 111 of the data storage device 102 (step S101 in FIG. 2).

Figure 3:
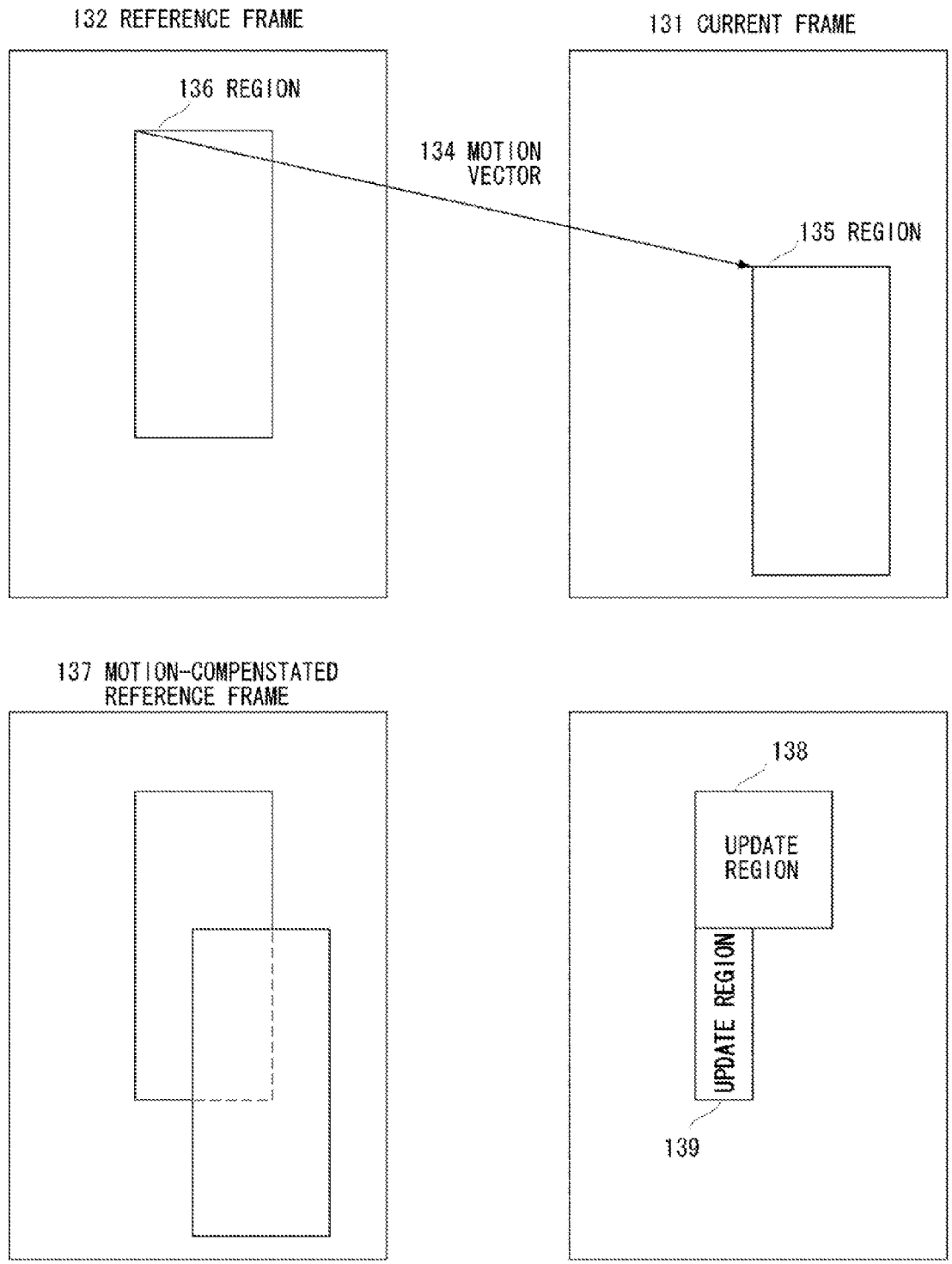
FIG. 3 is an explanatory diagram showing a video signal coding process performed by the video signal coding device according to an exemplary embodiment of the present invention.

Next, the motion vector detection unit 121 compares the current frame with the preceding frame (reference frame), which has been encoded and stored to the reference frame storage unit 112, thereby detecting a single main motion vector (step S102). For example, when a motion vector 134 shown in the figure is dominant, as a result of the comparison between a current frame 131 and a reference frame 132, which are shown in FIG. 3, the motion vector 134 is detected as a main motion vector. Information on the detected motion vector 134 is temporarily stored to the work area 113.

Then, in the case where the motion vector has been detected from the current frame (YES in step S103), the moving region detection unit 122 detects, as a moving region, an image region which is an identical or similar image region that is present in both the current frame and the reference frame and whose position on the screen is changed by the motion vector detected by the motion vector detection unit 121 (step S104). For example, when a region 135 and a region 136 are identical or similar regions in the current frame 131 and the reference frame 132, which are shown in FIG. 3, the regions 135 and 136 are detected as moving regions. Coordinate information on the detected moving regions 135 and 136 is temporarily stored to the work area 113.

Then, in the case where the moving region has been detected (YES in step S105), the motion compensation unit 123 updates the reference frame storage unit 112 by performing motion compensation to copy an image corresponding to a moving region before movement to a location after movement indicated by the motion vector on the reference frame (step S106). In the case of FIG. 3, for example, on the reference frame 132, the region 136 is copied to a location corresponding to the region 135 in the current frame 131. Thus, a motion-compensated reference frame 137 shown in FIG. 3 is generated.

However, in the case where no motion vector has been detected (NO in step S103), the detection of the moving region and motion compensation are not carried out. Even if a motion vector is detected, when the detection of the moving region is unsuccessful (NO in step S105), the motion compensation is not carried out.

Next, the update region detection area setting unit 124 sets at least one update region detection area for detecting an update region on the frame (step S107). Then, the update region detection unit 125 detects, as update regions, regions where the reference frame differs from the current frame, for each update region detection area set by the update region detection area setting unit 124 (step S108). Thus, in the case of FIG. 3, for example, update regions 138 and 139 are detected. Coordinate information on the detected update regions 138 and 139 is temporarily stored to the work area 113.

Then, the region coding unit 126 generates a code by encoding, as an image, the update regions detected by the update region detection unit 125 (step S109). The generated code is associated with the coordinate information on the update regions stored in the work area 113 and is temporarily stored.

The code output device 104 reads out and outputs, from the work area 113 of the data storage device 102, the information generated for the current frame, i.e., coordinate information on each update region, a code thereof, and moving region information (coordinate information and a motion vector of the source region) (step S110). In the case of FIG. 3, for example, the coordinate information on the update region 138 and the code thereof, the coordinate information on the update region 139 and the code thereof, the coordinate information on the moving region 136, and the motion vector 134 are output as code information on the current frame.

Decoding of a frame based on the code information is executed by a procedure reverse to that for coding. For example, when the current frame 131 shown in FIG. 3 is decoded based on the reference frame 132 and the code information, the moving region 136 of the reference frame 132 is first copied to a location indicated by the motion vector 134, to thereby generate the motion-compensated reference frame 137. After that, the update regions 138 and 139, which have been decoded based on the code information, are reflected in this reference frame, to thereby generate the current frame 131.

Next, the units included in the data processing device 103 will be described. Here, the motion compensation unit 123 can be implemented by copying means, and the region coding unit 126 can be implemented by well-known image coding techniques such as prediction coding, transform coding, vector quantization, or entropy coding. Therefore, hereinafter, the motion vector detection unit 121, the moving region detection unit 122, the update region detection area setting unit 124, and the update region detection unit 125 will be described in detail.

(1) The Motion Vector Detection Unit 121

Figure 4:
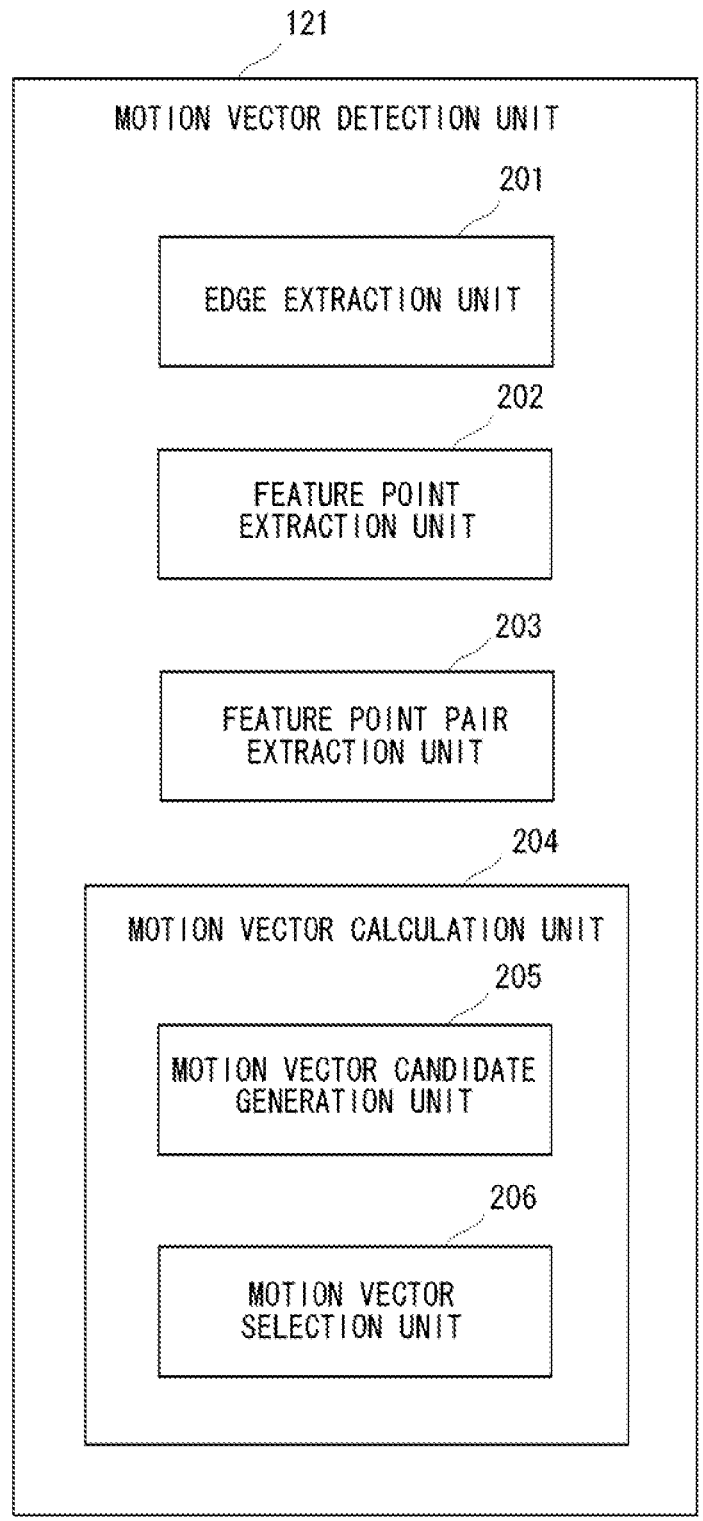
FIG. 4 is a block diagram of a motion vector detection unit according to a first exemplary embodiment.

Referring to FIG. 4, the motion vector detection unit 121 of a first exemplary embodiment includes an edge extraction unit 201, a feature point extraction unit 202, a feature point pair extraction unit 203, and a motion vector calculation unit 204. Each unit has functions as outlined below.

The edge extraction unit 201 has a function of extracting, as an edge point, a point where a pixel value in each of the current frame and the reference frame greatly changes. An edge point represents a pixel where each difference between pixel values of adjacent pixels in predetermined two directions perpendicular to each other (upper and left, left and lower, lower and right, right and upper, obliquely upper left and obliquely lower left, obliquely lower left and obliquely lower right, obliquely lower right and obliquely upper right, or obliquely upper right and obliquely upper left) is equal to or greater than a predetermined threshold. A difference between pixel values is obtained for each component of R, G, and B, for example. When the difference of either component is equal to or greater than the threshold, it is determined that a difference between pixel values of two pixels is equal to or greater than the threshold.

The feature point extraction unit 202 has a function of extracting, as a feature point, an edge point whose positional relationship with another at least one edge point is unique in the frame (i.e., an edge point whose positional relationship with another at least one edge point appears only once in the frame) among edge points extracted from the current frame and the reference frame. In this exemplary embodiment, as another at least one edge point, one preceding edge point appearing in the order of raster scanning of the frame is used. As another exemplary embodiment, however, a plurality of edge points, such as a preceding edge point and a last-but-one edge point may be used. Generally, when multiple preceding edge points are used instead of only one preceding edge point, the number of edge points whose positional relationship with another edge point in the frame is unique can be reduced. This is advantageous in that the number of bits of a hash value can be reduced when hash values are used as described later.

As data for defining the positional relationship between an edge point and another edge point, a value representing the number of pixels corresponding to a distance between the edge points may be used. Instead of using the distance itself, a number of lower bits of a bit string representing the distance may be used as a hash value, and an edge point where the hash value is unique may be extracted as a feature point. In this exemplary embodiment, the lower 11 bits, for example, of the bit string representing the distance are used as a hash value.

The feature point pair extraction unit 203 has a function of extracting a feature point pair whose positional relationship with another edge point is the same, from the current frame and the reference frame. Preferably, the feature point pair extraction unit 203 extracts a feature point pair whose positional relationship with another edge point is the same and at which the difference between pixel values is equal to or smaller than the threshold.

The motion vector calculation unit 204 has a function of calculating, as a motion vector, a difference between coordinate values of the feature point pair extracted from the current frame and the reference frame. Preferably, the motion vector calculation unit 204 includes a motion vector candidate generation unit 205 and a motion vector selection unit 206.

The motion vector candidate generation unit 205 has a function of generating, as a motion vector candidate, a difference between coordinate values for each feature point pair when a plurality of feature point pairs extracted from the current frame and the reference frame are present.

The motion vector selection unit 206 has a function of selecting, as a motion vector, a motion vector candidate having a highest appearance frequency from among motion vector candidates.

Next, the operation of the motion vector detection unit 121 according to this exemplary embodiment will be described.

Figure 5:
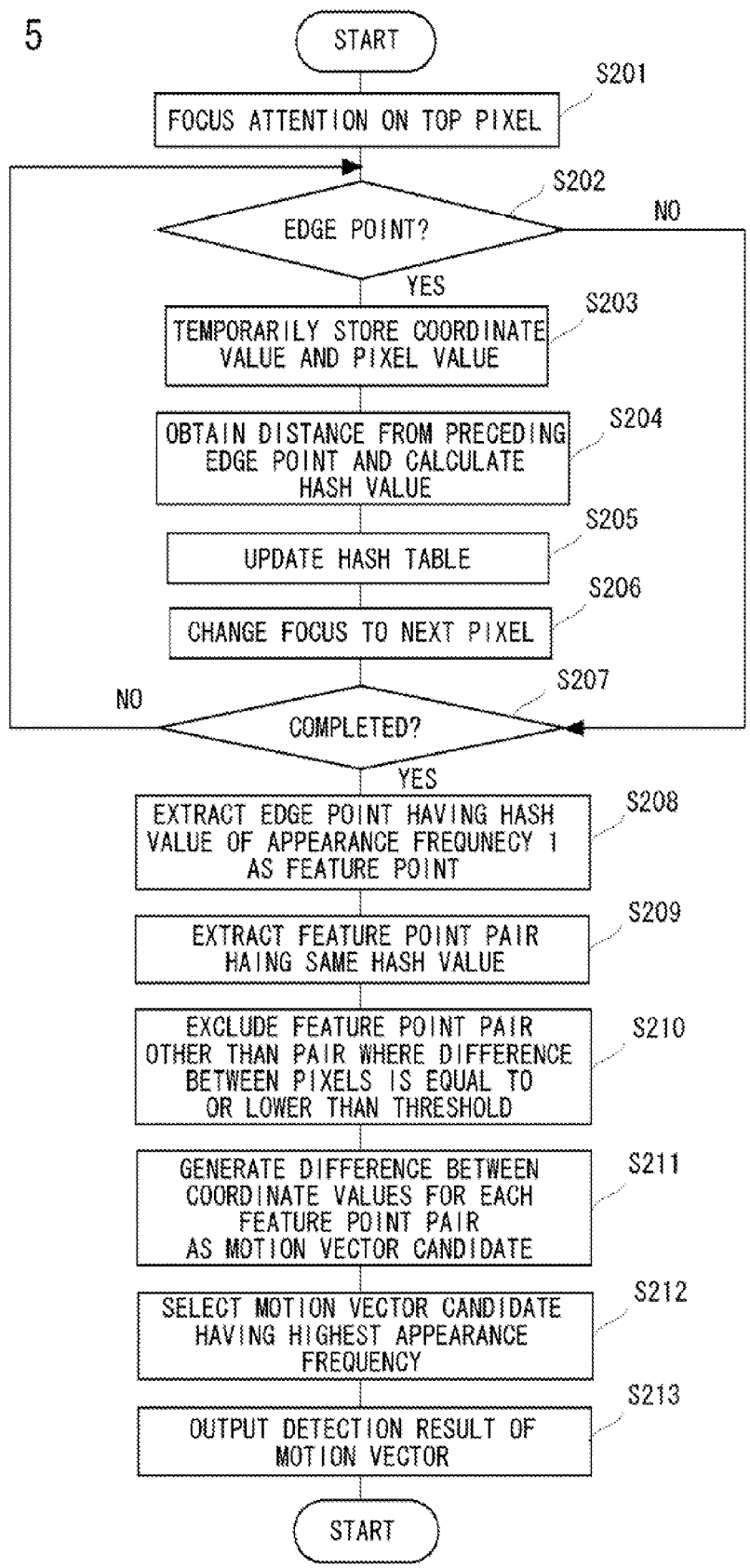
FIG. 5 is a flowchart showing a process flow of the motion vector detection unit according to the first exemplary embodiment.

The edge extraction unit 201 of the motion vector detection unit 121 focuses attention on the top pixel of the current frame stored in the coding target frame storage unit 111 (step S201 in FIG. 5), and determines whether the pixel of interest is an edge point (step S202). If the pixel of interest is not the edge point, focus is shifted to a subsequent pixel in the order of raster scanning (step S206) to determine whether the pixel of interest is the edge point (step S202).

Figures 6, 7:
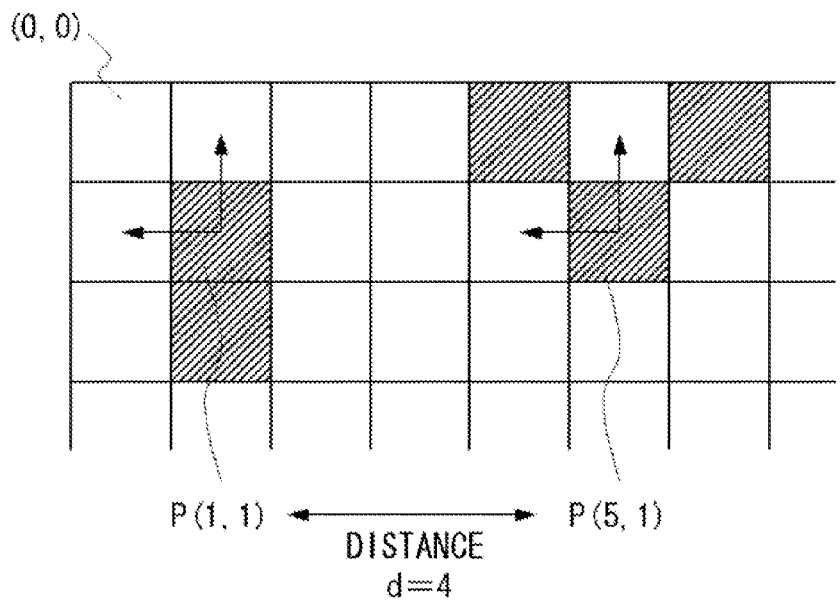
FIG. 6 is an explanatory diagram showing an edge extraction process in the motion vector detection unit according to the first exemplary embodiment.
FIG. 7 is a diagram showing an example of a hash table for a current frame used in the motion vector detection unit according to the first exemplary embodiment.

If the pixel of interest is the edge point (YES in step S202), a pair of the coordinate value and the pixel value of the pixel of interest is temporarily stored as edge point information to the work area 113 (step S203). Then, a distance from the preceding edge point stored in the work area 113 is obtained to calculate the lower 11 bits of the distance as hash values (step S204), and a hash table corresponding to the current frame stored in the work area 113 is updated (step S205). As shown in FIG. 6, for example, when processes are executed in the order of raster scanning and a pixel P(5, 1) is detected as an edge point subsequent to a pixel P(1, 1), the distance between the pixel P(5, 1) and the pixel P(1, 1) is represented by the number of pixels "4". Thus, a hash value for the value "4" is calculated and information on the edge point is registered in the hash table.

Referring to FIG. 7, an example of a hash table corresponding to the current frame has entries in one-to-one correspondence with hash values 0 to 2047. An appearance frequency, a final appearance coordinate, and a pixel value are registered in each entry. The initial value of the appearance frequency is 0, and the initial value of each of the final appearance coordinate and the pixel value is NULL. In a hash table update process in step S205, the edge extraction unit 201 increments by one the appearance frequency in the entry having the calculated hash value, and records the coordinate value and pixel value of the detected edge point in the fields of the final appearance coordinate and the pixel value. In the case of the pixel P(5, 1) described above, for example, the appearance frequency in the entry of the hash value 4 shown in FIG. 7 is incremented by one. Further, the coordinate value and pixel value of the pixel P(5, 1) are recorded in the same entry.

The edge extraction unit 201 repeatedly executes the process as described above until the last pixel of the current frame is reached.

After completion of the processes of the edge extraction unit 201 (YES in step S207), the feature point extraction unit 202 refers to the hash table corresponding to the current frame, and extracts, as feature points, all edge points whose coordinate value and pixel value are recorded in entries having an appearance frequency of 1 (step S208). For example, when the hash table corresponding to the current frame at the time when the process of the edge extraction unit 201 is completed is the one shown in FIG. 7, the pixel P(5, 1) is extracted as a feature point.

Then, the feature point pair extraction unit 203 refers to the hash table corresponding to the current frame and the hash table corresponding to the previous frame, and extracts all feature point pairs having the same hash value (step S209).

Here, the hash table corresponding to the previous frame is created by the edge extraction unit 201 when the previous frame is processed as the current frame, and is stored to the work area 113. For example, when the hash table corresponding to the previous frame has contents as shown in FIG. 8, a pixel P(5, 8) having the same hash value as the pixel P(5, 1) extracted as a feature point from the current frame shown in FIG. 7 is present in the previous frame. Therefore, a pair of the pixel P(5, 8) in the previous frame and the pixel P(5, 1) in the current frame is extracted as a feature point pair.

Then, the feature point pair extraction unit 203 retains pairs where each difference between the components R, G, and B is equal to or smaller than the predetermined threshold, among the feature point pairs extracted in step S209, because the pairs have a high matching possibility, and excludes feature point pairs other than the pairs (step S210). The feature point pair extraction unit 203 records information on the retained feature point pairs in the work area 113.

Then, the motion vector candidate generation unit 205 of the motion vector calculation unit 204 reads out the information on the feature point pairs from the work area 113, and generates a difference between coordinate values for each pair as a motion vector candidate (step S211). In the case of the feature point pair of P(5, 8) and P(5, 1) described above, for example, (0, −7) is generated as a motion vector candidate. Note that a static vector is neglected, so pairs having a difference of (0, 0) are excluded from the candidates. The motion vector candidate generation unit 205 records information on the motion vector candidates in the work area 113.

Then, the motion vector selection unit 206 reads out the information on the motion vector candidates from the work area 113, and counts the total number of the same motion vector candidates to thereby obtain the appearance frequency of each motion vector candidate, and selects a motion vector candidate having the highest appearance frequency as an estimated value of the main motion vector (step S212). Further, the motion vector selection unit 206 records the detection result of the motion vector in the work area 113 (step S213).

Figure 10:
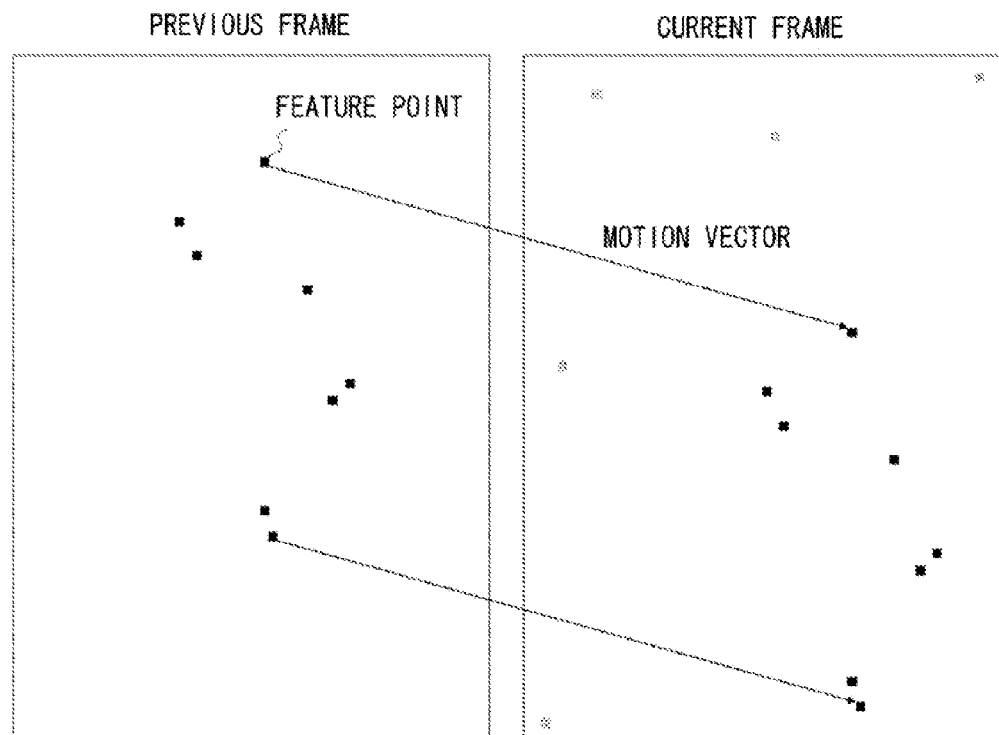
FIG. 10 is a diagram showing a relationship between an image obtained by plotting a feature point pair included in a list of motion vector candidates having a highest appearance frequency, which are detected by the motion vector detection unit according to the first exemplary embodiment, in a previous frame and a current frame, and an estimated motion vector.

FIG. 9 shows an example of the detection result recorded in the work area 113 by the motion vector selection unit 206. In this example, the detection result includes not only the estimated motion vector but also a list of feature point pairs, from which the motion vector candidates having the highest appearance frequency have been calculated. FIG. 10 shows a relationship between an image obtained by plotting a feature point pair, which is included in the detection result, in the previous frame and the current frame, and the estimated motion vector. Thus, the motion vector estimated from the motion vector candidate having the highest appearance frequency is the main motion vector in at least one motion vector that is present in the current frame.

According to the motion vector detection unit 121 of this exemplary embodiment, the main motion vector can be detected rapidly and accurately from a video signal on the computer screen. The reasons for the above are as follows. First, there is no need to search for various vectors in each pixel block, and a motion vector is obtained by extracting and comparing edge points and feature points. Second, the locality of memory access is high, because processes are executed in the order of raster scanning in a frame. Third, a motion vector in units of relatively large objects, such as a window, can be detected as a main motion vector, because the comparison is not performed in units of blocks but is performed over the entire screen. Fourth, source and destination pixel values need not exactly match because a vector is detected based on an edge point, so that it is compatible with an analog-captured video signal containing a large amount of noise.

On the other hand, the motion vector detection unit 121 of this exemplary embodiment has limitations in that: (1) it does not detect a plurality of vectors simultaneously, (2) it does not detect a motion vector in units of sub-pixels and a deformed object, and (3) it does not detect a motion vector of an object having a small number of edges. However, (1) and (2) are less likely to occur on the computer screen, and even when a region as in the case of (3) is directly encoded as an image, the amount of code is small. Therefore, these limitations do not cause a significant problem.

(2) The Moving Region Detection Unit 122

Figure 11:
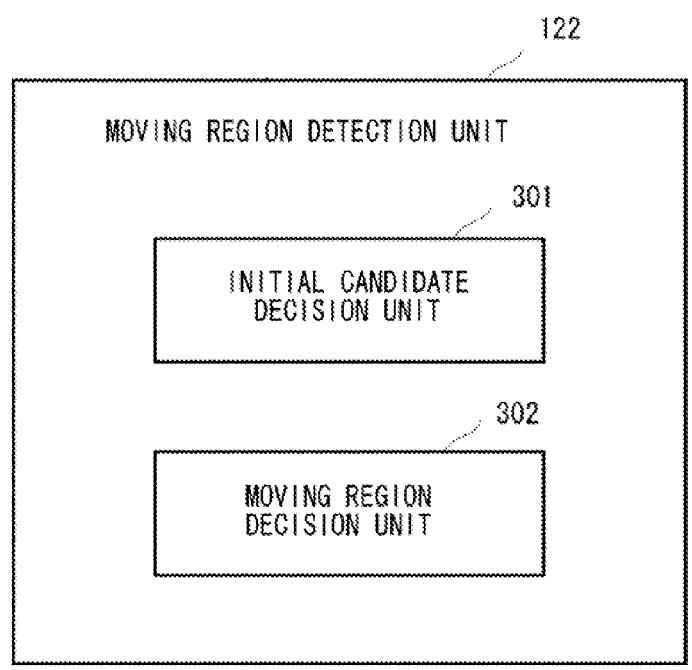
FIG. 11 is a block diagram of a moving region detection unit according to the first exemplary embodiment.

Referring to FIG. 11, the moving region detection unit 122 of the first exemplary embodiment includes an initial candidate decision unit 301 and a moving region decision unit 302. Each unit has schematic features as described below.

The initial candidate decision unit 301 has a function of deciding an initial candidate for a moving region.

The moving region decision unit 302 has a function of deciding a moving region for use in motion compensation of the motion compensation unit 123, from among the initial candidate for the moving region, which is decided by the initial candidate decision unit 301, and another at least one candidate for the moving region obtained by changing the size of the moving region of the initial candidate.

Next, the operation of the moving region detection unit 122 according to this exemplary embodiment will be described.

Figure 12:
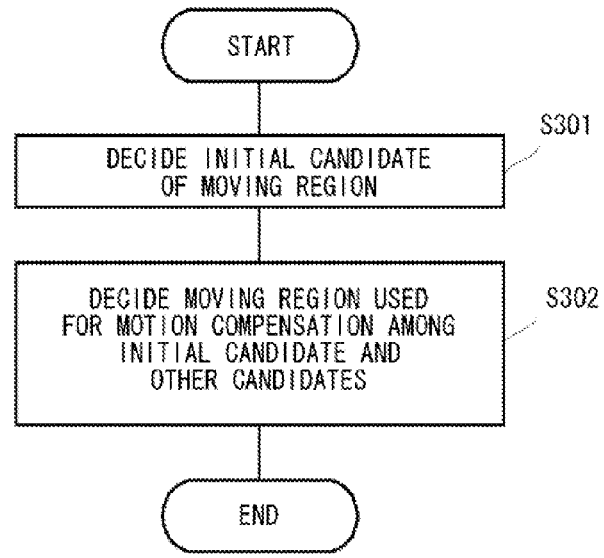
FIG. 12 is a flowchart showing a process flow of the moving region detection unit according to the first exemplary embodiment.
Figure 13:
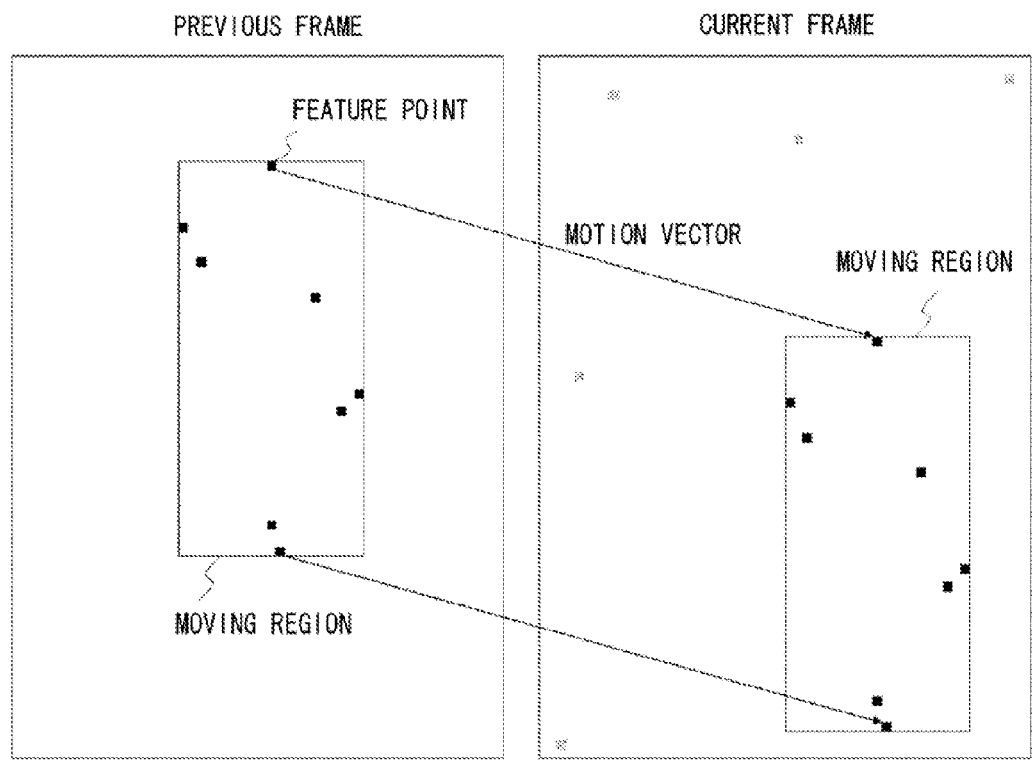
FIG. 13 is a diagram showing an example where a rectangle circumscribing a feature point group is determined as a moving region in the moving region detection unit according to the first exemplary embodiment.

The initial candidate decision unit 301 of the moving region detection unit 122 decides the moving region of the initial candidate (step S301 in FIG. 12). As an exemplary method for deciding the initial candidate, there is provided a method for setting, as the initial candidate for the moving region, a rectangle circumscribing a feature point group from which the motion vector candidate used for estimation of the motion vector by the motion vector detection unit 121 has been calculated. For example, when the motion vector selection unit 206 of the motion vector detection unit 121 generates the detection result as shown in FIG. 9, the moving region detection unit 122 reads out from the work area 113 the feature points described in the detection result, for each of the previous frame and the current frame. For example, the moving region detection unit 122 sets, as a moving region before movement, a rectangle circumscribing a feature point group indicated in the previous frame shown in FIG. 13. Further, the moving region detection unit 122 detects, as a moving region after movement, a rectangle circumscribing the feature point group indicated in the current frame shown in FIG. 13. Information on the detected moving region of the initial candidate is temporarily recorded in the work area 113.

Other exemplary methods for determining the initial candidate include a method for setting, as the initial candidate for the moving region, a rectangle circumscribing three or more feature points in the feature point group included in the motion vector candidate used for estimation of the motion vector by the motion vector detection unit 121, and a method for setting the entire frame as the initial candidate for the moving region.

Then, the moving region decision unit 302 of the moving region detection unit 122 decides the moving region for use in motion compensation from among the initial candidate and other candidates (step S302). Hereinafter, a configuration example of the moving region decision unit 302 will be described in detail.

(A) Example 1 of the Moving Region Decision Unit 302

Figure 14A:
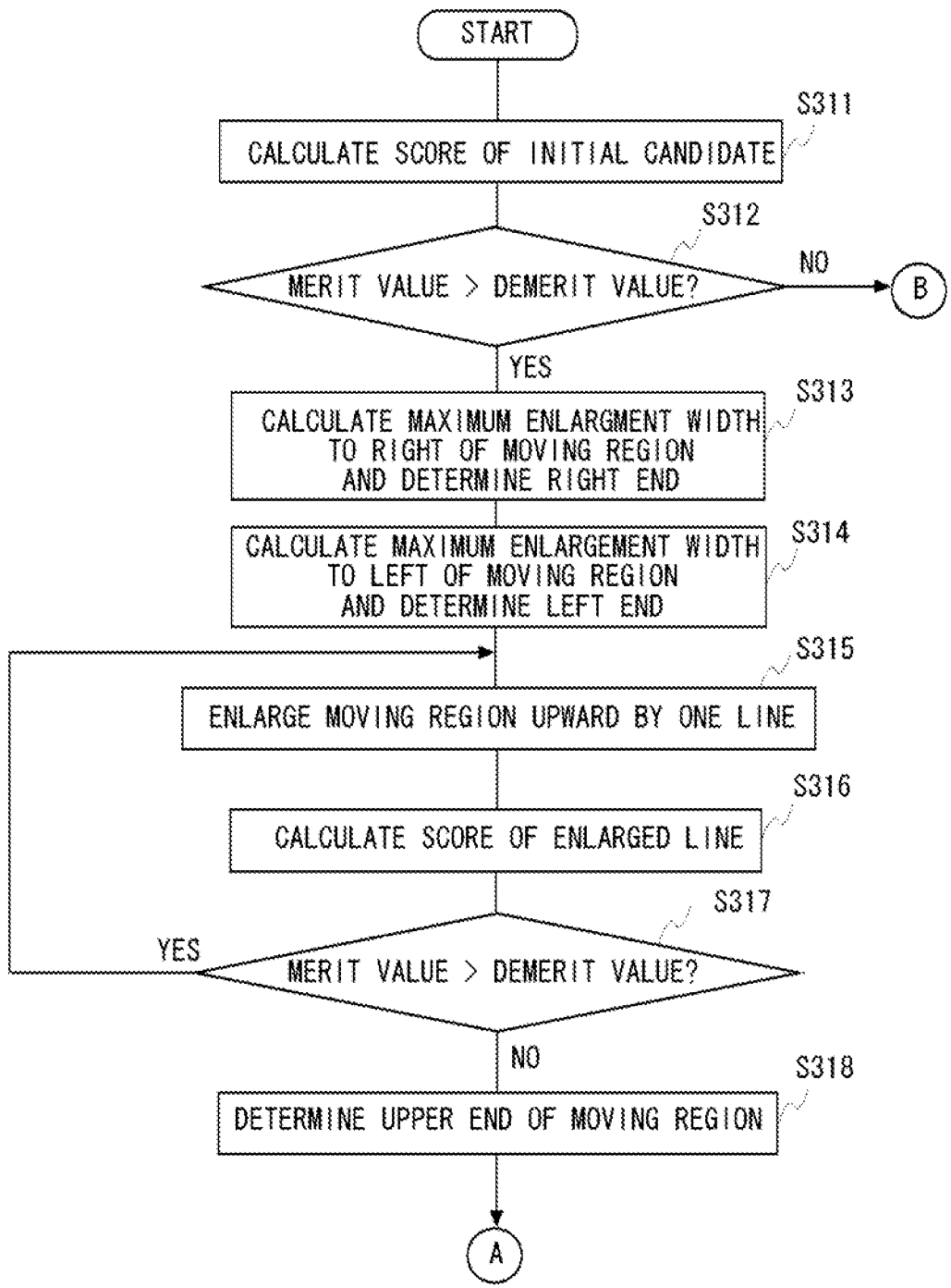
FIG. 14A is a flowchart showing a first process example of a moving region decision unit in the moving region detection unit according to the first exemplary embodiment.
Figure 14B:
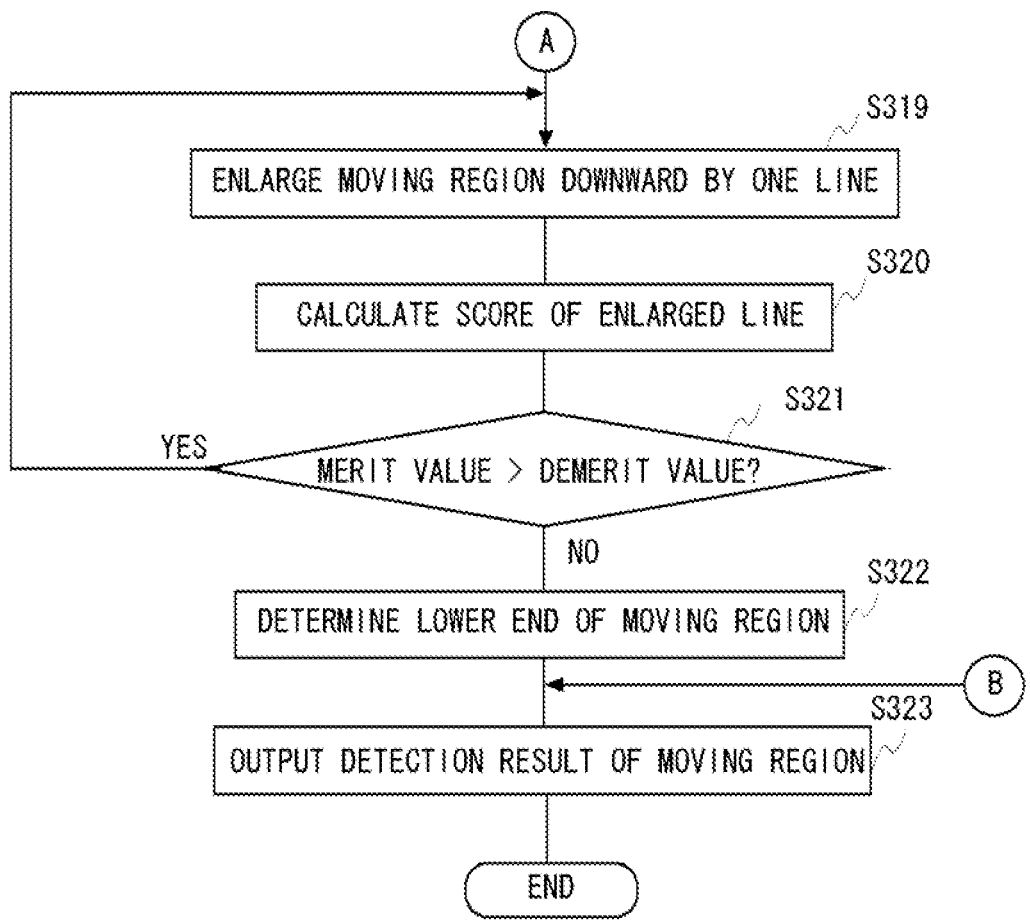
FIG. 14B is a flowchart showing the first process example of the moving region decision unit in the moving region detection unit according to the first exemplary embodiment.

FIGS. 14A and 14B each show a process example of Example 1 of the moving region decision unit 302. First, the moving region decision unit 302 compares pixel values by actually performing motion compensation based on the moving region and motion vector of the decided initial candidate, and checks whether an accurate parallel movement is made. Specifically, it is estimated which one of the amount of code reduced by motion compensation and the amount of code increased by motion compensation is larger, by a method described later, using a merit value and a demerit value respectively representing the degree of adaptability and the degree of non-adaptability as a moving region for use in motion compensation, as an evaluation scale (steps S311 and S312). Here, the merit value represents the evaluation scale indicating the degree of adaptability as the moving region for use in motion compensation, and the demerit value represents the evaluation scale indicating the degree of non-adaptability as the moving region for use in motion compensation. Both have an initial value of 0.

(a) When "pixel value after motion compensation" is different from "true pixel value" (e.g., when any of differences between the components of R, G, and B is equal to or greater than the predetermined threshold), the demerit value is increased by one, considering the possibility that the amount of code is increased by motion compensation.

(b) When "pixel value after motion compensation" is identical to "true pixel value" (e.g., when no difference between the components of R, G, and B is equal to or greater than the predetermined threshold) and when a luminance gradient equal to or greater than the threshold is present between a pixel having the coordinate and an adjacent pixel (e.g., when the total value of differences with the upper pixel and the left pixel is equal to or greater than the threshold, or when a difference with the upper pixel or the left pixel is equal to or greater than the threshold), the merit value is increased by one, considering the possibility that the amount of code can be reduced by motion compensation. Here, the reason for adding the condition that the luminance gradient equal to or greater than the threshold is present between the adjacent pixels is that the amount of code in a section including a point having a luminance gradient is generally increased in the coding using a difference.

(C) The above processes (a) and (b) are performed on the entire moving region of the initial candidate. If the merit value is larger than the demerit value, the candidate is adopted as the moving region. Otherwise, it is discarded.

Note that a process for adding the merit value and the demerit value according to the comparison result between the pixel values and comparing a final merit value with a final demerit value is equivalent to a method for performing either addition or subtraction using one of the merit value and the demerit value. Specifically, first, the merit value is subtracted by a predetermined value (or the demerit value is added by the predetermined value) every time a pixel where the difference between the pixel value after motion compensation and the true pixel value is equal to or greater than the predetermined threshold is detected. Next, the process for adding the merit value by the predetermined value (or subtracting the demerit value by the predetermined value) every time a pixel where the difference between the pixel value after motion compensation and the true pixel value is smaller than the predetermined threshold and where a luminance gradient equal to or greater than the threshold is present between the adjacent pixels. Thus, the positive or negative of the final merit value (or the demerit value) may be determined.

When the initial candidate for the moving region is discarded (NO in step S312), the detection of the moving region is not carried out in this example. A detection result indicating that the detection of the moving region is unsuccessful is recorded in the work area 113 (step S323), and the process shown in FIGS. 14A and 14B is completed.

On the other hand, when the initial candidate for the moving region is adopted (YES in step S312), it is checked whether the region can be further enlarged upward, downward, leftward, and rightward, by the following procedure.

Figure 15:
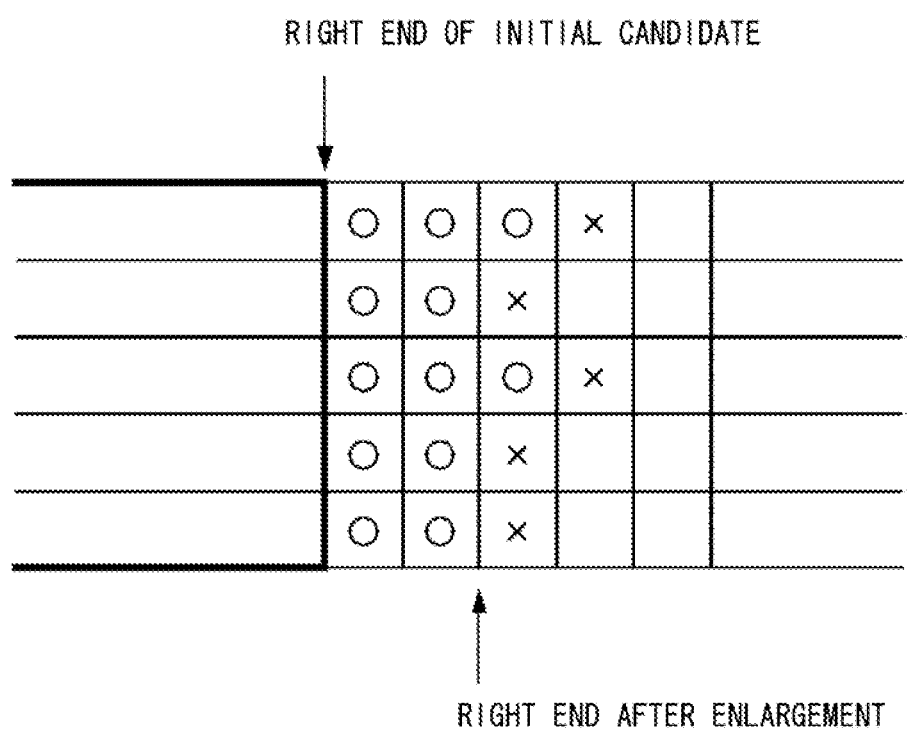
FIG. 15 is an explanatory diagram showing a method for deciding an enlargement width to the right of a moving region in the moving region detection unit according to the first exemplary embodiment.

(I) With respect to each line of the moving region, the number of continuous pixels where "pixel value after motion compensation" matches "true pixel value" (difference is equal to or smaller than the threshold) is checked when the region is enlarged rightward, and the right end is determined assuming that a minimum value of the number of continuous pixels is a maximum enlargement width to the right (step S313). As shown in FIG. 15, for example, when the right end of the initial candidate is enlarged rightward, assuming that three pixels are continuous at first and third lines and two pixels are continuous at all the remaining lines and that "pixel value after motion compensation" matches "true pixel value", the maximum enlargement width to the right corresponds to two pixels which are the minimum value of the number of continuous pixels.

(II) A maximum enlargement width to the left of the moving region is calculated by a method similar to that for rightward enlargement, thereby determining the left end (step S314).

(III) The region subjected to the processes (I) and (II) described above is further enlarged upward line by line (steps S315 to S318). Specifically, the merit value and the demerit value upon enlargement by one line are calculated by a method similar to that for the processes (a) and (b) described above (steps S315 and S316). If the merit value is larger than the demerit value (YES in step S317), the process returns to step S315 and the same process is performed for a subsequent line. If the merit value is not greater than the demerit value, the upper end of the moving region before enlargement by one line is determined as the upper end thereof (step S318).

(IV) The moving region is enlarged downward by a method similar to that for upward enlargement, thereby determining the lower end (steps S319 to S322 in FIG. 14B).

Lastly, the moving region decision unit 302 records the detection result including the coordinate information on the enlarged moving region in the work area 113 (step S323), and the process shown in FIGS. 14A and 14B is completed.

Here, different methods are used for the enlargement to the left and right of the moving region and the enlargement to the top and bottom thereof. This is because a memory access to pixels on different lines takes time, while a memory access to multiple pixels on the same line can be made rapidly. In other words, this is because when the enlargement to the left and right is performed column by column in a similar manner as the enlargement to the top and bottom, a memory access to all lines of the moving region is required even in the case of enlargement by one column. However, under such circumstances that the memory access time does not pose a problem, the enlargement to the left and right of the moving region may be performed by the same method as that for the enlargement to the top and bottom thereof. On the contrary, the enlargement to the top and bottom of the moving region may be performed by a simple method used for the enlargement to the left and right thereof.

Example 1 of the moving region decision unit 302 can quantitatively determine the validity of the initial candidate decided by the initial candidate decision unit 301. This makes it possible to prevent motion compensation using an inappropriate moving region. Further, when the initial candidate is valid, a larger moving region where the effect of reducing the amount of code is large can be searched.

(B) Example 2 of the Moving Region Decision Unit 302

Figure 16A:
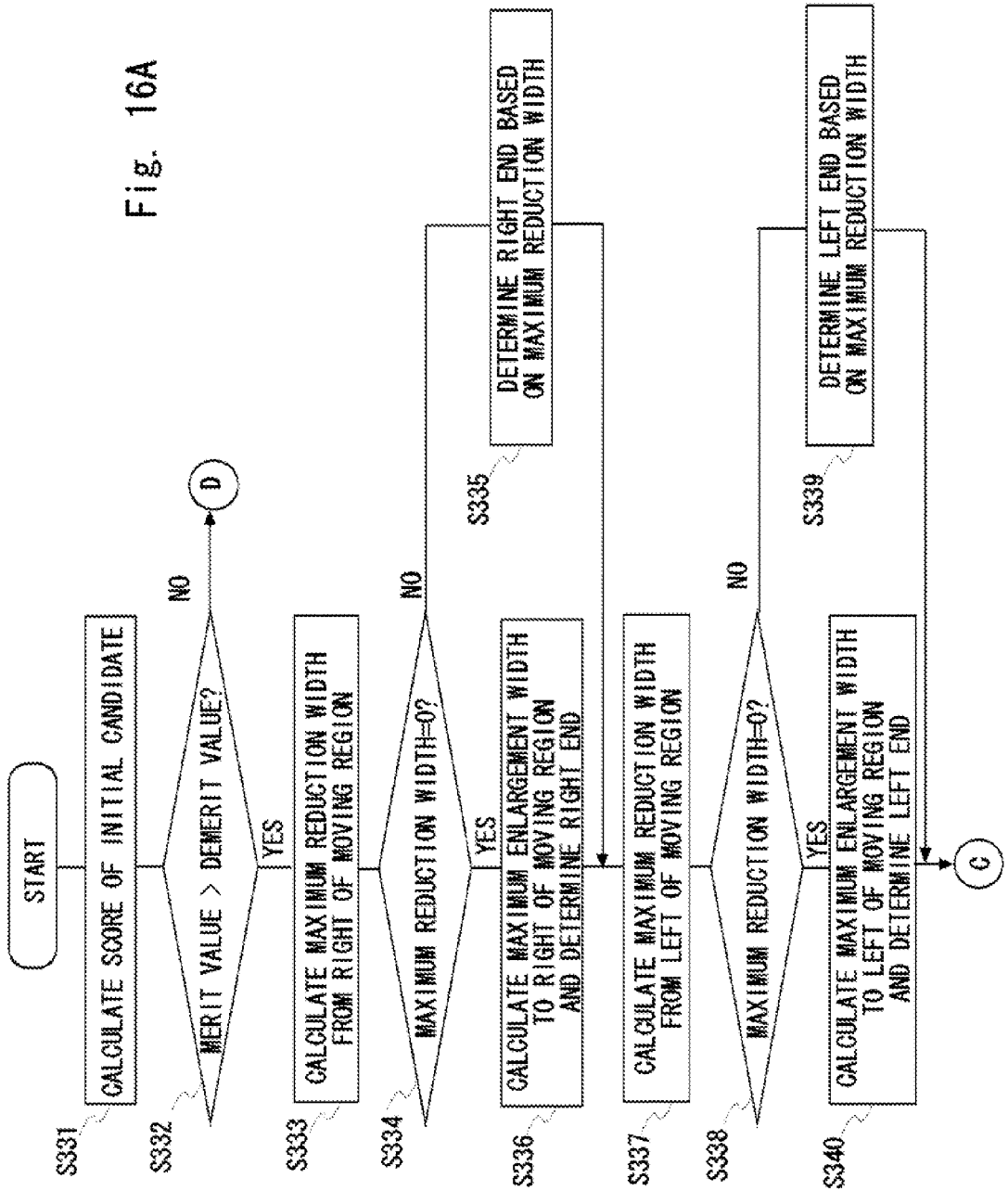
FIG. 16A is a flowchart showing a second process example of the moving region decision unit in the moving region detection unit according to the first exemplary embodiment.
Figure 16B:
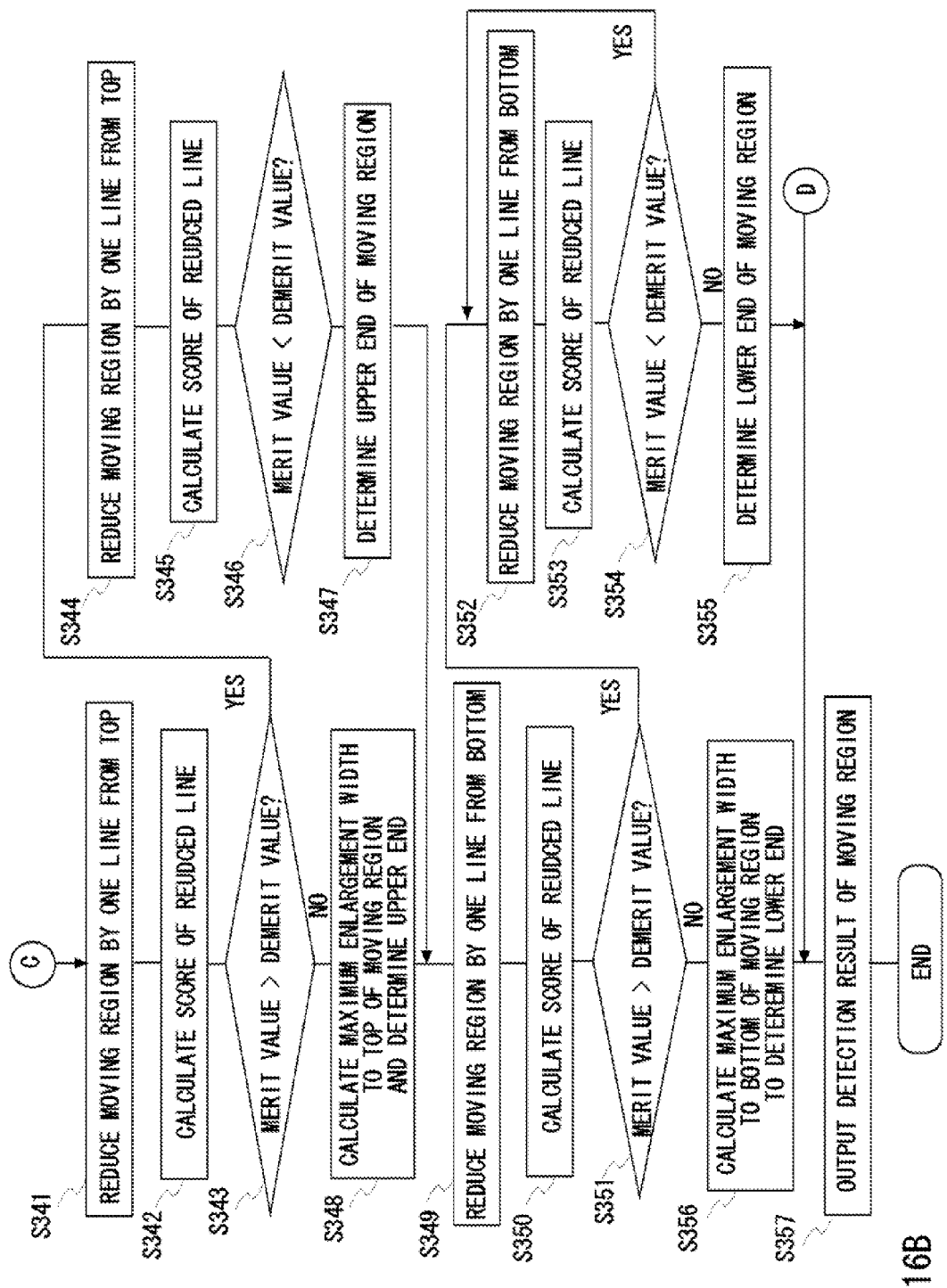
FIG. 16B is a flowchart showing the second process example of the moving region decision unit in the moving region detection unit according to the first exemplary embodiment.

FIGS. 16A and 16B each show a process example of Example 2 of the moving region decision unit 302. Example 2 differs from Example 1 in the following respects. In Example 1, only the moving regions larger than the initial candidate are searched. Meanwhile, in Example 2, considering the possibility that the moving region is excessively detected as a region larger than the true moving region, the possibility of a reduction of the region is first determined for each side, and with respect to the side where the moving region is not excessively detected, the region is enlarged in a similar manner as in Example 1.

First, the moving region decision unit 302 determines the validity of the moving region of the initial candidate by a method similar to that for Example 1 (steps S331 and S332). When the initial candidate for the moving region is discarded (NO in step S332), the detection of the moving region is not carried out in this example, as with Example 1, and a detection result indicating that the detection of the moving region is unsuccessful is recorded in the word area 113 (step S357), thereby completing the process shown in FIGS. 16A and 1613.

On the other hand, when the initial candidate for the moving region is adopted (YES in step S332), it is checked whether the region can be further reduced from left, right, top, and bottom or whether the region can be enlarged to left, right, top, and bottom, by the following procedure.

Figure 17:
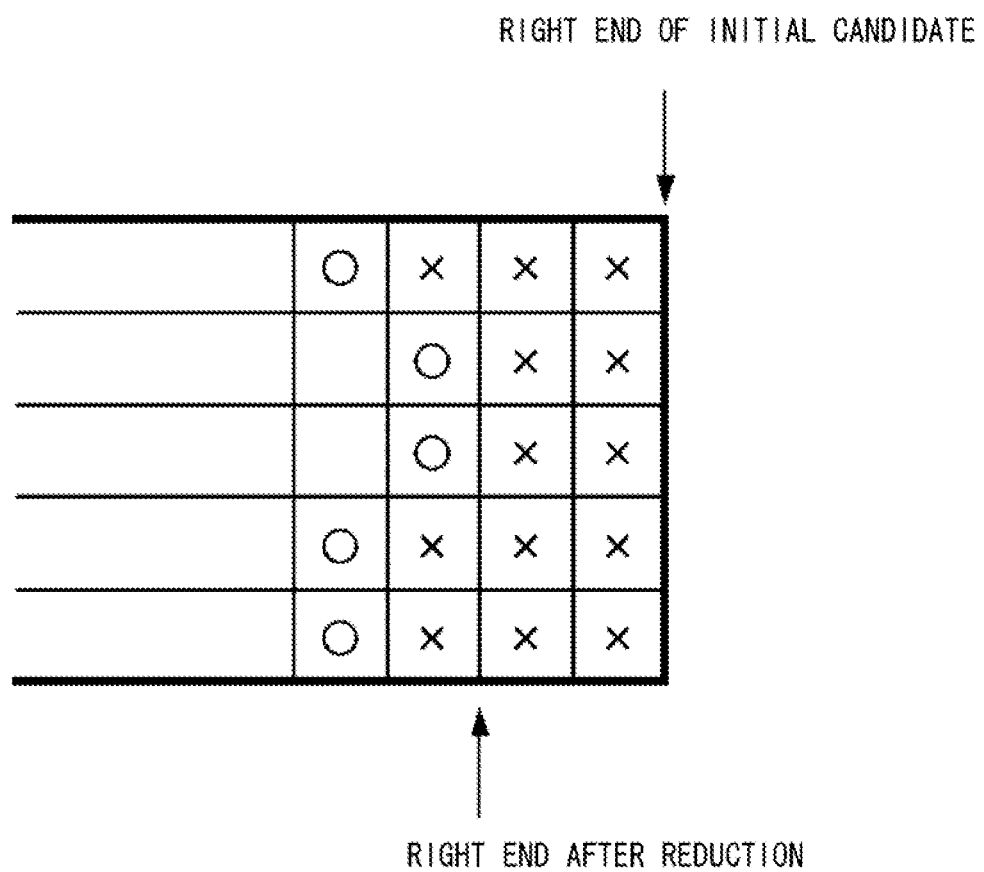
FIG. 17 is an explanatory diagram showing a method for deciding a reduction width from the right of a moving region in the moving region detection unit according to the first exemplary embodiment.

First, the moving region decision unit 302 calculates a maximum reduction width from the right of the moving region of the initial candidate (step S333). Specifically, with respect to each line of the moving region, the number of continuous pixels where "pixel value after motion compensation" does not match "true pixel value" (the difference is equal to or larger than the threshold) when the region is reduced from right is checked, and the right end is determined assuming that the minimum value of the number of continuous pixels is the maximum reduction width. As shown in FIG. 17, for example, when the right end of the initial candidate is reduced from right, assuming that three pixels are continuous at the first, fourth, and fifth lines and two pixels are continuous at all the remaining lines and that "pixel value after motion compensation" does not match "true pixel value" in each pixel, the maximum reduction width from the right corresponds to two pixels which are the minimum value of the number of continuous pixels.

Then, the moving region decision unit 302 determines whether the maximum reduction width is 0 or not (step S334). If the maximum reduction width is not 0, as shown in FIG. 17, for example, the point at which the initial candidate is reduced by the maximum reduction width from the right end is determined as the right end of the moving region (step S335). If the maximum reduction width is 0, the maximum enlargement width to the right of the moving region is calculated by a method similar to that for Example 1, thereby determining the right end (step S336).

Then, the moving region decision unit 302 calculates a maximum reduction width from the left end of the initial region in a similar manner as that for the right end (step S337). If the maximum reduction width is not 0, the left end is determined based on the maximum reduction width (steps S338 and 339). If the maximum reduction width is 0, the maximum enlargement width from the left end is calculated by a method similar to that for Example 1, thereby determining the left end (step S340).

Then, the moving region decision unit 302 reduces the moving region from the top by one line, and calculates the merit value and the demerit value upon reduction by one line, by a method similar to that for the processes (a) and (b) described above (steps S341 and S342). If the merit value is smaller than the demerit value (YES in step S343), a similar reduction process is repeated for a subsequent line (steps S344 to S346). Then, when it is detected that the merit value is not smaller than the demerit value, the upper end of the moving region before reduction by one line is determined as the upper end thereof (step S347). Meanwhile, when it is determined that the merit value is not smaller than the demerit value in step S343, the maximum enlargement width to the top of the moving region is calculated by a method similar to that for Example 1, thereby determining the upper end (step S348).

Then, the moving region decision unit 302 carries out a similar process for reducing the moving region from the bottom in a similar manner as that from the top (steps S349 to S356).

Lastly, the moving region decision unit 302 records, in the work area 113, the detection result including the coordinate information on the moving region whose left, right, upper, and lower ends are determined (step S357), and the process shown in FIGS. 16A and 16B is completed.

Here, different methods are used for the reduction from the left and right of the moving region and the reduction from the top and bottom thereof. This is because a memory access to pixels on different lines takes time, while a memory access to multiple pixels on the same line can be made rapidly. In other words, this is because when the reduction to the left and right is performed column by column in a similar manner as the reduction to the top and bottom, a memory access to all lines of the moving region is required even in the case of reduction by one column. However, under such circumstances that the memory access time does not pose a problem, the reduction from the left and right of the moving region may be performed by the same method as that for the reduction from the top and bottom thereof. On the contrary, the reduction from the top and bottom of the moving region may be performed by a simple method used for the reduction from the left and right thereof.

Example 2 of the moving region decision unit 302 can quantitatively determine the validity of the initial candidate decided by the initial candidate decision unit 301. This makes it possible to prevent motion compensation using an inappropriate moving region. Further, the reduction from left, right, top, and bottom is tried when the initial candidate is valid. Accordingly, if the moving region of the initial candidate is excessively detected as a region larger than the true moving region, the amount of excessively detected region can be reduced. Furthermore, with respect to the side where there is no possibility of excessive detection, the moving region can be enlarged to a larger size at which the effect of reducing the amount of code is large.

(C) Example 3 of the Moving Region Decision Unit 302

Figure 18:
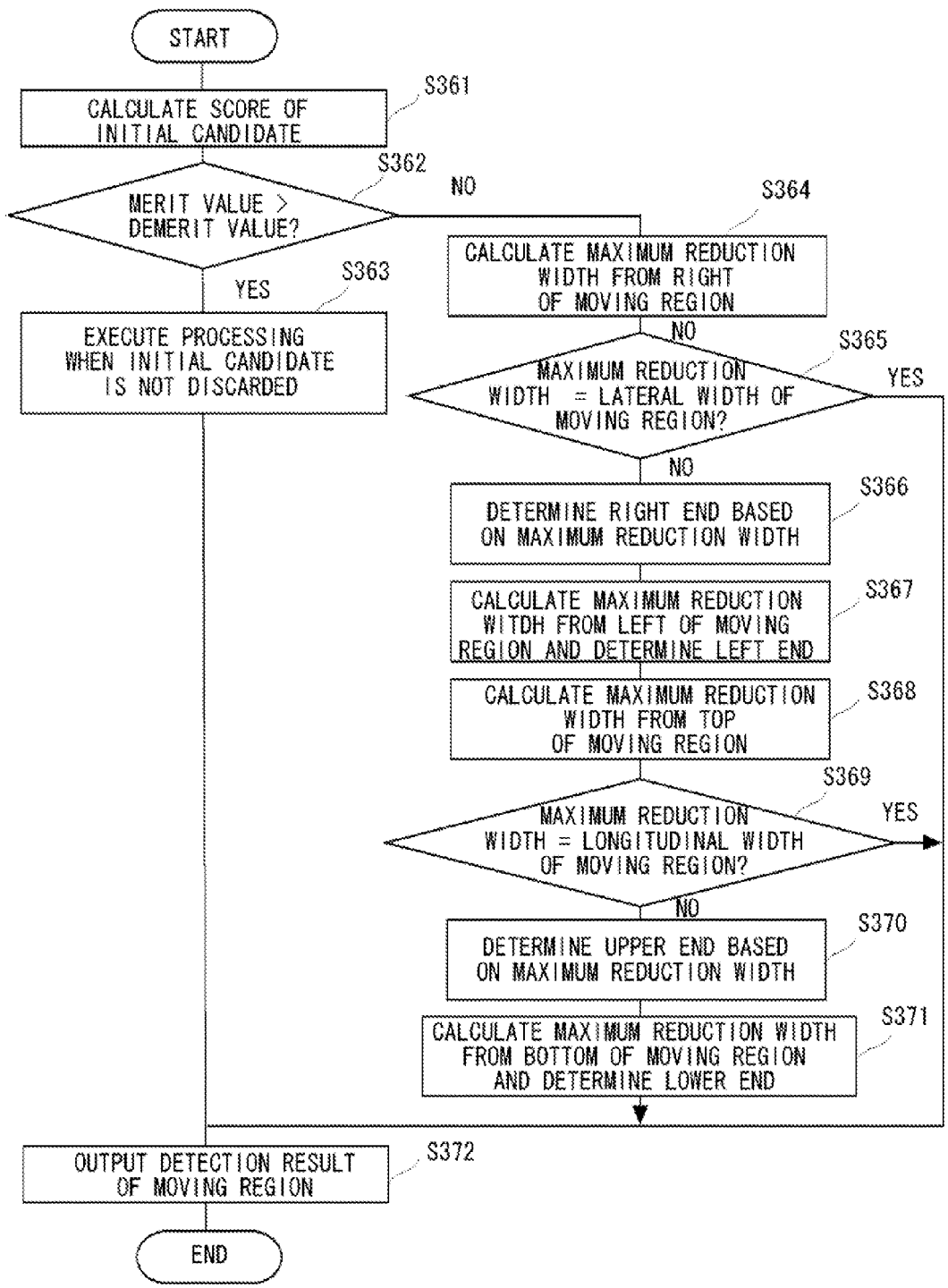
FIG. 18 is a flowchart showing a third process example of the moving region decision unit in the moving region detection unit according to the first exemplary embodiment.

FIG. 18 shows a process example of Example 3 of the moving region decision unit 302. Example 3 differs from Example 2 in the following respects. In Example 2, the detection of the moving region is not carried out when the merit value calculated for the initial candidate is smaller than the demerit value. Meanwhile, in Example 3, considering the possibility that the moving region is excessively detected as a region much larger than the true moving region, the possibility of a reduction of the region for each side is determined.

First, the moving region decision unit 302 determines the validity of the moving region of the initial candidate by a method similar to that for Example 2 (steps S361 and S362). The process step S363 executed when the initial candidate for the moving region is not discarded (YES in step S362) is the same as steps S333 to S356 for Example 2.

On the other hand, when the initial candidate for the moving region is discarded (NO in step S362), it is checked whether the region can be further reduced from left, right, top, and bottom, by the following procedure.

First, the moving region decision unit 302 calculates the maximum reduction width from the right of the moving region of the initial candidate by a method similar to that for Example 2 (step S364). Next, the moving region decision unit 302 determines whether the maximum reduction width is equal to the lateral width of the moving region (step S365). If the maximum reduction width is equal to the lateral width of the moving region, it is determined that the detection of the moving region is unsuccessful, and the detection result to that effect is generated (YES in steps S365 and S372). Thus, the process shown in FIG. 18 is completed. If the maximum reduction width is not equal to the lateral width of the moving region, a point where the initial candidate is reduced from the right end by the maximum reduction width is determined as the right end of the moving region (step S366).

Then, the moving region decision unit 302 calculates the maximum reduction width from the left end of the initial region in a similar manner as that for the right end, thereby determining the left end (step S367).

Then, the moving region decision unit 302 calculates the maximum reduction width from the top of the moving region in a similar manner as that for Example 2 (step S368). If the maximum reduction width is equal to the longitudinal width of the moving region, it is determined that the detection of a moving region is unsuccessful, and the detection result to that effect is generated (YES in step S369, step S372). Thus, the process shown in FIG. 18 is completed. If the maximum reduction width is not equal to the longitudinal width of the moving region, the upper end of the moving region is determined based on the maximum reduction width (step S370).

Then, the moving region decision unit 302 calculates the maximum reduction width from the bottom of the moving region in a similar manner as that from the top, thereby determining the lower end (step S371).

Lastly, the moving region decision unit 302 records, in the work area 113, the detection result including the coordinate information on the moving region whose left, right, upper, and lower ends are determined (step S372), and the process shown in FIG. 18 is completed.

Example 3 of the moving region decision unit 302 can quantitatively determine the validity of the initial candidate decided by the initial candidate decision unit 301. This makes it possible to prevent motion compensation using an inappropriate moving region. The possibility of a reduction is explored even when the initial candidate is discarded. Accordingly, the moving region can be detected as much as possible even if the moving region of the initial candidate is excessively detected as a region much larger than the true moving region. Furthermore, as with Example 2, the reduction from left, right, top, and bottom is tried when the initial candidate is valid. Accordingly, if the moving region of the initial candidate is excessively detected as a region larger than the true moving region, the amount of excessively detected region can be reduced. Similarly, with respect to the side where there is no possibility of excessive detection, the moving region can be enlarged to a larger size at which the effect of reducing the amount of code is large.

(D) Example 4 of the Moving Region Decision Unit 302

Figure 19A:
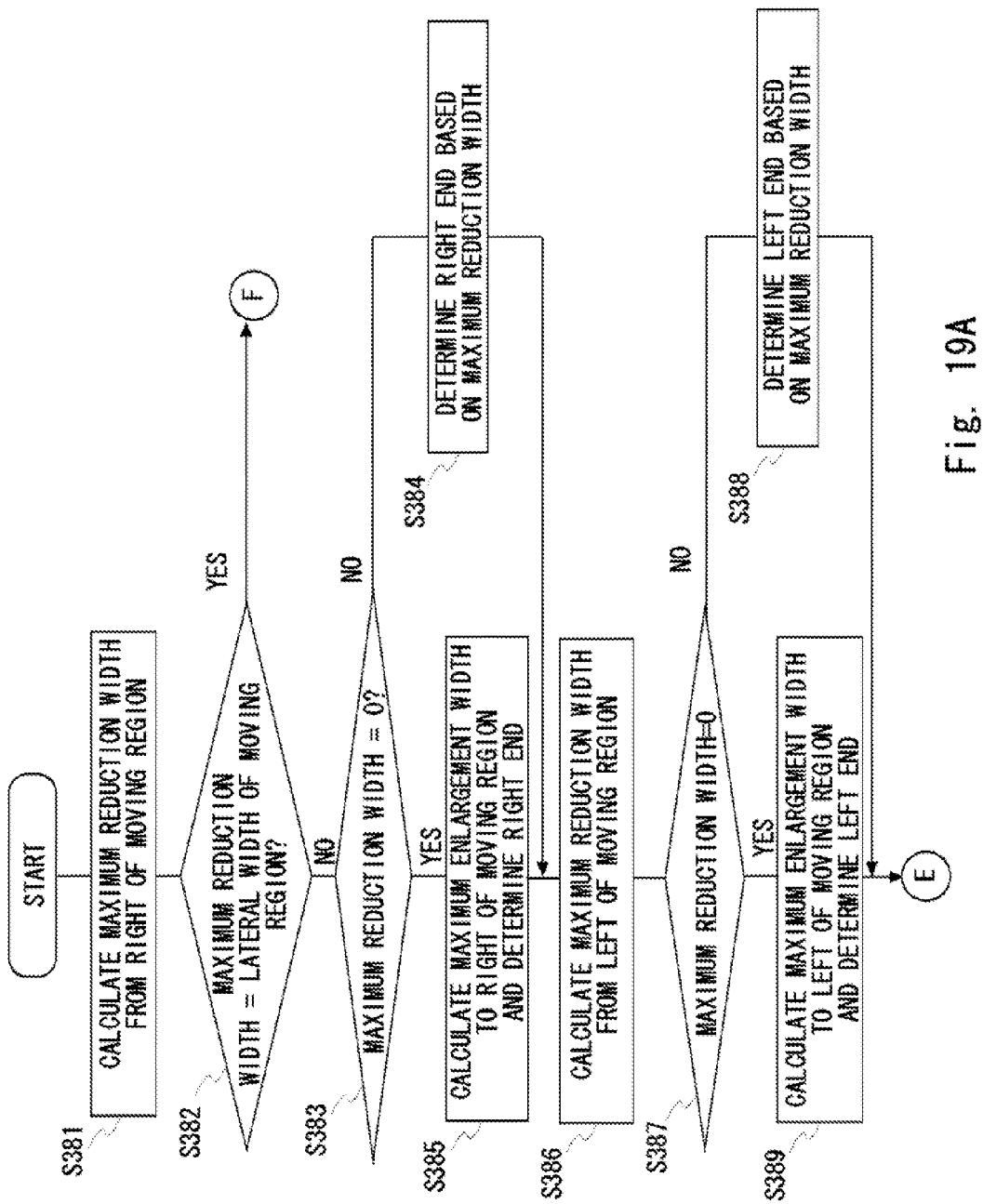
FIG. 19A is a flowchart showing a fourth process example of the moving region decision unit in the moving region detection unit according to the first exemplary embodiment.
Figure 19B:
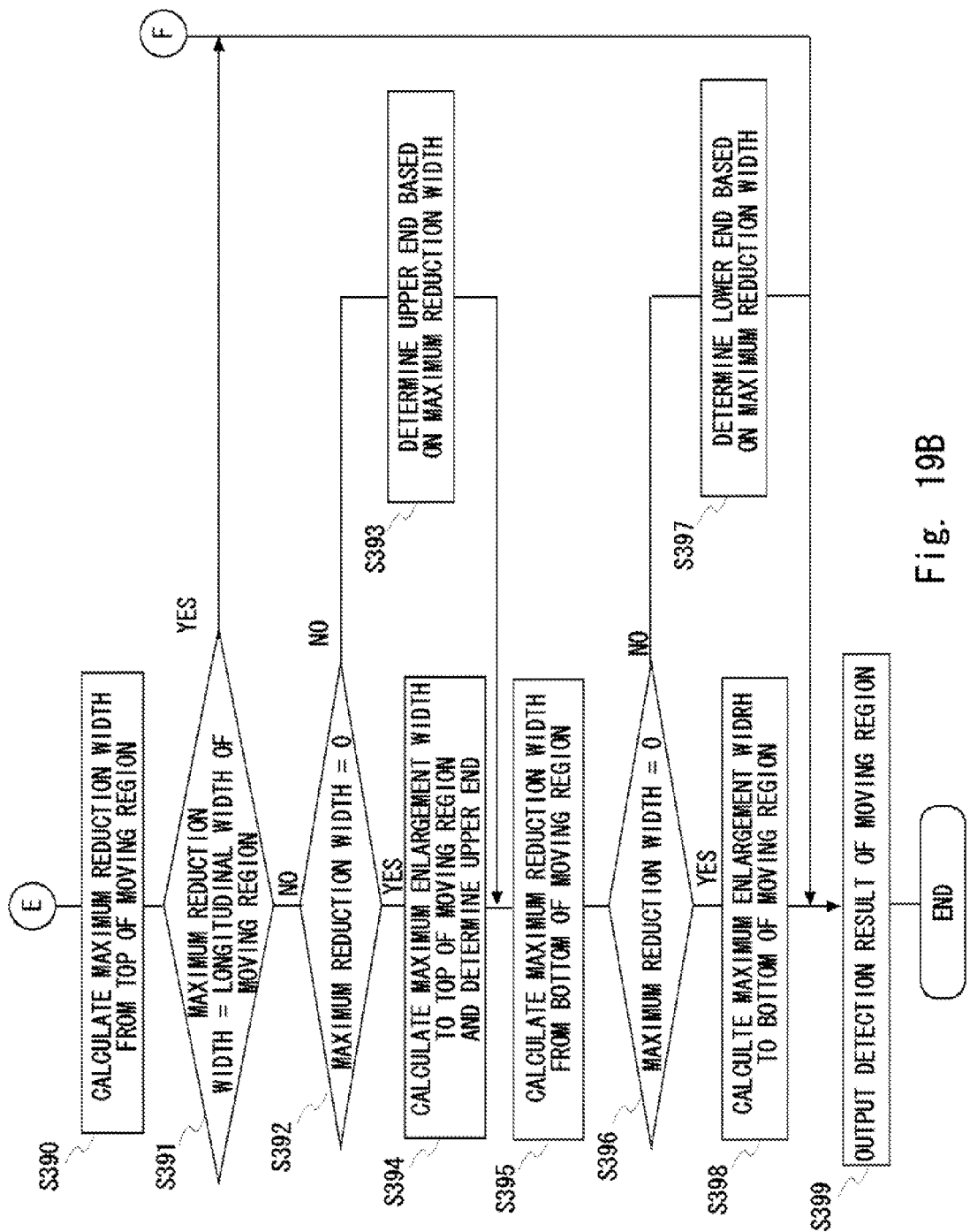
FIG. 19B is a flowchart showing the fourth process example of the moving region decision unit in the moving region detection unit according to the first exemplary embodiment.

FIGS. 19A and 19B each show a process example of Example 4 of the moving region decision unit 302. Example 4 differs from Example 2 in the following respects. In Example 2, the validity of the initial candidate is determined, and when it is determined to be valid, the reduction and enlargement of the moving region is tried. Meanwhile, in Example 4, determination as to the validity of the initial candidate is omitted, and the reduction or enlargement of the initial candidate is tried.

First, the moving region decision unit 302 calculates the maximum reduction width from the right of the moving region of the initial candidate by a method similar to that for Example 2 (step S381). Next, the moving region decision unit 302 determines whether the maximum reduction width is equal to the lateral width of the moving region (step S382). If the maximum reduction width is equal to the lateral width of the moving region (YES in step S382), it is determined that the detection of the moving region is unsuccessful, and the detection result to that effect is generated (step S399). Thus, the process shown in FIGS. 19A and 19B is completed.

If the maximum reduction width is not equal to the lateral width of the moving region (NO in step S382), the moving region decision unit 302 determines whether the maximum reduction width is 0 or not (step S383). If it is not 0, a point where the initial candidate is reduced from the right end by the maximum reduction width is determined as the right end of the moving region (step S384). If the maximum reduction width is 0, the moving region decision unit 302 calculates the maximum enlargement width to the right by a method similar to that for Example 2, thereby determining the right end (step S385).

Then, the moving region decision unit 302 calculates the maximum reduction width from the left of the moving region of the initial candidate by a method similar to that for Example 2 (step S386). If the maximum reduction width is not 0 (NO in step S387), a point where the initial candidate is reduced from the left end by the maximum reduction width is determined as the left end of the moving region (step S388). If the maximum reduction width is 0, the moving region decision unit 302 calculates the maximum enlargement width to the left by a method similar to that for Example 2, thereby determining the left end (step S389).

Then, the moving region decision unit 302 calculates the maximum reduction width from the top of the moving region, by a method similar to that for Example 2 (step S390). If the maximum reduction width is equal to the longitudinal width of the moving region, it is determined that the detection of the moving region is unsuccessful, and the detection result to that effect is generated (YES in step S391, S399). Thus, the process shown in FIGS. 19A and 19B is completed. If the maximum reduction width is not equal to the longitudinal width of the moving region, it is determined that the maximum reduction width is 1 or not (NO in step S391, step S392). If it is not 0, a point where the initial candidate is reduced from the upper end by the maximum reduction width is determined as the upper end of the moving region (step S393). If the maximum reduction width is 0, the moving region decision unit 302 calculates the maximum enlargement width to the top, by a method similar to that for Example 2, thereby determining the upper end (step S394).

Then, the moving region decision unit 302 calculates the maximum reduction width from the bottom of the moving region, by a method similar to that for Example 2 (step S395). If it is not 0, a point where the initial candidate is reduced from the lower end by the maximum reduction width is determined as the lower end of the moving region (NO in step S396, S397). If the maximum reduction width is 0, the moving region decision unit 302 calculates the maximum enlargement width to the bottom, by a method similar to that for Example 2, thereby determining the lower end (step S398).

Lastly, the moving region decision unit 302 records, in the work area 113, the detection result including the coordinate information on the moving region whose left, right, upper, and lower ends are determined (step S399). Thus, the process shown in FIGS. 19A and 19B is completed.

Example 4 of the moving region decision unit 302 does not quantitatively determine the validity of the initial candidate decided by the initial candidate decision unit 301. Therefore, the amount of processing can be reduced. Further, because the reduction from left, right, top, and bottom is tried, if the moving region of the initial candidate is excessively detected as a region larger than the true moving region, the amount of excessively detected region can be reduced. Similarly, with respect to the side where there is no possibility of excessive detection, the moving region can be enlarged to a larger size at which the effect of reducing the amount of code is large. However, since the validity of the moving region of the initial candidate is not determined, there is a possibility that a region where a doughnut-shaped hole portion before movement is completely different from that after movement, for example, is detected as a moving region.

(3) The Update Region Detection Area Setting Unit 124

Figure 20:
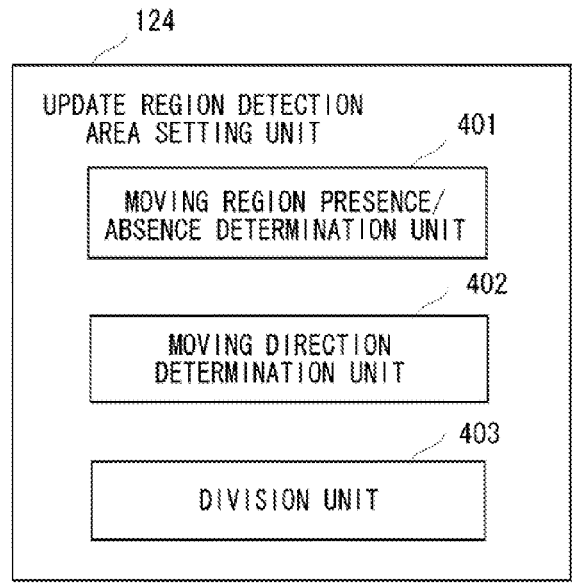
FIG. 20 is a block diagram of an update region detection area setting unit according to the first exemplary embodiment.

Referring to FIG. 20, the update region detection area setting unit 124 of the first exemplary embodiment includes a moving region presence/absence determination unit 401, a moving direction determination unit 402, and a division unit 403. Each unit has functions as outlined below.

The moving region presence/absence determination unit 401 has a function of determining whether the moving region detection unit 122 has detected a moving region.

The moving direction determination unit 402 has a function of determining a moving direction of the moving region detected by the moving region detection unit 122.

The division unit 403 has a function of determining the necessity of screen division and setting the update region detection area by screen division, according to the determination results of the moving region presence/absence determination unit 401 and the moving direction determination unit 402.

Next, a first process example of the update region detection area setting unit 124 of this exemplary embodiment will be described.

Figure 21:
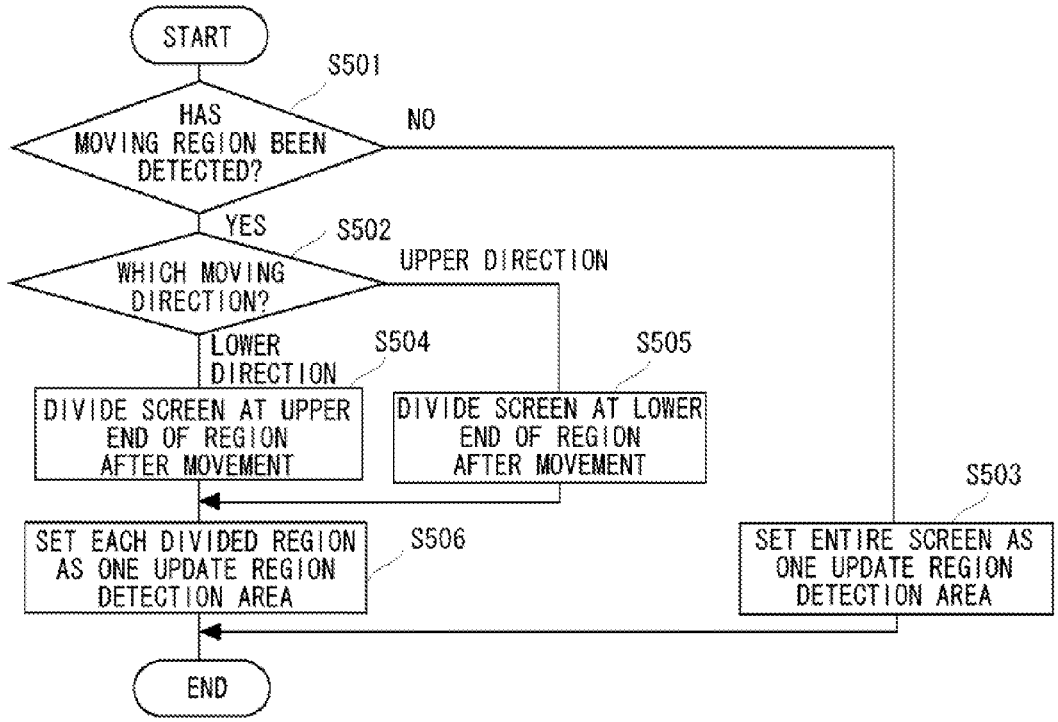
FIG. 21 is a flowchart showing a first process example of the update region detection area setting unit according to the first exemplary embodiment.

The moving region presence/absence determination unit 401 of the update region detection area setting unit 124 reads out the detection result of the moving region detection unit 122 from the work area 113 and analyzes it to determine whether a moving region has been detected, and then notifies the moving direction determination unit 402 and the division unit 403 of the determination result (step S501 in FIG. 21).

The moving direction determination unit 402 determines a moving direction (step S502). Specifically, the moving direction determination unit 402 first receives from the moving region presence/absence determination unit 401 a notification indicating that a moving region has been detected. Next, the moving direction determination unit 402 determines which one of a direction containing a component directing from top to bottom of the screen (hereinafter, referred to as "lower direction") and a direction containing a component directing from bottom to top of the screen (hereinafter, referred to as "upper direction") is coincident with a moving direction for comparing the coordinate of the moving region before movement and the coordinate of the moving direction after movement, which are included in the detection result of the moving region detection unit 122 read out from the work area 113. Then, the moving direction determination unit 402 notifies the division unit 403 of the determination result. The determination result includes not only the moving direction but also the coordinate of the upper end of the moving region after movement in the case of the lower direction, or the coordinate of the lower end of the moving region after movement in the case of the upper direction. Note that cases for directions other than the lower and upper directions, i.e., left and right directions, may be included in either case of the lower and upper directions.

Upon receiving from the moving region presence/absence determination unit 401 a notification indicating that no moving region has been detected, the division unit 403 sets the entire screen as one update region detection area (step S503). Further, upon receiving from the moving region presence/absence determination unit 401 a notification that a moving region has been detected, the screen is divided according to the notification from the moving direction determination unit 402 (steps S504 to S506). Specifically, when the moving direction is coincident with the lower direction, the screen is divided into two regions at the upper end of the moving region after movement, and each divided region is set as one update region detection area. Further, if the moving direction is coincident with the upper direction, the screen is divided into two regions at the lower end of the moving region after movement, and each divided region is set as one update region detection area. After that, the update region detection unit 125 carries out detection of an update region in each update region detection area.

Advantageous effects of the first process example of the update region detection area setting unit 124 will be described. Although a case where the moving direction is coincident with the lower direction is described below, the same effects can be obtained also in the case of the upper direction. In the figures for illustrating the effects hereinafter, each shaded portion indicates a difference pixel. Also, in the figures for illustrating the effects hereinafter, identical elements are denoted by identical reference numerals, and a duplicate description thereof is omitted.

Figure 22:
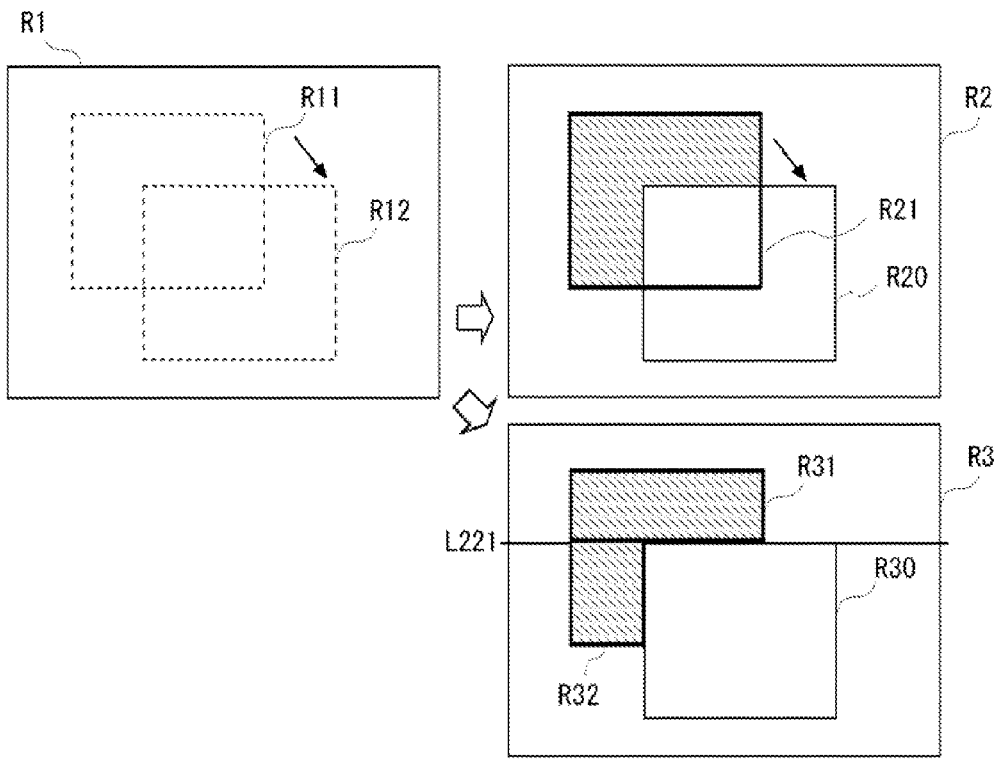
FIG. 22 is an explanatory diagram showing an effect of the first process example of the update region detection area setting unit according to the first exemplary embodiment.

The upper left of FIG. 22 shows a movement from a moving region R11 to a moving region R12 on a screen R1, i.e., shows that the moving region is moved in the lower direction. The upper right of FIG. 22 shows a case where the entirety of a screen R2 is set as an update region detection area. At this time, the entirety of a region corresponding to a moving region R21 before movement is detected as an update region. A moving region R20 after detection is not detected. The lower right of FIG. 22 according to this example shows that a screen R3 is divided into two regions by a partition line L221 at the upper end of a moving region R30 after movement. Update regions R31 and R32 are detected in each update region detection area. This makes it possible to minimize the total area of the update regions and reduce the amount of code.

Next, a second process example of the update region detection area setting unit 124 of this exemplary embodiment will be described.

Figure 23:
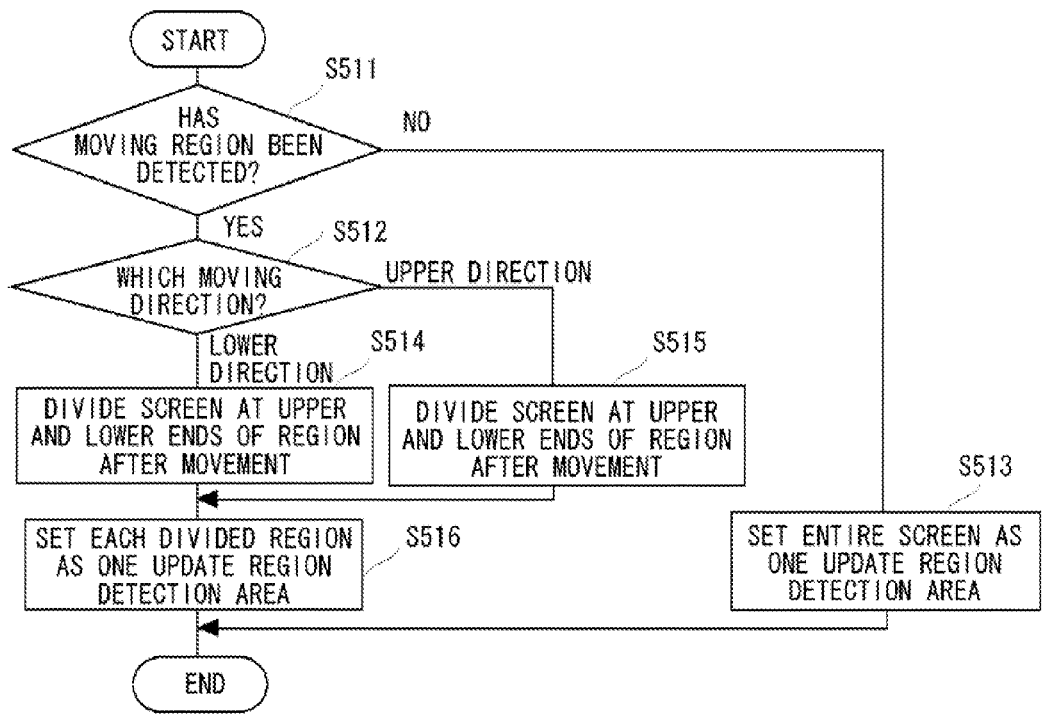
FIG. 23 is a flowchart showing a second process example of the update region detection area setting unit according to the first exemplary embodiment.

The moving region presence/absence determination unit 401 of the update region detection area setting unit 124 determines whether a moving region has been detected, and notifies the moving direction determination unit 402 and the division unit 403 of the determination result, as with the first process example (step S511 in FIG. 23).

As with the first process example, upon receiving from the moving region presence/absence determination unit 401 the notification indicating that a moving region has been detected, the moving direction determination unit 402 determines which one of the lower and upper directions is coincident with the moving direction, and notifies the division unit 403 of the determination result (step S512). The determination result includes not only the moving direction but also the coordinates of the upper and lower ends of the moving region after movement when the moving direction is coincident with the lower direction or the upper direction.

Upon receiving from the moving region presence/absence determination unit 401 the notification indicating that no moving region has been detected, the division unit 403 sets the entire screen as one update region detection area, as with the first process example (step S513). Further, upon receiving from the moving region presence/absence determination unit 401 the notification indicating that a moving region has been detected, the screen is divided according to the notification from the moving direction determination unit 402 (step S514 to S516). Specifically, when the moving direction is coincident with the lower direction or the upper direction, the screen is divided into three regions at the upper and lower ends of the moving region after movement, and each divided region is set as one update region detection area. After that, the update region detection unit 125 carries out detection of an update region in each update region detection area.

Next, advantageous effects of this process example of the update region detection area setting unit 124 will be described. Although the case where the moving direction is coincident with the lower direction is described below, the same effects can be obtained also in the case of the upper direction.

Figure 24:
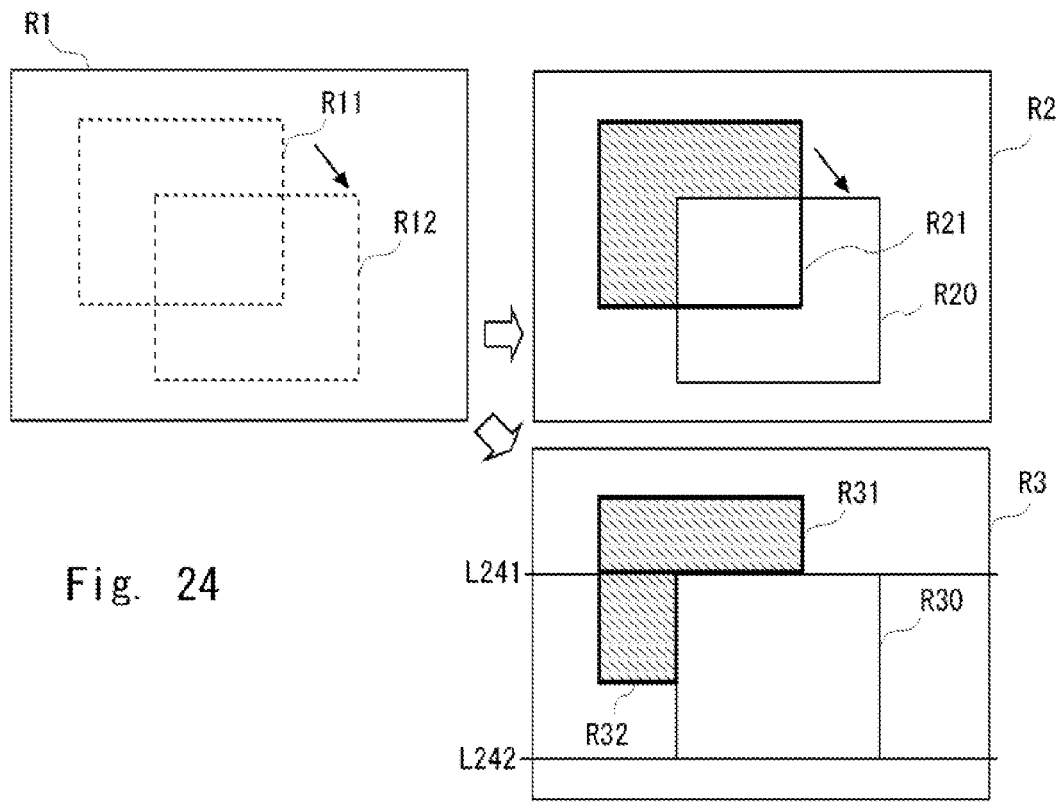
FIG. 24 is an explanatory diagram showing an effect of the second process example of the update region detection area setting unit according to the first exemplary embodiment.

The upper left and upper right of FIG. 24 are similar to the upper left and upper right of FIG. 22. Meanwhile, the lower right of FIG. 24 according to this example shows that the screen R3 is divided into three regions by partition lines L241 and L242 at the upper and lower ends of the moving region R30 after movement, and the update regions R31 and R32 are detected in each update region detection area. This makes it possible to minimize the total area of the update regions and reduce the amount of code.

Figure 25:
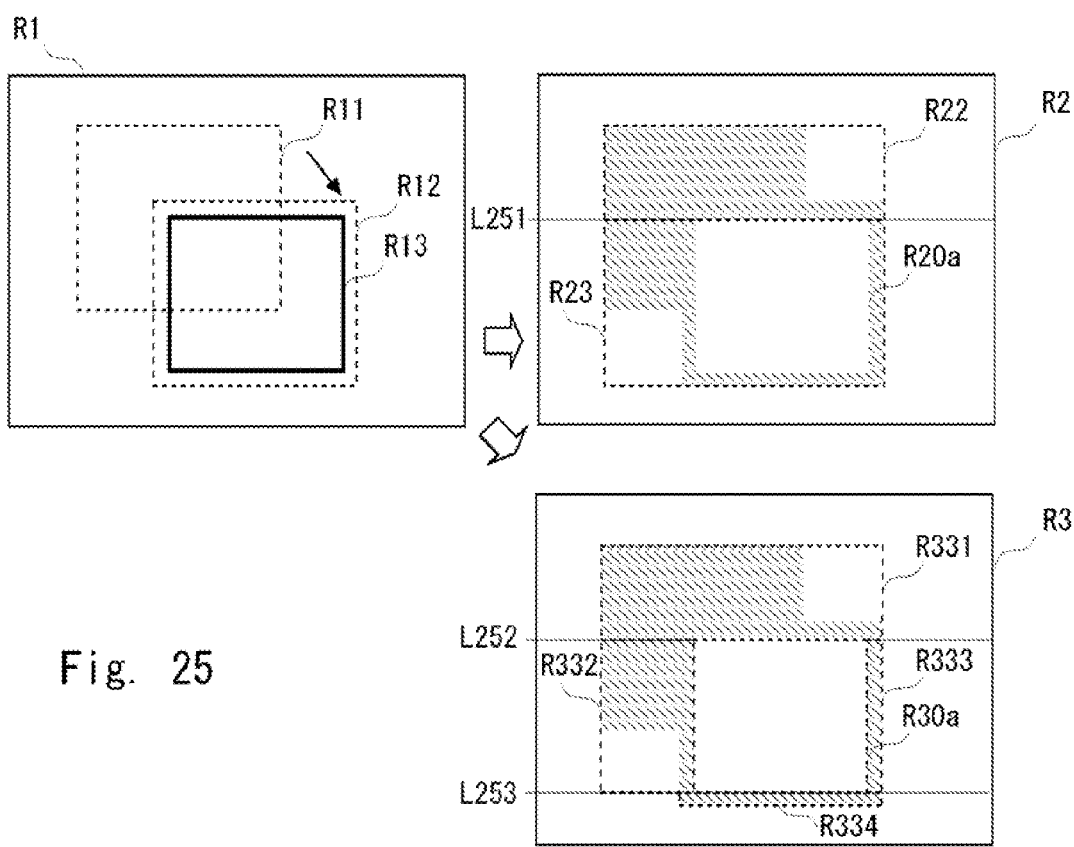
FIG. 25 is an explanatory diagram showing an effect of the second process example of the update region detection area setting unit according to the first exemplary embodiment.

The upper left of FIG. 25 shows a case where a moving region R13 detected on the screen R1 is smaller than the actual moving region R12. The upper right of FIG. 25 shows a case where the first process example of FIG. 21 is applied and the screen R2 is divided into two regions only at the upper end after movement by a partition line L251. In this case, a moving region R20a detected as shown in the upper right of FIG. 25 is included, resulting in detection of wastefully large update regions R22 and R23. Meanwhile, the lower right of FIG. 25 according to this example shows that the screen R3 is divided into three regions at the upper and lower ends of a moving region R30a after movement by partition lines L252 and L253, and update regions R331, R332, R333, and R334 are detected in each update region detection area. This makes it possible to reduce the total area of the update regions and reduce the amount of code by just that much.

Next, a third process example of the update region detection area setting unit 124 of this exemplary embodiment will be described.

Figure 26:
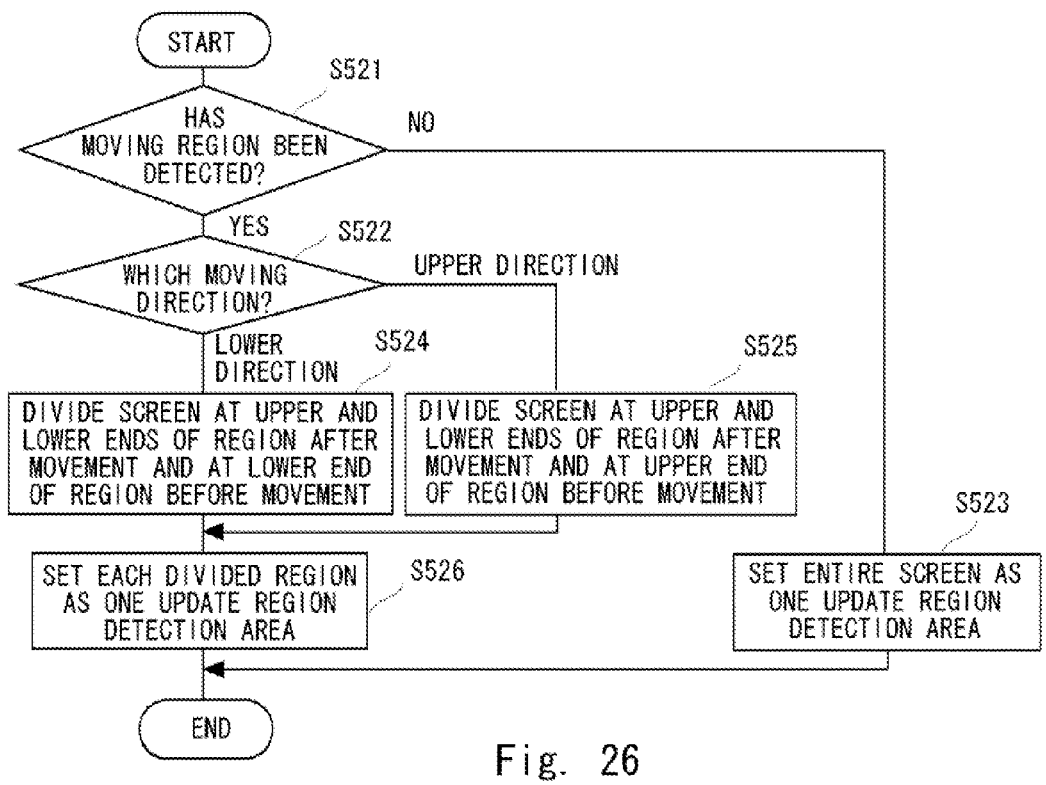
FIG. 26 is a flowchart showing a third process example of the update region detection area setting unit according to the first exemplary embodiment.

The moving region presence/absence determination unit 401 of the update region detection area setting unit 124 determines whether a moving region has been detected, and notifies the moving direction determination unit 402 and the division unit 403 of the determination result, as with the second process example (step S521 in FIG. 26).

As with the second process example, upon receiving from the moving region presence/absence determination unit 401 the notification indicating that a moving region has been detect, the moving direction determination unit 402 determines which one of the lower and upper directions is coincident with the moving direction, and notifies the division unit 403 of the determination result (step S522). The determination result includes not only the moving direction but also the coordinates of the upper and lower ends of the moving region after movement and the coordinate of the lower end of the moving region after movement when the moving direction is coincident with the lower direction, or the coordinates of the upper and lower ends of the moving region after movement and the coordinate of the upper end of the moving region before movement when the moving direction is coincident with the upper direction.

Upon receiving from the moving region presence/absence determination unit 401 the notification indicating that no moving region has been detected, the division unit 403 sets the entire screen as one update region detection area, as with the second process example (step S523). Further, upon receiving from the moving region presence/absence determination unit 401 the notification indicating that a moving region has been detected, the screen is divided according to the notification from the moving direction determination unit 402 (step S524 to S526). Specifically, when the moving direction is coincident with the lower direction, the screen is divided into four regions at the upper and lower ends of the moving region after movement and at the lower end of the moving region before movement, and each divided region is set as one update region detection area. Further, when the moving direction corresponds to the upper direction, the screen is divided into four at the upper and lower ends of the moving region after movement and at the upper end of the moving region before movement, and each divided region is set as one update region detection area. After that, the update region detection unit 125 carries out detection of an update region in each update region detection area.

Next, advantageous effects of this process example of the update region detection area setting unit 124 will be described. Although the case where the moving direction is coincident with the lower direction is described below, the same effects can be obtained also in the case of the upper direction.

Figure 27:
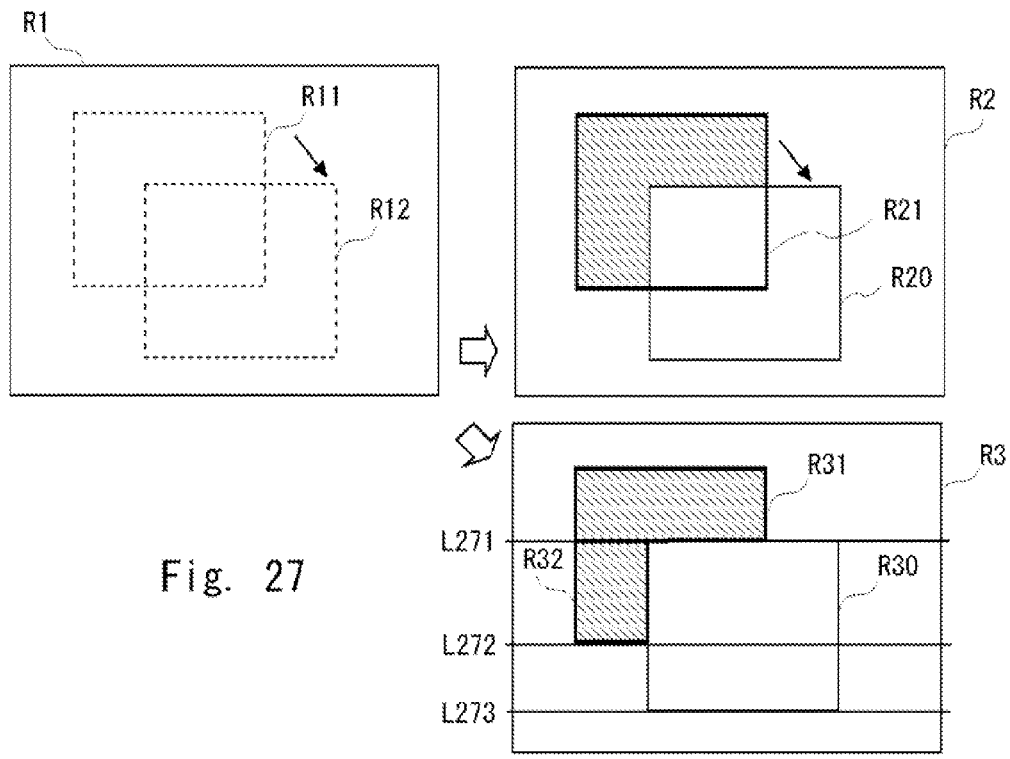
FIG. 27 is an explanatory diagram showing an effect of the third process example of the update region detection area setting unit according to the first exemplary embodiment.

The upper left and upper right of FIG. 27 are similar to the upper left and upper right of FIG. 22. Meanwhile, the lower right of FIG. 27 according to this example shows that the screen R3 is divided into four regions by partition lines L271, L272, and L273 at the upper and lower ends of the moving region R30 after movement and at the lower end of the moving region before movement, and the upper regions R31 and R32 are detected in each update region detection area. This makes it possible to minimize the total area of the update regions and reduce the amount of code.

Figure 28:
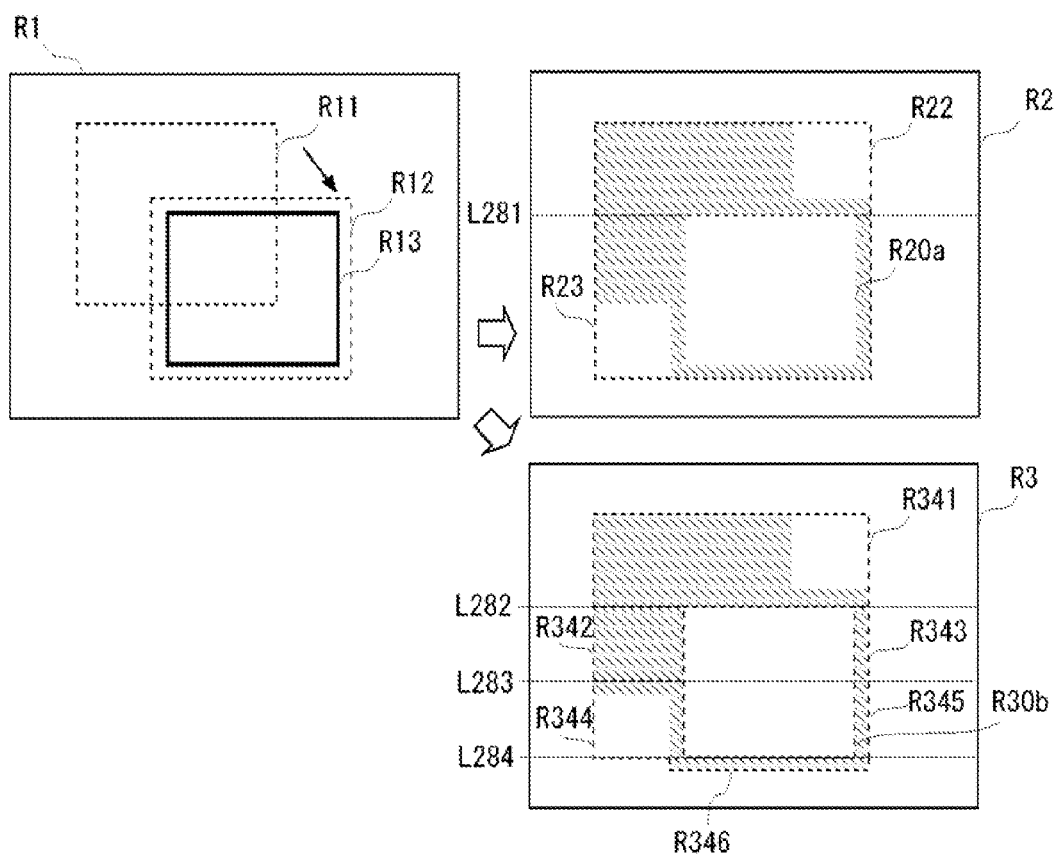
FIG. 28 is an explanatory diagram showing an effect of the third process example of the update region detection area setting unit according to the first exemplary embodiment.

Further, the upper left of FIG. 28 is similar to the upper left of FIG. 25. The upper right of FIG. 28 shows a case where the first process example of FIG. 21 is applied and the screen R2 is divided into two regions by a partition line L281 only at the upper end after movement. In this case, the moving region R20a detected as shown in the upper right of FIG. 28 is included, resulting in detection of the wastefully large update regions R22 and R23. Meanwhile, the lower right of FIG. 28 according to this example shows that the screen R3 is divided into four regions by partition lines L281, L282, and L283 at the upper and lower ends of the moving region R30*b* after movement and at the lower end of the moving region after movement and at the lower end of the moving region before movement, and the update regions is detected in each update region detection area. This makes it possible to reduce the total area of the update regions and reduce the amount of code by just that much.

Figure 29:
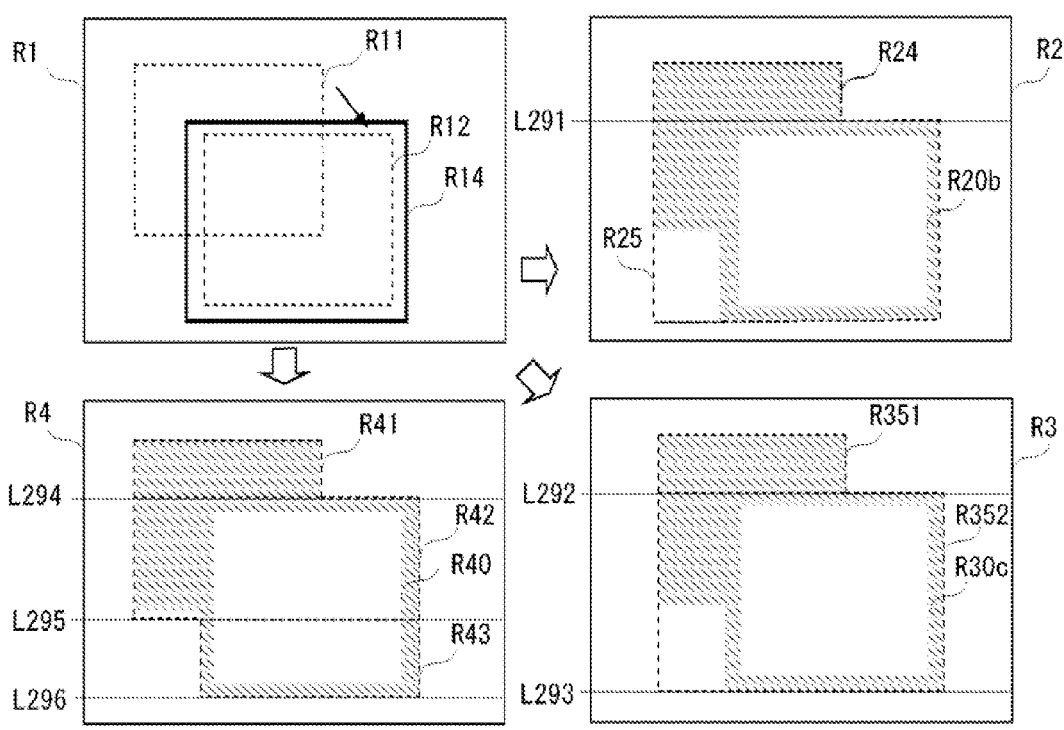
FIG. 29 is an explanatory diagram showing an effect of the third process example of the update region detection area setting unit according to the first exemplary embodiment.

Furthermore, the upper left of FIG. 29 shows a case where a moving region R14 detected on the screen R1 is larger than the actual moving region R12. The upper right of FIG. 29 shows a case where the first process example of FIG. 21 is applied and the screen R2 is divided into two regions by a partition line L291 only at the upper end after movement. In this case, as shown in the upper right of FIG. 29, a detected moving region R20*b* is included, resulting in detection of wastefully large update regions R24 and R25. The lower right of FIG. 29 shows a case where the second process example of FIG. 23 is applied and the screen R3 is divided into three regions by partition lines L292 and L293 only at the upper and lower ends of a moving region R30*c* after movement. In this case, the moving region R30*c* detected as shown in the lower right of FIG. 29 is included, resulting in detection of slightly redundant update regions R351 and R352. Meanwhile, the lower left of FIG. 29 according to this example shows that a screen R4 is divided into four regions by partition lines L294, L295, and L296 at the upper and lower ends of a moving region R40 after movement and at the lower end of the moving region before movement, and update regions R41, R42, and R43 are detected in each update region detection area. Therefore, the total area of the update regions can be reduced compared to the second process example, and the amount of code can be reduced by just that much. If the area of the excessively-detected region is not too large, there is an advantage that the number of update regions is reduced compared to the second process example.

Figure 30:
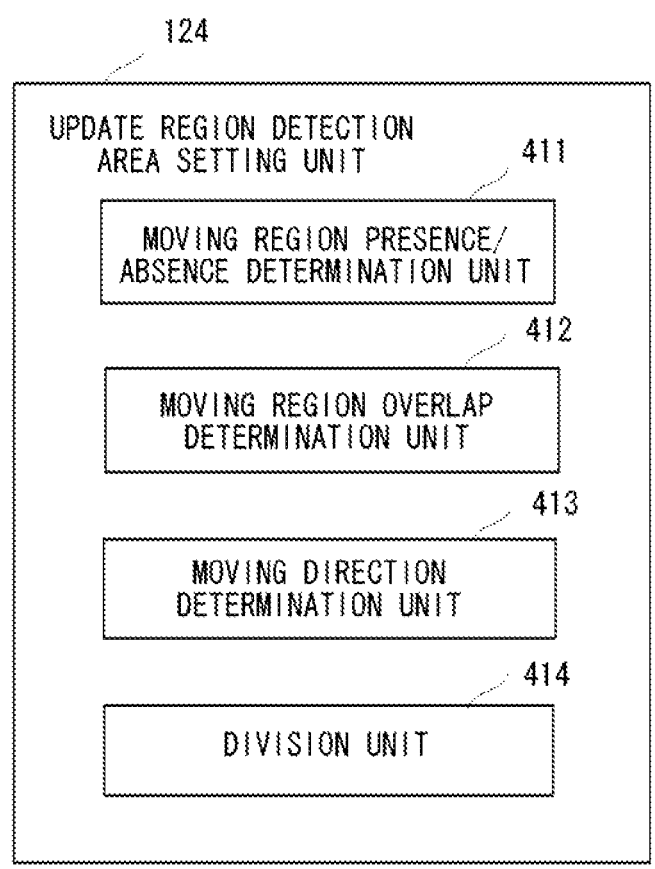
FIG. 30 is a block diagram of an update region detection area setting unit according to a second exemplary embodiment.

Referring to FIG. 30, the update region detection area setting unit 124 according to a second exemplary embodiment includes a moving region presence/absence determination unit 411, a moving region overlap determination unit 412, a moving direction determination unit 413, and a division unit 414. Each unit has functions as outlined below.

The moving region presence/absence determination unit 411 and the moving direction determination unit 413 have the same functions as those of the moving region presence/absence determination unit 401 and the moving direction determination unit 402 in the update region detection area setting unit 124 of the first exemplary embodiment.

The moving region overlap determination unit 412 has a function of determining the presence or absence of the possibility of an overlap between the moving regions before and after movement which are detected by the moving region detection unit 122.

The division unit 414 has a function of determining the necessity of screen division and setting the update region detection area by screen division, according to the determination results of the moving region presence/absence determination unit 411, the moving region overlap determination unit 412, and the moving direction determination unit 413.

Next, a process example of the update region detection area setting unit 124 of this exemplary embodiment will be described.

Figure 31:
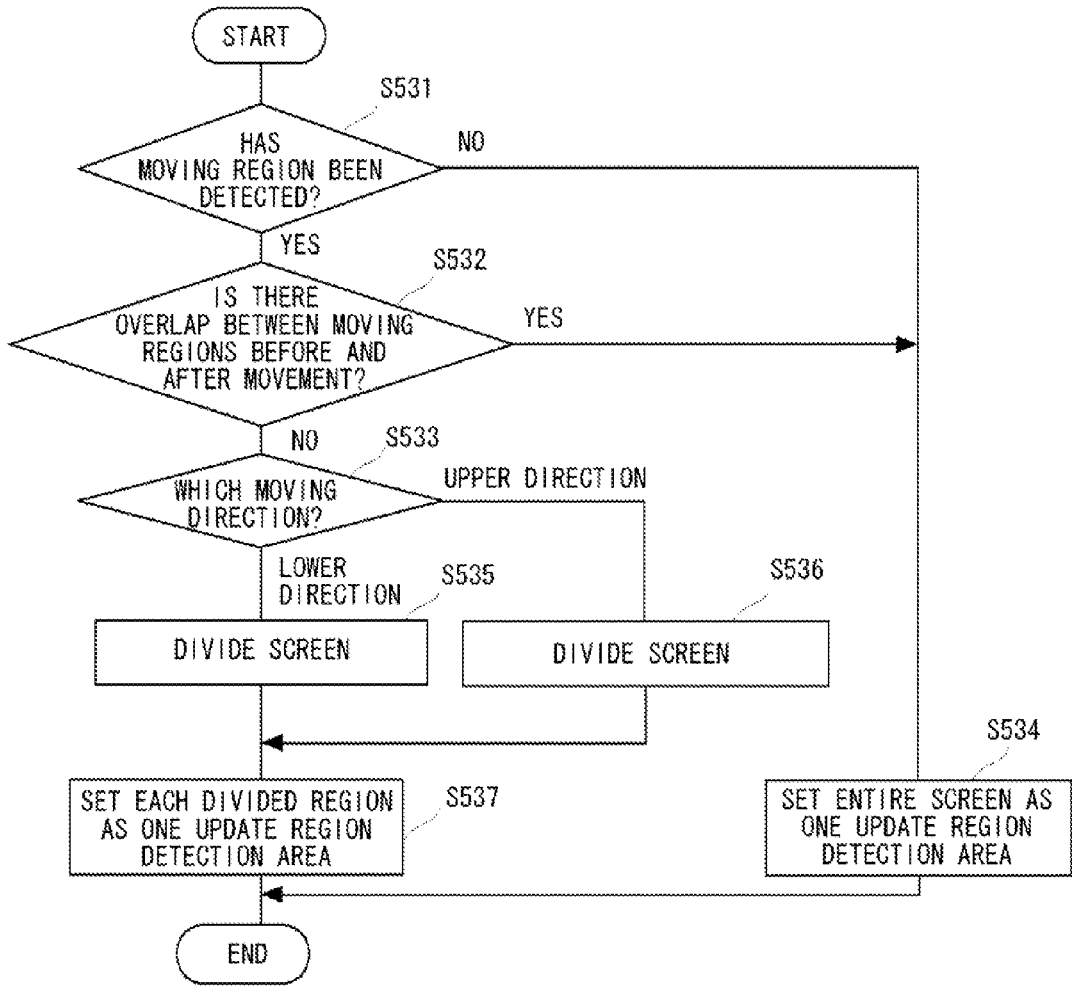
FIG. 31 is a flowchart showing a process example of the update region detection area setting unit according to the second exemplary embodiment.

As with the moving region presence/absence determination unit 401 of the first exemplary embodiment, the moving region presence/absence determination unit 411 of the update region detection area setting unit 124 determines whether a moving region has been detected, and notifies the moving region overlap determination unit 412 and the division unit 414 of the determination result (step S531 in FIG. 31).

The moving region overlap determination unit 412 determines whether the moving regions before and after movement overlap each other (step S532). Specifically, the moving region overlap determination unit 412 first receives from the moving region presence/absence determination unit 401 a notification indicating that a moving region has been detected. Next, the moving region overlap determination unit 412 reads out from the work area 113 the coordinate of the moving region before movement and the coordinate of the moving region after movement, which are included in the detection result of the moving region detection unit 122. Then, the moving region overlap determination unit 412 checks whether a region obtained by enlarging the moving region before movement upward, downward, leftward, and rightward by a predetermined width $\Delta$ and a region obtained by enlarging the moving region after movement upward, downward, leftward, and rightward by the predetermined width $\Delta$ overlap each other at least partially. After that, the moving region overlap determination unit 412 notifies the moving direction determination unit 413 and the division unit 414 of the determination result indicating that there is an overlap between the moving regions when the moving regions overlap each other, and of the determination result indicating that there is no overlap between the moving regions when the moving regions do not overlap each other. Here, the predetermined width $\Delta$ is set in advance according to the degree at which insufficient detection of the moving region occurs.

The moving direction determination unit 413 determines a moving direction (step S533). Specifically, the moving direction determination unit 413 first receives from the moving region overlap determination unit 412 the notification indicating that there is no overlap between the moving regions. Next, the moving direction determination unit 413 compares the coordinate of the moving region before movement and the coordinate of the moving region after movement, which are included in the detection result of the moving region detection unit 122 read out from the work area 113, thereby determining which one of the lower and upper directions is coincident with the moving direction. Then, the moving direction determination unit 413 notifies the division unit 414 of the determination result (step S533). The determination result includes not only the moving direction but also the coordinate at which the screen is divided, as with the moving direction determination unit 402 of the first exemplary embodiment.

Upon receiving from the moving region presence/absence determination unit 411 the notification indicating that no moving region has been detected and upon receiving from the moving region overlap determination unit 412 the notification indicating that there is no overlap between the moving regions, the division unit 414 sets the entire screen as one update region detection area (step S534). On the other hand, upon receiving from the moving region presence/absence determination unit 411 the notification indicating that a moving region has been detected and upon receiving from the moving region overlap determination unit 412 the notification indicating that there is an overlap between the moving regions, the division unit 414 divides the screen and sets the update region detection area, in the same manner as one of the first, second, and third process examples of the division unit 403 of the first exemplary embodiment according to the notification from the moving direction determination unit 413

(step S535 to S537). After that, the update region detection unit 125 carries out detection of an update region in each update region detection area.

The update region detection area setting unit 124 of the second exemplary embodiment does not divide the screen when there is no possibility that the moving regions before and after movement overlap each other. This makes it possible to suppress an increase in the divided number of update regions.

Figure 32:
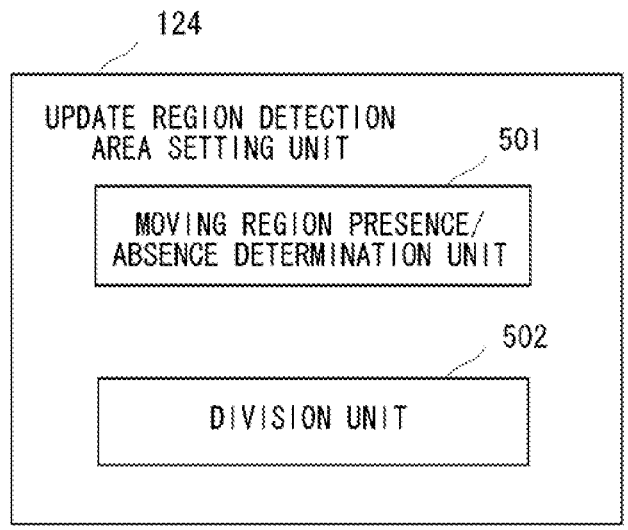
FIG. 32 is a block diagram of an update region detection area setting unit according to a third exemplary embodiment.

Referring to FIG. 32, the update region detection area setting unit 124 of a third exemplary embodiment includes a moving region presence/absence determination unit 501 and a division unit 502. Each unit has functions as outlined below.

The moving region presence/absence determination unit 501 has a function of determining whether or not a moving region has been detected by the moving region detection unit 122.

The division unit 502 has a function of determining the necessity of screen division and setting the update region detection area by screen division, according to the determination result of the moving region presence/absence determination unit 501.

Next, a first process example of the update region detection area setting unit 124 of this exemplary embodiment will be described.

Figure 33:
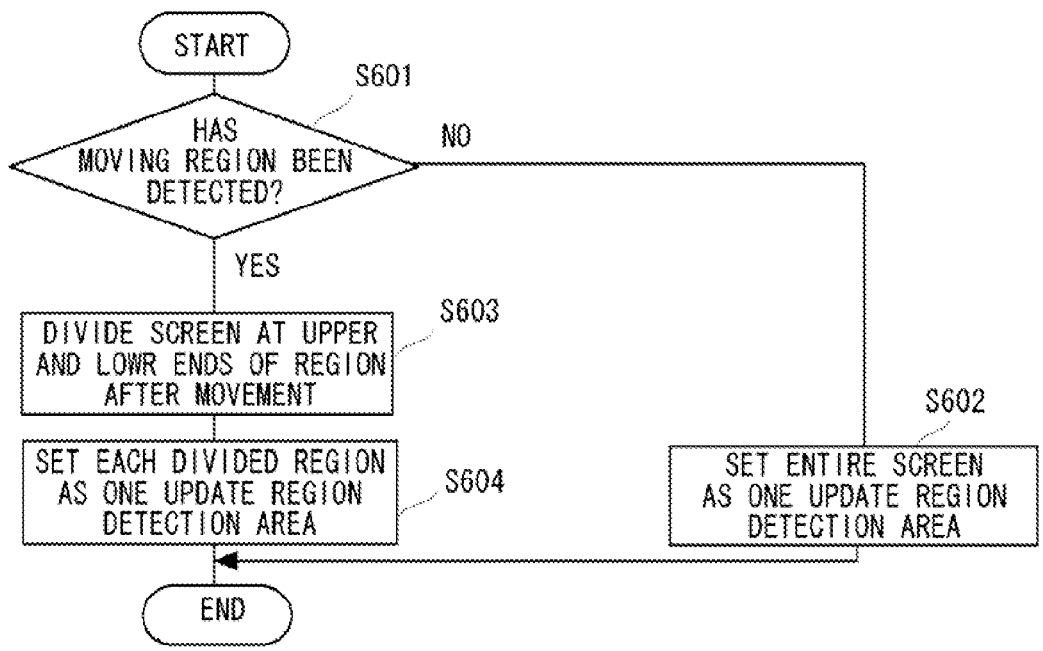
FIG. 33 is a flowchart showing a first process example of the update region detection area setting unit according to the third exemplary embodiment.

The moving region presence/absence determination unit 501 of the update region detection area setting unit 124 reads out from the work area 113 the detection result of the moving region detection unit 122 and analyzes it to determine whether a moving region has been detected, and then notifies the division unit 502 of the determination result (step S601 in FIG. 33).

Upon receiving from the moving region presence/absence determination unit 501 the notification indicating that no moving region has been detected, the division unit 502 sets the entire screen as one update region detection area (step S602). Further, upon receiving from the moving region presence/absence determination unit 401 the notification indicating that a moving region has been detected, the division unit 502 reads out from the work area 113 the coordinate of the moving region after movement, which is included in the detection result of the moving region detection unit 122, divides the screen into three regions at the upper and lower ends of the moving region after movement (step S603), and sets each divided region as one update region detection area (step S604). After that, the update region detection unit 125 carries out detection of an update region in each update region detection area.

Advantageous effects of the first process example of the update region detection area setting unit 124 of the third exemplary embodiment will be described. Although the case where the moving direction is coincident with the lower direction is described below, the same effects can be obtained also in the case of the upper direction.

Figure 34:
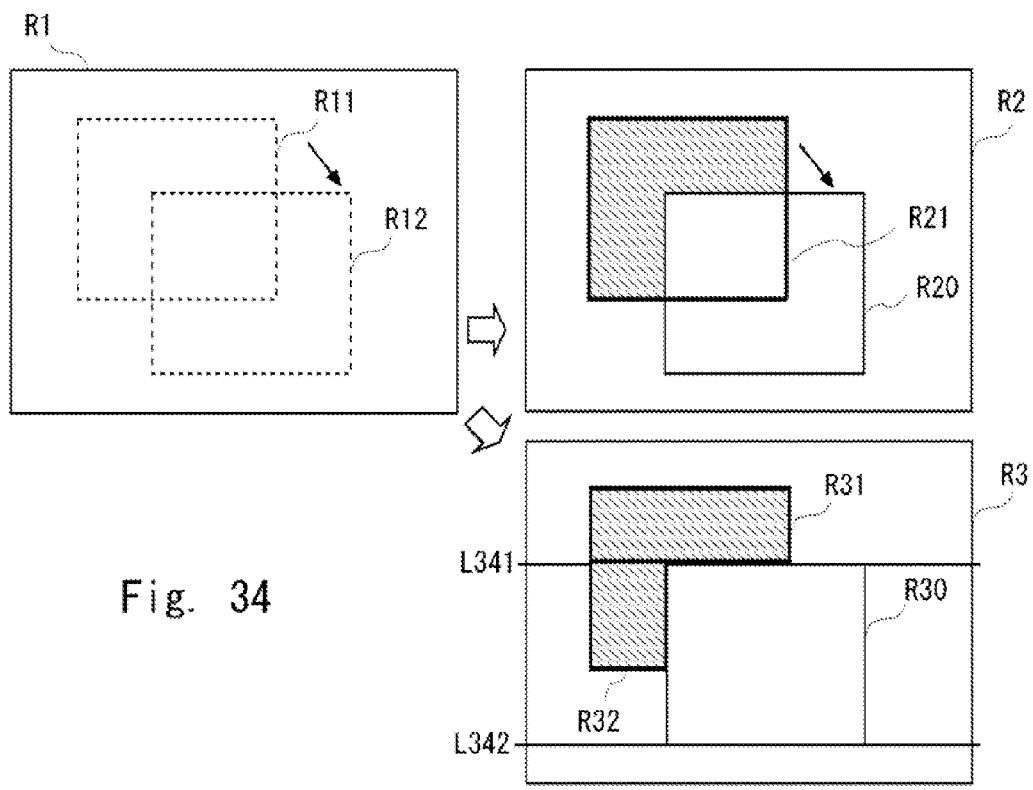
FIG. 34 is an explanatory diagram showing an effect of the first process example of the update region detection area setting unit according to the third exemplary embodiment.

The upper left and upper right of FIG. 34 are similar to the upper left and upper right of FIG. 22. Meanwhile, the lower right of FIG. 34 according to this example shows that the screen R3 is divided into three regions by partition lines L341 and L342 at the upper and lower ends of the moving region R30 after movement, and the update regions R31 and R32 are detected in each update region detection area. This makes it possible to minimize the total area of the update regions and reduce the amount of code.

Figure 35:
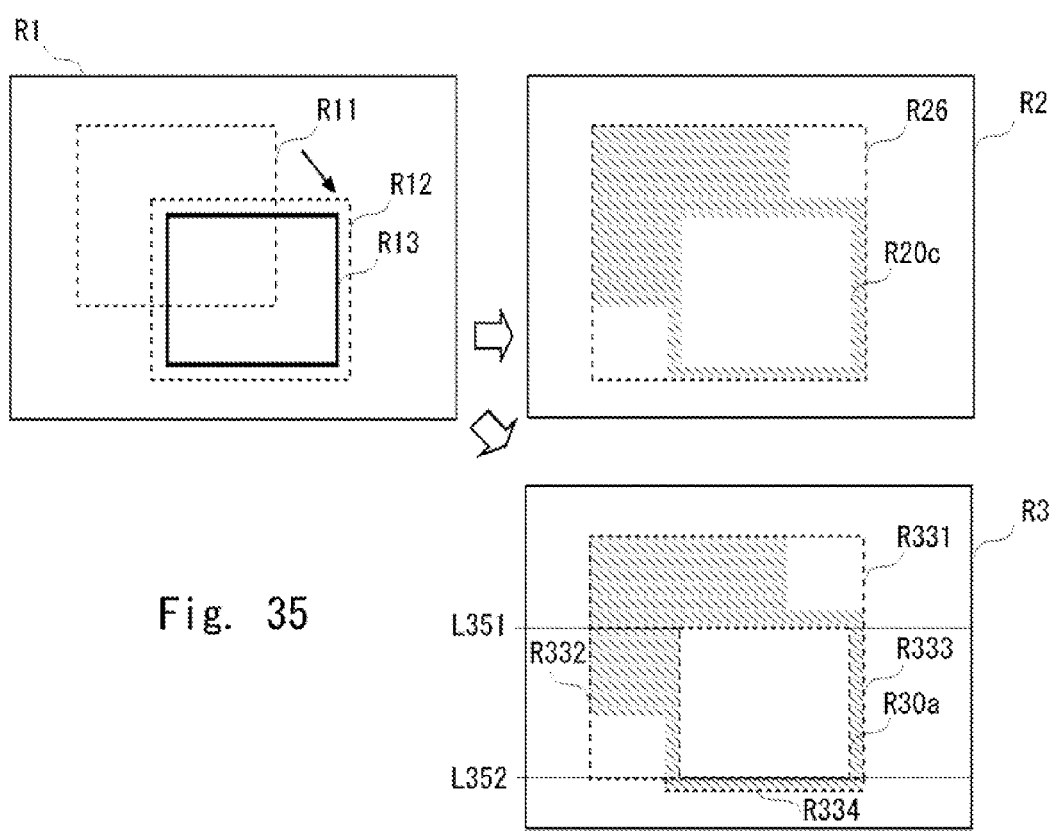
FIG. 35 is an explanatory diagram showing an effect of the first process example of the update region detection area setting unit according to the third exemplary embodiment.

Further, the upper left of FIG. 35 is similar to the upper left of FIG. 25. The upper right of FIG. 35 shows the case where the entire screen R2 is set as an update region detection area. In this case, a moving region R20c detected as shown in the upper right of FIG. 35 is included, resulting in detection of a moving region R26 including the moving regions before and after movement. Meanwhile, the lower right of FIG. 35 according to this example shows that the screen R3 is divided into three regions by partition lines L351 and L352 at the upper and lower ends of the moving region R30a after movement, and the update regions R331, R332, R333, and R334 are detected in each update region detection area. This makes it possible to reduce the total area of the update region and to reduce the amount of code by just that much.

Next, a second process example of the update region detection area setting unit 124 of this exemplary embodiment will be described.

Figure 36:
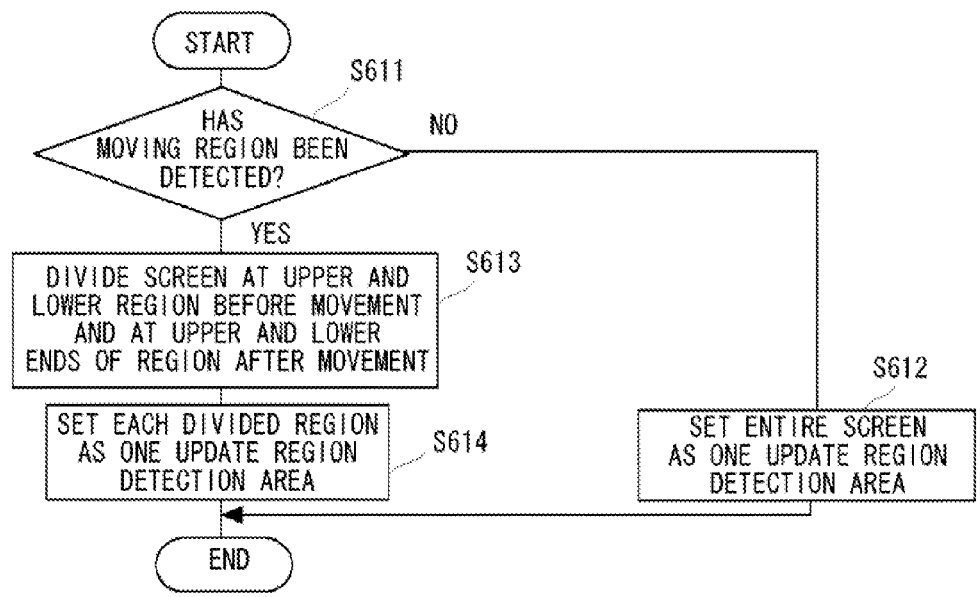
FIG. 36 is a flowchart showing a second process example of the update region detection area setting unit according to the third exemplary embodiment.

As with the first process example, the moving region presence/absence determination unit 501 of the update region detection area setting unit 124 determines whether a moving region has been detected, and notifies the division unit 502 of the determination result (step S611 in FIG. 36).

Upon receiving from the moving region presence/absence determination unit 501 the notification indicating that no moving region has been detected, the division unit 502 sets the entire screen as one update region detection area, as with the first process example (step S612). Further, upon receiving from the moving region presence/absence determination unit 501 the notification indicating that a moving region has been detected, the division unit 502 reads out from the work area 113 the coordinates of the moving regions before and after movement, which are included in the detection result of the moving region detection unit 122, divides the screen into five regions at the upper and lower ends of the moving region before movement and at the upper and lower ends of the moving region after movement (step S613), and sets each divided region as one update region detection area (step S614). After that, the update region detection unit 125 carries out detection of an update region in each update region detection area.

Advantageous effects of the second process example of the update region detection area setting unit 124 of the third exemplary embodiment will be described. Although the case where the moving direction is coincident with the lower direction is described below, the same effects can be obtained also in the case of the upper direction.

Figure 37:
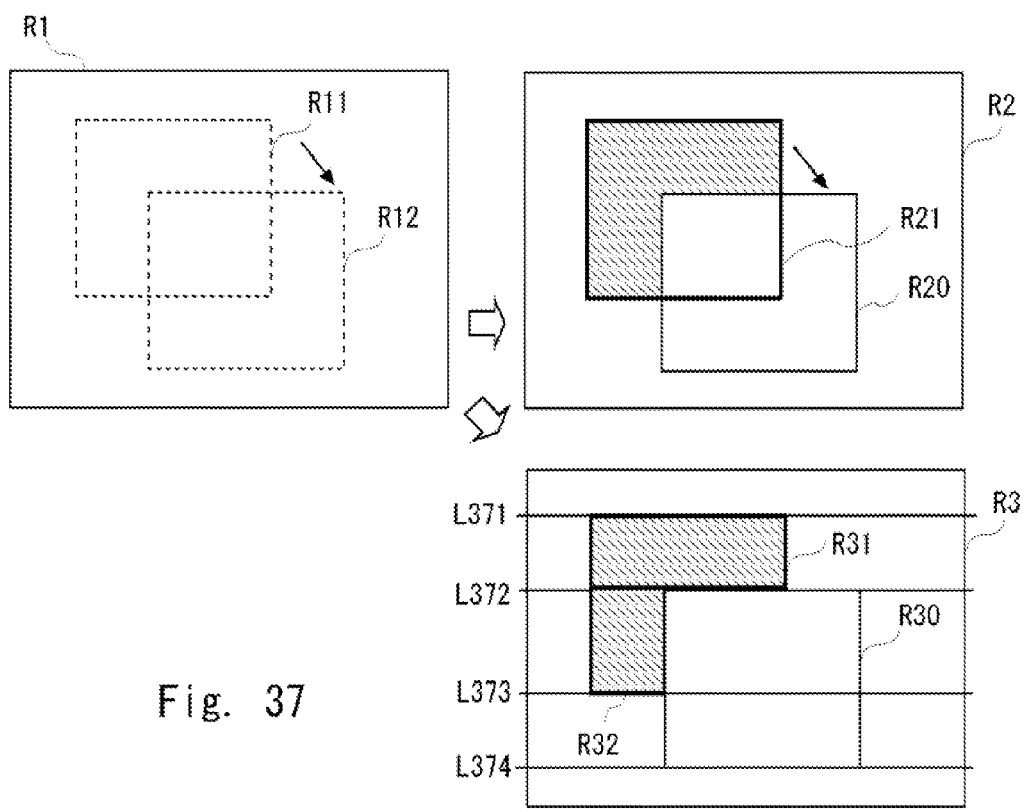
FIG. 37 is an explanatory diagram showing an effect of the second process example of the update region detection area setting unit according to the third exemplary embodiment.

The upper left and upper right of FIG. 37 are similar to the upper left and upper right of FIG. 22. Meanwhile, the lower right of FIG. 37 according to this example shows that the screen R3 is divided into five regions by partition lines L371, L372, L373, and L374 at the upper and lower ends of the moving region R30 before and after movement, and the update regions R31 and R32 are detected in each update region detection area. This makes it possible to minimize the total area of the update region and reduce the amount of code.

Figure 38:
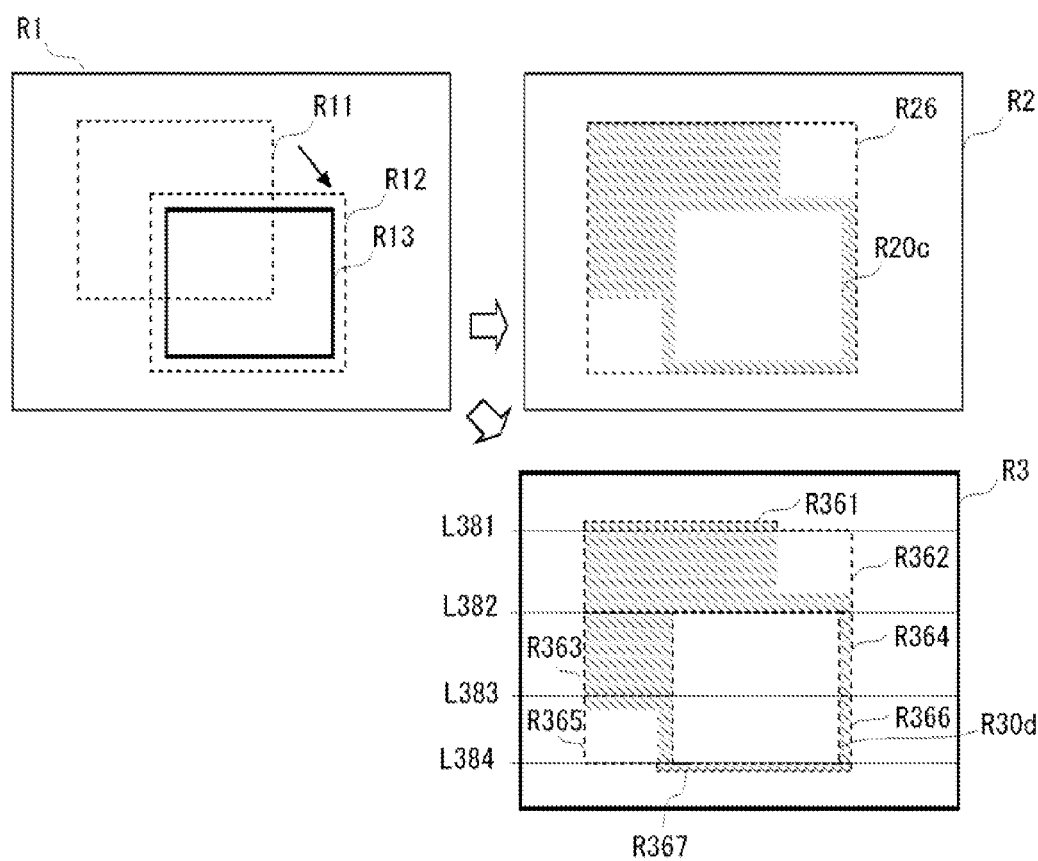
FIG. 38 is an explanatory diagram showing an effect of the second process example of the update region detection area setting unit according to the third exemplary embodiment.

Further, the upper left and upper right of FIG. 38 are similar to the upper left and upper right of FIG. 35. Meanwhile, the lower right of FIG. 38 according to this example shows that the screen R3 is divided into five regions by partition lines L381, L382, L383, and L384 at the upper and lower ends of a moving region R30d before and after movement, and update regions R361 and R362, R363, R364, R365, R366, and R367 are detected in each update region detection area. This makes it possible to reduce the total area of the update region and reduce the amount of code by just that much.

Figure 39:
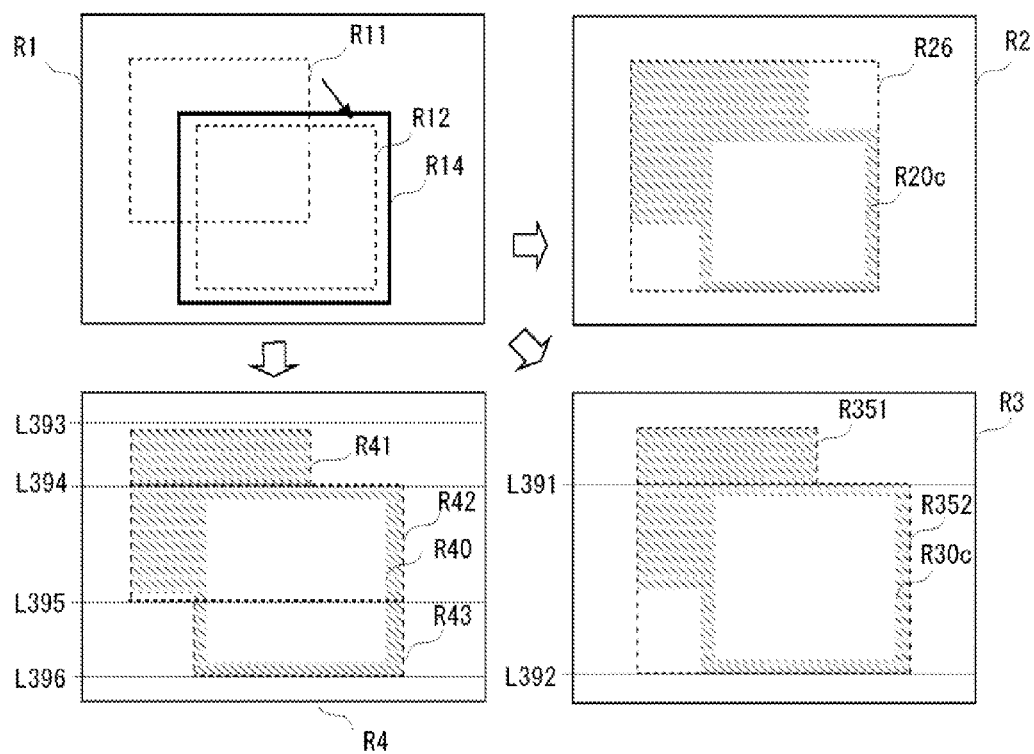
FIG. 39 is an explanatory diagram showing an effect of the second process example of the update region detection area setting unit according to the third exemplary embodiment.

Furthermore, the upper left of FIG. 39 is similar to the upper left of FIG. 29. The upper right of FIG. 39 is similar to the upper right of FIG. 35. The lower right of FIG. 39 shows a case where the first process example is applied and the screen R3 is divided into three regions by partition lines L391 and L392 at the upper lower ends of the moving region R30c after movement. In this case, the moving region R30c detected as shown in the lower right of FIG. 39 is included, resulting in detection of the redundant update regions R351 and R352. Meanwhile, the lower left of FIG. 39 according to this example shows that the screen R4 is divided into five regions by partition lines L393, L394, L395, and L396 at the upper and lower ends of the moving region R40 before and after movement, and the update regions R41, R42, and R43 are detected in each update region detection area. This makes it possible to reduce the total area of the update regions and reduce the amount of code by just that much.

Figure 40:
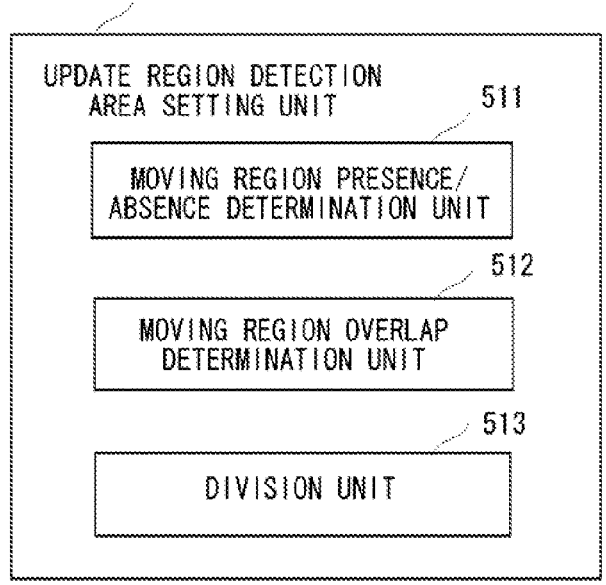
FIG. 40 is a block diagram of an update region detection area setting unit according to a fourth exemplary embodiment.

Referring to FIG. 40, the update region detection area setting unit 124 of a fourth exemplary embodiment includes a moving region presence/absence determination unit 511, a moving region overlap determination unit 512, and a division unit 513. Each unit has functions as outlined below.

The moving region presence/absence determination unit 511 has the same function as the moving region presence/absence determination unit 501 of the update region detection area setting unit 124 of the third exemplary embodiment.

The moving region overlap determination unit 512 has a function of determining the presence or absence of the possibility of an overlap between the moving regions before and after movement detected in the moving region detection unit 122.

The division unit 513 has a function of determining the necessity of screen division and setting of the update region detection area by screen division according to the determination results of the moving region presence/absence determination unit 511 and the moving region overlap determination unit 512.

Next, a process example of the update region detection area setting unit 124 of this exemplary embodiment will be described.

Figure 41:
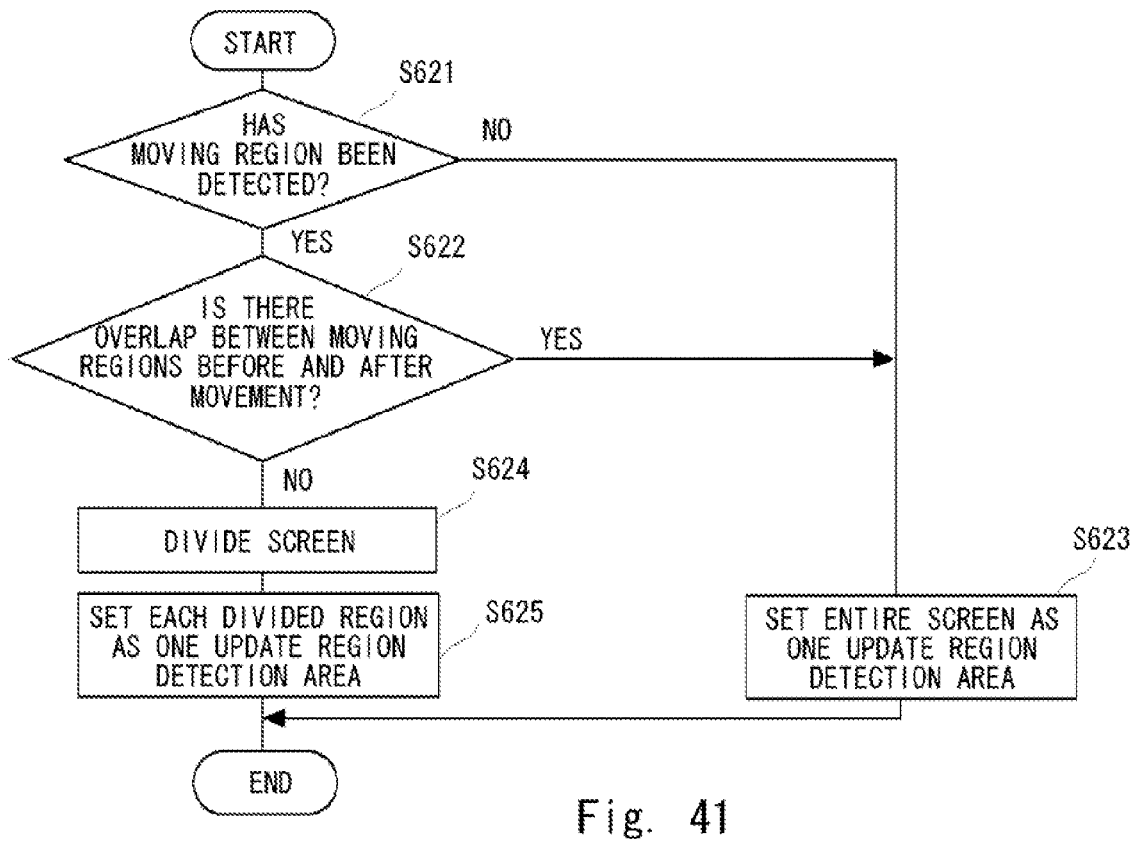
FIG. 41 is a flowchart showing a process example of the update region detection area setting unit according to the fourth exemplary embodiment.

As with the moving region presence/absence determination unit 501 of the third exemplary embodiment, the moving region presence/absence determination unit 511 of the update region detection area setting unit 124 determines whether a moving region has been detected, and notifies the moving region overlap determination unit 512 and the division unit 513 of the determination result (step S621 in FIG. 41).

The moving region overlap determination unit 512 determines whether the moving regions before and after movement overlap each other (step S622). Specifically, the moving region overlap determination unit 512 first receives from the moving region presence/absence determination unit 511 a notification indicating that the moving region has been detected. Next, the moving region overlap determination unit 512 reads out from the word area 113 the coordinates of the moving regions before and after movement, which are included in the detection result of the moving region detection unit 122. Then, the moving region overlap determination unit 512 checks whether a region obtained by enlarging the moving region before movement upward, downward, leftward, and rightward by the predetermined width Δ and a region obtained by enlarging the moving region after movement upward, downward, leftward, and rightward by the predetermined width Δ overlap each other at least partially. After that, the moving region overlap determination unit 512 notifies the division unit 513 of the determination result indicating that there is an overlap between the moving regions when the moving regions overlap each other, and of the detection result indicating that there is no overlap between the moving regions when the moving regions do not overlap each other. Here, the predetermined width Δ is set in advance according to the degree at which insufficient detection of the moving region occurs.

Upon receiving from the moving region presence/absence determination unit 512 the notification indicating that no moving region has been detected and upon receiving from the moving region overlap determination unit 512 the notification indicating that no moving region has been detected, the division unit 513 sets the entire screen as one update region detection area (step S623). On the other hand, upon receiving from the moving region presence/absence determination unit 512 the notification indicating that the moving region has been detected and upon receiving from the moving region overlap determination unit 512 the notification indicating that there is an overlap between the moving regions, the division unit 513 divides the screen into three or five regions and sets the update region detection area, in the same manner as one of the first and second process examples of the division unit 502 of the third exemplary embodiment (steps S624 and S625). After that, the update region detection unit 125 carries out detection of an update region in each update region detection area.

The update region detection area setting unit 124 of the fourth exemplary embodiment does not divide the screen when there is no possibility of an overlap between the moving regions before and after movement. This makes it possible to suppress an increase in the divided number of update regions.

(4) The Update Region Detection Unit 125

Figure 42:
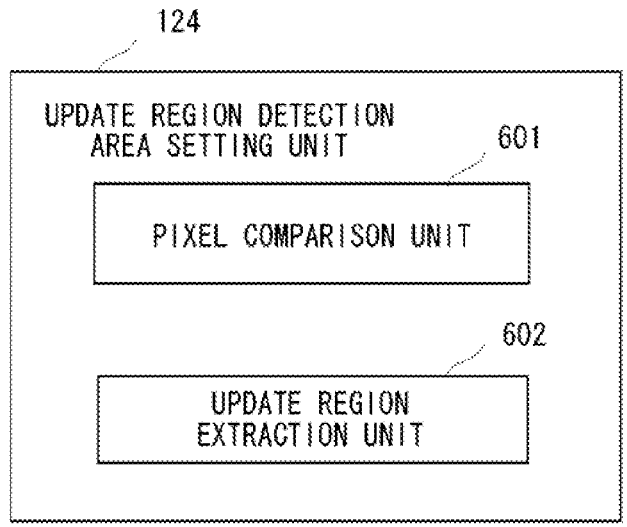
FIG. 42 is a block diagram of an update region detection unit according to the first exemplary embodiment.

Referring to FIG. 42, the update region detection unit 125 of the first exemplary embodiment includes a pixel comparison unit 601 and an update region extraction unit 602, and detects an update region serving as a difference region between a reference frame and a current frame after motion compensation in each update region detection area set by the update region detection area setting unit 124. The pixel comparison unit 601 and the update region extraction unit 602 have functions as outlined below.

The pixel comparison unit 601 has a function of comparing a difference between pixel values at the same position of the reference frame and the current frame after motion compensation, with a first threshold and a second threshold larger than the first threshold, in each update region detection area to be processed.

The update region extraction unit 602 has a function of extracting, as an update region, a group including a pixel where a difference greater than the second threshold has been detected, from a group of pixels where a difference greater than the first threshold has been detected, in each update region detection area to be processed.

Next, the operation of the update region detection unit 125 of this exemplary embodiment will be described.

Figure 43:
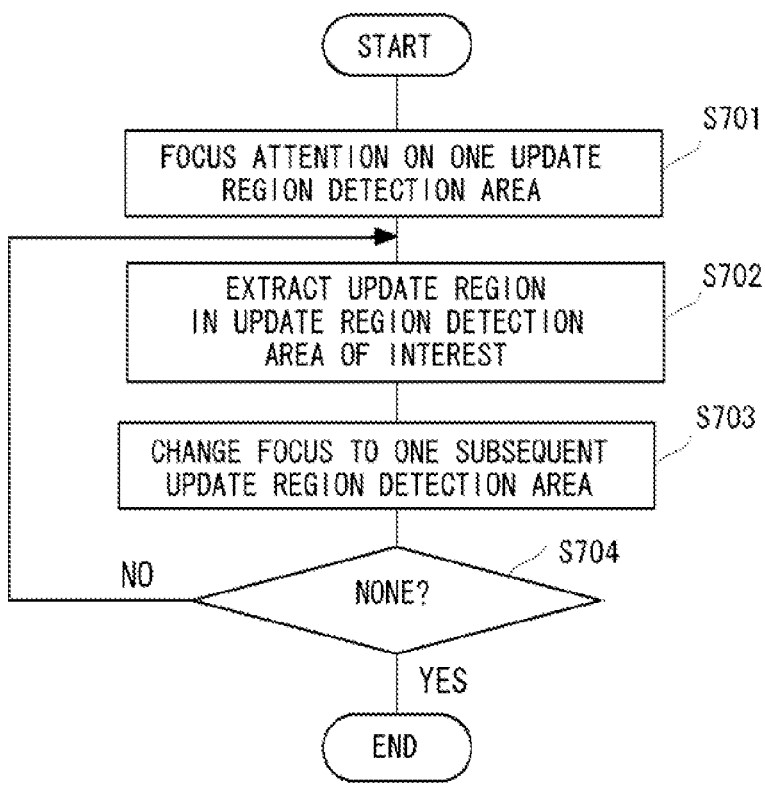
FIG. 43 is a flowchart showing a process flow of the update region detection unit according to the first exemplary embodiment.

The update region detection unit 125 reads out from the work area 113 information on update region detection areas set by the update region detection area setting unit 124, and focuses attention on one of the update region detection areas (step S701 in FIG. 43). Next, the update region detection unit 125 extracts update regions from the update region detection area of interest, and stores the extraction result to the work area 113 (step S702). Upon completing the process for extracting update regions from one update region detection area, the update region detection unit 125 changes focus to a subsequent update region detection area (step S703), and repeats the same process as that described above. When the process for extracting update regions from all update region detection areas is completed (YES in step S704), the process shown in FIG. 43 is completed.

Figure 44A:
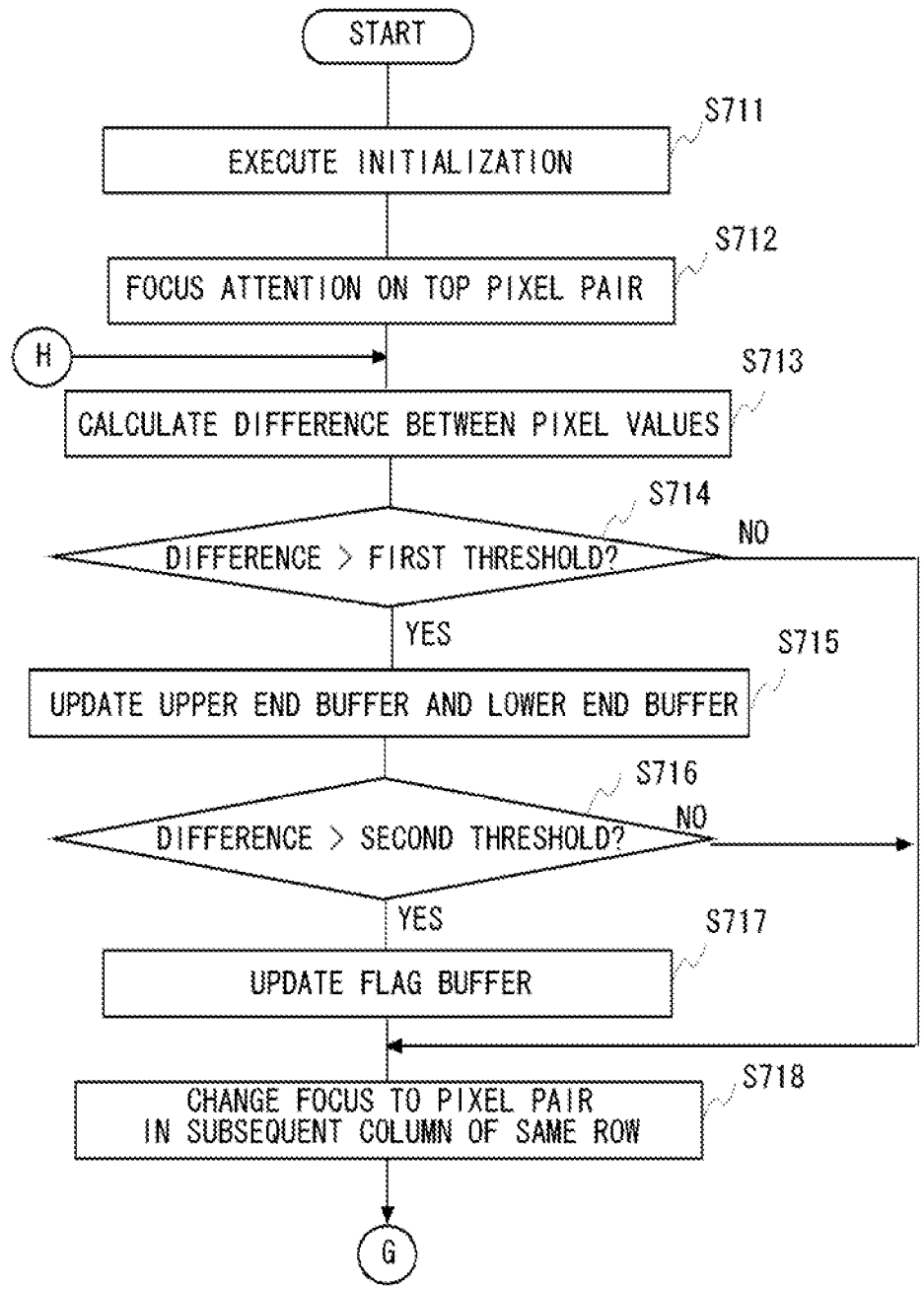
FIG. 44A is a flowchart showing a process example of a pixel comparison unit in the update region detection unit according to the first exemplary embodiment.
Figure 44B:
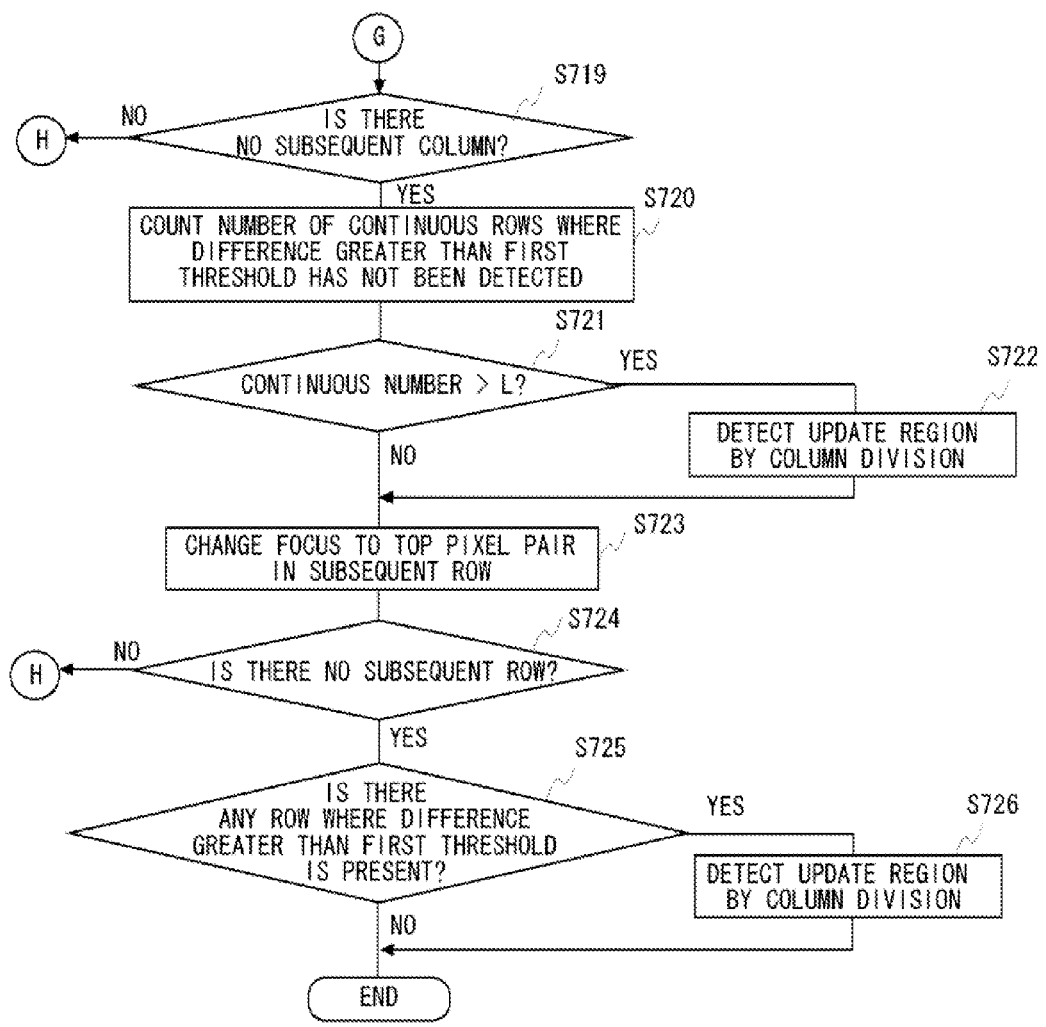
FIG. 44B is a flowchart showing a process example of the pixel comparison unit in the update region detection unit according to the first exemplary embodiment.

Next, the process executed in step S702 will be described in detail with reference to the flowcharts of FIGS. 44A and 44B.

First, the update region detection unit 125 initializes an upper end buffer, a lower end buffer, and a flag buffer which are used in the process for extracting update regions (step S711). Each buffer has entries in one-to-one correspondence with rows of a frame. Among them, the upper end buffer is used to hold the row number of the highest-order row in which a difference greater than the first threshold has been detected, for each column. The lower end buffer is used to hold, for each column, the row number of the last row in which a difference greater than the first threshold has been detected. The flag buffer holds, for each column, a flag indicating whether a difference greater than the second threshold has been detected or not.

After that, the pixel comparison unit 601 of the update region detection unit 125 carries out a process as described below.

Figure 45:
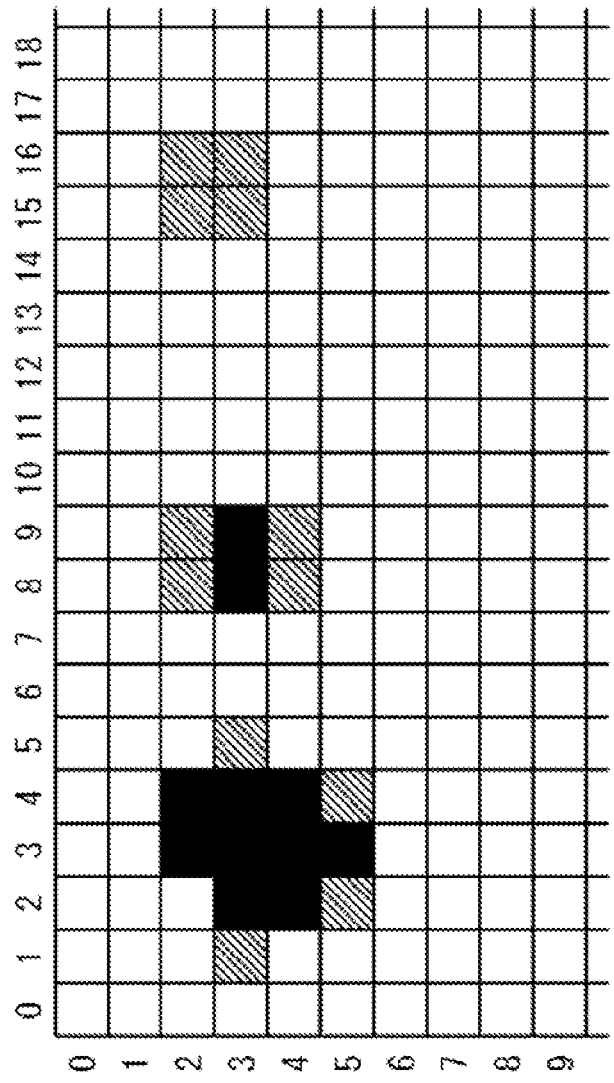
FIG. 45 is a diagram showing an example where an upper end buffer, a lower end buffer, and a flag buffer, which are used in the update region detection unit according to the first exemplary embodiment, are updated according to a differential state between a reference frame and a current frame after motion compensation.

First, the pixel comparison unit 601 focuses attention on the top pixel pair among a plurality of pixel pairs included in the update region detection area of each of the reference frame and the current frame after motion compensation (S712). As shown in FIG. 45, for example, when the update region detection area of interest starts at the first row of the frame, the pixel comparison unit 601 focuses attention on a pair of a pixel P(0, 0) of the reference frame after motion compensation and a pixel P(0, 0) of the current frame after motion compensation.

Next, the pixel comparison unit 601 calculates a difference between pixel values of the pixel pair of interest (step S713). Next, the difference is compared with the first threshold (step S714). If the difference is greater than the first threshold, the upper end buffer and the lower end buffer are updated (step S715). Specifically, regarding the upper end buffer, when the entry of the upper end buffer corresponding to the column in which the pixel of interest is positioned is NULL, the number of the row in which the pixel of interest is positioned is recorded in the entry. If not NULL but the row number is already recorded in the entry, the upper end buffer is remained as it is. Meanwhile, regarding the lower end buffer, the number of the row in which the pixel of interest is positioned is unconditionally recorded in the entry of the lower end buffer corresponding to the column in which the pixel of interest is positioned.

Then, the pixel comparison unit 601 compares the difference with the second threshold (step S716). When the difference is greater than the second threshold, the pixel comparison unit 601 updates the flag buffer (step S717). Specifically, "1" is unconditionally recorded in the entry of the flag buffer corresponding to the column in which the pixel of interest is positioned.

Then, the pixel comparison unit 601 changes focus to a pixel pair in a subsequent column of the same row of both frames (step S718), and the process returns to step S713. If the difference is not greater than the first threshold, the upper end buffer and the lower end buffer are not updated. Further, if the difference is greater than the first threshold but is not greater than the second threshold, the flag buffer is not updated.

Here, the difference between pixel values is calculated for each component of R, G, and B, for example. Further, the comparison with the first and second thresholds is carried out for each difference between components. If at least one difference between components is larger than the thresholds, it is determined that the difference between pixel values is larger than the thresholds.

After that, the pixel comparison unit 601 completes the process for the pixel pair for one row of the update region detection area of interest (YES in step S719). Further, the pixel comparison unit 601 counts the number of continuous rows in which the difference greater than the first threshold has not been detected, i.e., the number of continuous non-update rows, from the time when the process is started, or from the previous calling time if the update region extraction unit 602 has previously been called (step S720). Subsequently, the pixel comparison unit 601 compares a predetermined threshold L with the number of continuous non-update rows (step S721). Here, the threshold L is set to a value equal to or greater than 1 (e.g., 8) so as to avoid excessive division of the update region. If the number of continuous non-update rows exceeds the threshold L, the pixel comparison unit 601 designates the leading row and the last row of an update region extraction range and calls the update region extraction unit 602 to execute a process for extracting update regions by column division (step S722). The leading row of the update region extraction range is coincident with the leading row of the frame if the update region extraction unit 602 has not previously been called, or is coincident with a row subsequent to the last row, which is designated at the previous calling time if the update region extraction unit 602 has been called. Further, the last row of the update region extraction range is coincident with a row in which a process for a pixel in the last column is completed at this time.

After completion of the process of the update region extraction unit 602, the pixel comparison unit 601 changes focus to the top pixel pair in the subsequent row of the frame (step S723), and the process returns to step S713.

Note that if the number of continuous non-update rows does not exceed the threshold L, the pixel comparison unit 601 changes focus to the top pixel pair in the subsequent row of the frame, without calling the update region extraction unit 602 (step S723), and the process returns to step S713.

Further, the pixel comparison unit 601 completes the process for the last pixel pair in the last row of the update region detection area of interest (YES in step S724). Then, the pixel comparison unit 601 determines whether there is a row in which the difference greater than the first threshold has been detected is present after the time when the process is started, or after the previous calling time if the update region extraction unit 602 has previously been called (step S725). Here, if the difference is not present, the pixel comparison unit 601 completes the process shown in FIGS. 44A and 44B. If the difference is present, the pixel comparison unit 601 designates the leading row and the last row of the update region extraction range, and calls the update region extraction unit 602 (step S726). After completion of the process for detecting update regions by column division, the process shown in FIGS. 44A and 44B is completed. The leading row of the update region extraction range is coincident with the leading row of the frame if the update region extraction unit 602 has not previously been called, or is coincident with a row subsequent to the last row designated at the previous calling time if the update region extraction unit 602 has previously been called. Further, the last row of the update region extraction range is coincident with the last column of the frame.

A matrix illustrated on the upper side of FIG. 45 shows an example of a differential state between the reference frame and the current frame after motion compensation, and one cell represents a differential state between a pair of pixels. A blank cell indicates that a difference is smaller than the first threshold, a hatched cell indicates that a difference is greater than the first threshold and is smaller than the second threshold. A blacked-out cell indicates that a difference is greater than the second threshold. Under such circumstances, when the pixel comparison unit 601 executes the operation as described above for a range of rows until the ninth row of the frame, the contents which are presented on the lower side of FIG. 45 are recorded in the upper end buffer, the lower end buffer, and the flag buffer. Here, each numerical value in the upper end buffer and the lower end buffer represents the row number, and symbol "-" represents NULL. Further, "0" and "1" in the flag buffer represent values of the flag, and the value "1" indicates that the second threshold is exceeded. Assuming that the threshold L indicates three rows, for example, when the number of continuous non-update rows is "4" at the time when the process for the rows until the ninth row is completed, so the threshold L is exceeded. Accordingly, the update region extraction unit 602 is called.

Next, the process for detecting update regions by column division executed by the update region extraction unit 602 will be described with reference to the flowchart of FIG. 46.

The update region extraction unit 602 refers to the upper end buffer or lower end buffer, and extracts update columns (a group of columns in which a difference pixel is present) and non-update columns (a group of columns in which no difference pixel is present) from the update region extraction range designated in the current calling (step S731). In the case of FIG. 45, for example, referring to the entries of the upper end buffer starting from the column 0, one NULL is continuous, so the column 0 is extracted as a non-update column (0-0). Next, five entries in each of which a numerical value is recorded are continuous, so the column 1 to the column 5 are extracted as update columns (1-5). Thereafter, non-update columns (6-7), update columns (8-9), non-update columns (10-14), update columns (15-16), and the like are extracted in a similar manner.

Then, the update region extraction unit 602 connects adjacent update columns to one update column with non-update columns equal to or smaller than a predetermined column number W interposed therebetween, so as to avoid excessive division of the update region (step S732). Assuming that W is 3, for example, in the case of FIG. 45, the update columns (1-5) and update columns (8-9) are connected together as the update columns (1-9).

Then, the update region extraction unit 602 refers to the flag buffer and changes the update columns, in each of which the value of the flag indicates 0, to non-update columns (step S733). In the case of FIG. 45, for example, referring to flags corresponding to the column 1 to the column 9 in the flag buffer with respect to the connected update columns (1-9), the value "1" is included. Thus, the update columns (1-9) are maintained as they are. Meanwhile, referring to flags corresponding to columns 15-16 in the flag buffer with respect to the update columns (15-16), all the values are "0". Accordingly, it is determined that it is highly possible that the update columns (15-16) are generated due to noise and thus are changed to non-update columns.

Then, the update region extraction unit 602 checks rows at the uppermost end and lowermost end where a difference pixel is generated, for each update column, thereby determining an update rectangle for determining the update region, as well as the left end and right end of the update column (step S734). By this process, in the update columns (1-9), the uppermost end is "2" when referring to the upper end buffer, the lowermost end is "5" when referring to the lower end buffer, the left end of the update column is "1", and the right end thereof is "9". Accordingly, when the update rectangle is defined by the upper left and lower right edge points, it is obtained by an upper left edge point (2, 1) and a lower right edge point (5, 9). Information on the update region (the coordinates of the update rectangle) thus obtained is recorded in the work area 113 as a part of the update region detection result.

Figure 46:
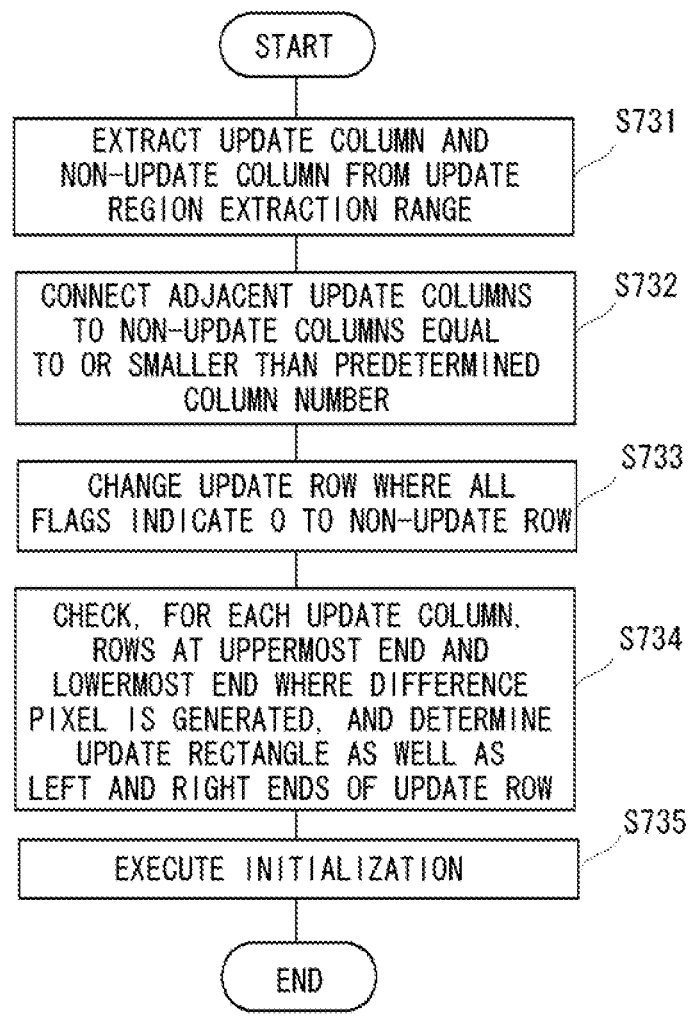
FIG. 46 is a flowchart showing a process example of an update region extraction unit in the update region detection unit according to the first exemplary embodiment.

Then, the update region extraction unit 602 initializes the upper end buffer, the lower end buffer, and the flag buffer (step S735), and completes the process shown in FIG. 46.

Note that in the process shown in FIG. 46, after the adjacent update columns are connected to one update column with non-update rows equal to or smaller than the predetermined column number W interposed therebetween, the update columns that include no pixel that exceeds the second threshold are changed to non-update rows. On the contrary, the process for connecting the adjacent update columns to one update column with non-update rows equal to or smaller than the predetermined column number W interposed therebetween may be carried out after the update columns that include no pixel that exceeds the second threshold are changed to non-update rows.

Next, advantageous effects of the update region detection unit 125 of this exemplary embodiment will be described.

The update region detection unit 125 of this exemplary embodiment can accurately detect analog-captured update regions on the computer screen. This is because two types of thresholds, i.e., the first threshold and the second threshold larger than the first threshold, are used, and a group including a pixel where a difference greater than the second threshold has been detected is extracted as an update region from a group of pixels where a difference greater than the first threshold has been detected. This makes it possible to prevent excessive detection of the update region, which is more likely to occur in the case of detecting the update region using only the first threshold, and to prevent insufficient detection of the update region, which is more likely to occur in the case of detecting the update region using only the second threshold.

Figure 47:
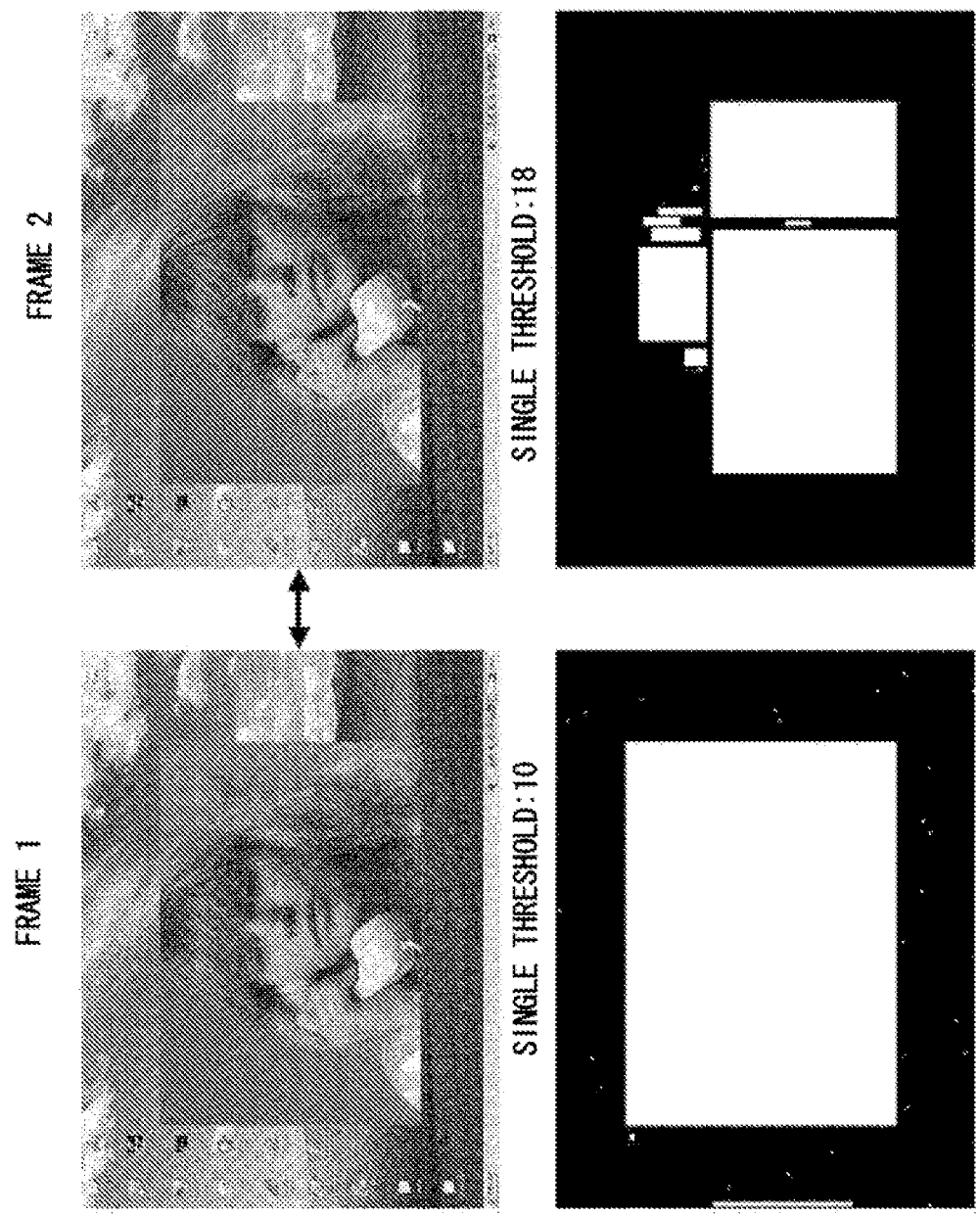
FIG. 47 is a diagram showing an experimental example of update region detection using a single threshold.

Specifically, when a pixel change occurs in a gradation portion of a moving picture, for example, it is difficult to discriminate whether the pixel change is caused by drawing and updating of the pixel or by a fluctuation in pixel value due to noise associated with analog capture, merely by referring to the amount of change in a single pixel value. For this reason, the use of a single threshold may result in failure of detection of update regions in a moving picture. In an experimental example shown in FIG. 47 in which only a moving picture window in the center of the screen is updated in before and after frames 1 and 2, it is desirable to detect the entirety of the moving picture window positioned in the center, as the update region. However, the use of only a small threshold value resulted in excessively detected region as shown in the lower left of FIG. 47. On the contrary, the use of only a large threshold value resulted in insufficient detected region as shown in the lower right of FIG. 47. When excessive detection occurs, the amount of code is increased even if the screen is only slightly updated. Further, when a detection omission occurs in a plurality of frames, a luminance discontinuous border is sensed between the region which is successfully detected and the region the detection of which is omitted.

Figure 48:
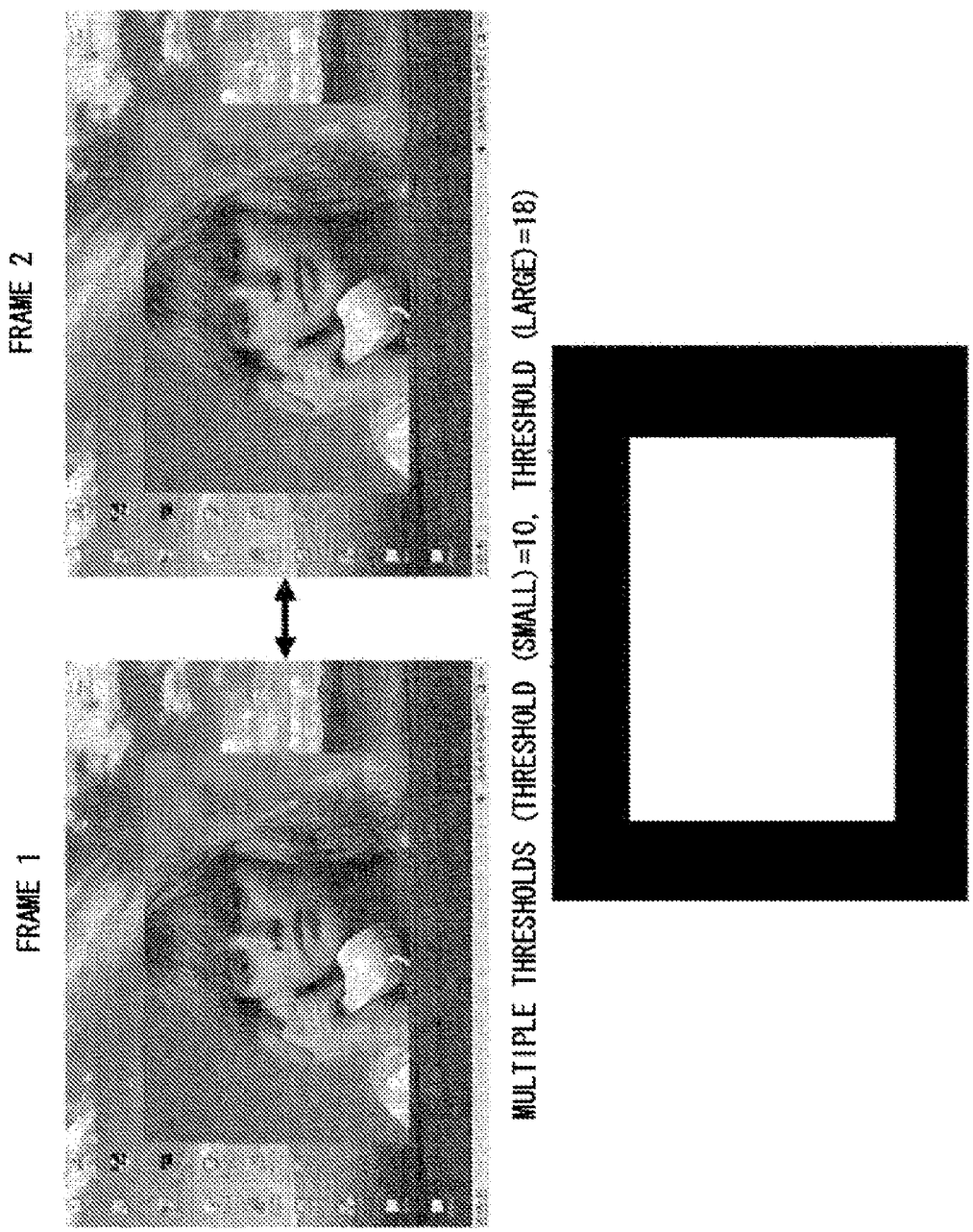
FIG. 48 is a diagram showing an experimental example of update region detection performed by the update region detection unit according to the first exemplary embodiment.

Meanwhile, the update region detection unit 125 of this exemplary embodiment, in which two types of (large and small) thresholds for determining a difference is set, was able to detect the moving picture window positioned in the center, as the update region, which is neither too large nor too small, as shown in an experimental example of FIG. 48.

Further, the update region detection unit 125 of this exemplary embodiment can prevent detection of a wastefully large update region, compared with the method for detecting update regions using one rectangle circumscribing all update regions existing in the update region detection area.

Furthermore, the update region detection unit 125 of this exemplary embodiment can rapidly detect update regions on the computer screen. This is because the update region detection unit 125 includes: the upper end buffer and lower end buffer that hold the coordinates of the upper and lower ends of difference pixels in each column of a frame; the pixel comparison unit 601 that compares pixels between a reference frame and a current frame in the order of raster scanning, and rewrites the coordinates of the upper and lower ends in a column of each of the upper end buffer and lower end buffer when a pixel where a difference equal to or greater than the first threshold is found; and the update region extraction unit 602 that determines update regions by referring to the upper end buffer and lower end buffer when a predetermined number of non-update rows are continuous. Further, this is because the detection of update regions can be carried out by a so-called one path process.

While exemplary embodiments and examples in which the moving region detection device according to the present invention is applied to a video signal coding device have been described above, the present invention is not limited to the above exemplary embodiments and examples. The configurations and details of the present invention can be modified in various manners without departing from the scope of the present invention described above, as a matter of course.

Note that other exemplary embodiments of the present invention include the following.

(Supplementary Note 1)

A moving region detection device that detects, as a moving region, an identical or similar image region which exist in both a previous frame and a current frame and whose position on a screen changes, comprising:

initial candidate decision means for deciding an initial candidate for a moving region; and moving region decision means for deciding a moving region for use in motion compensation, from among the initial candidate for the moving region decided by the initial candidate decision means and another at least one candidate for the moving region generated by changing a size of the moving region of the initial candidate.

(Supplementary Note 2)

The moving region detection device as set forth in Supplementary note 1, wherein the moving region decision means calculates a maximum enlargement width based on which a moving region can be enlarged, for each side of the initial candidate for the moving region, according to a result of comparison between a pixel value after motion compensation and a true pixel value when the motion compensation is carried out, and performs an enlargement process for determining a position of each side after enlargement.

(Supplementary Note 3)

The moving region detection device as set forth in Supplementary note 2, wherein the moving region decision means decides whether or not to discard the initial candidate according to a result of comparison between a pixel value after motion compensation and a true pixel value when motion compensation is carried out using the moving region of the initial candidate, and performs the enlargement process when deciding not to discard the initial candidate.

(Supplementary Note 4)

The moving region detection device as set forth in Supplementary note 3, wherein the moving region decision means calculates, when deciding not to discard the initial candidate, a maximum reduction width based on which a moving region can be reduced, for each side of the initial candidate for the moving region, according to a result of comparison between a pixel value after motion compensation and a true pixel value when the motion compensation is carried out, performs a reduction process for determining a position of a side after reduction based on the maximum reduction width if the maximum reduction width is not 0, and performs the enlargement process on a side where the maximum reduction width is not 0.

(Supplementary Note 5)

The moving region detection device as set forth in Supplementary note 3, wherein the moving region decision means calculates a maximum reduction width based on which a moving region can be reduced, for each side of the initial candidate for the moving region, according to a result of comparison between a pixel value after motion compensation and a true pixel value when the motion compensation is carried out, and performs a reduction process for determining a position of a side after reduction.

(Supplementary Note 6)

The moving region detection device as set forth in Supplementary note 2, wherein the moving region decision means calculates a maximum reduction width based on which a moving region can be reduced, for each side of the initial candidate for the moving region, according to a result of comparison between a pixel value after motion compensation and a true pixel value when the motion compensation is carried out, performs a reduction process for determining a position of a side after reduction based on the maximum reduction width if the maximum reduction width is not 0, and performs the enlargement process on a side where the maximum reduction width is not 0.

(Supplementary Note 7)

The moving region detection device as set forth in Supplementary note 3, wherein the moving region decision means uses, as an evaluation scale, a merit value and a demerit value respectively representing a degree of adaptability as a moving region for use in motion compensation and a degree of non-adaptability as a moving region for use in motion compensation, performs a process, on an entirety of the moving region of the initial candidate, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and decides whether or not to discard the initial candidate based on a result of comparison between the merit value and demerit value finally obtained.

(Supplementary Note 8)

The moving region detection device as set forth in Supplementary note 2, wherein the moving region decision means determines whether or not the moving region can be enlarged by a predetermined pixel width, for each side of the moving region, uses, in the determination, a merit value and a demerit value respectively representing a degree of adaptability as a moving region for use in motion compensation and a degree of non-adaptability as a moving region for use in motion compensation, as an evaluation scale, performs a process, on an entirety of the enlarged moving region, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and determines whether or not enlargement is possible based on a result of comparison between the merit value and demerit value finally obtained.

(Supplementary Note 9)

The moving region detection device as set forth in Supplementary note 3, wherein the moving region decision means determines whether or not the moving region can be reduced by a predetermined pixel width, for each side of the moving region, uses, in the determination, a merit value and a demerit value respectively representing a degree of adaptability as a moving region for use in motion compensation and a degree of non-adaptability as a moving region for use in motion compensation, as an evaluation scale, performs a process, on an entirety of the reduced moving region, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and determines whether or not reduction is possible, based on a result of comparison between the merit value and demerit value finally obtained.

(Supplementary Note 10)

The moving region detection device as set forth in Supplementary note 11, comprising motion vector detection means for extracting, from a previous frame and a current frame, an edge point whose positional relationship with another at least one edge point is unique, as a feature point, and extracting a feature point pair having the same unique positional relationship between the previous frame and the current frame, wherein the initial candidate decision means decides, as an initial candidate for a moving region in the previous frame, a rectangle circumscribing feature points existing in the previous frame, from among the feature point pair extracted by the motion vector detection means, and decides, as an initial candidate for a moving region in the current frame, a rectangle circumscribing feature points existing in the current frame, from among the feature point pair extracted by the motion vector detection means.

(Supplementary Note 11)

A moving region detection method for detecting, as a moving region, an identical or similar image region which exist in both a previous frame and a current frame and whose position on a screen changes, comprising:

a) a step of determining, by initial candidate decision means, an initial candidate for detecting a moving region; and b) a step of deciding, by moving region decision means, a moving region for use in motion compensation, from among the initial candidate for the moving region determined by the initial candidate determination means and another at least one candidate for the moving region obtained by changing a size of the moving region of the initial candidate.

(Supplementary Note 12)

The moving region detection method as set forth in Supplementary note 11, wherein the moving region decision means decides whether or not to discard the initial candidate according to a result of comparison between a pixel value after motion compensation and a true pixel value when motion compensation is carried out using the moving region of the initial candidate, and performs the enlargement process when deciding not to discard the initial candidate.

(Supplementary Note 13)

The moving region detection method as set forth in Supplementary note 12, wherein the moving region decision means decides whether or not to discard the initial candidate according to a result of comparison between a pixel value after motion compensation and a true pixel value when motion compensation is carried out using the moving region of the initial candidate, and performs the enlargement process when deciding not to discard the initial candidate.

(Supplementary Note 14)

The moving region detection method as set forth in Supplementary note 13, wherein the moving region decision means calculates, when deciding not to discard the initial candidate, a maximum reduction width based on which a moving region can be reduced, for each side of the initial candidate for the moving region, according to a result of comparison between a pixel value after motion compensation and a true pixel value when the motion compensation is carried out, performs a reduction process for determining a position of a side after reduction based on the maximum reduction width if the maximum reduction width is not 0, and performs the enlargement process on a side where the maximum reduction width is not 0.

(Supplementary Note 15)

The moving region detection method as set forth in Supplementary note 13, wherein the moving region decision means calculates a maximum reduction width based on which a moving region can be reduced, for each side of the initial candidate for the moving region, according to a result of comparison between a pixel value after motion compensation and a true pixel value when the motion compensation is carried out, and performs a reduction process for determining a position of a side after reduction.

(Supplementary Note 16)

The moving region detection method as set forth in Supplementary note 12, wherein the moving region decision means calculates a maximum reduction width based on which a moving region can be reduced, for each side of the initial candidate for the moving region, according to a result of comparison between a pixel value after motion compensation and a true pixel value when the motion compensation is carried out, performs a reduction process for determining a position of a side after reduction based on the maximum reduction width if the maximum reduction width is not 0, and performs the enlargement process on a side where the maximum reduction width is not 0.

(Supplementary Note 17)

The moving region detection method as set forth in Supplementary note 13, wherein the moving region decision means uses, as an evaluation scale, a merit value and a demerit value respectively representing a degree of adaptability as a moving region for use in motion compensation and a degree of non-adaptability as a moving region for use in motion compensation, performs a process, on an entirety of the moving region of the initial candidate, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and decides whether or not to discard the initial candidate based on a result of comparison between the merit value and demerit value finally obtained.

(Supplementary Note 18)

The moving region detection method as set forth in Supplementary note 12, wherein the moving region decision means determines whether or not the moving region can be enlarged by a predetermined pixel width, for each side of the moving region, uses, in the determination, a merit value and a demerit value respectively representing a degree of adaptability as a moving region for use in motion compensation and a degree of non-adaptability as a moving region for use in motion compensation, as an evaluation scale, performs a process, on an entirety of the enlarged moving region, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and determines whether or not enlargement is possible based on a result of comparison between the merit value and demerit value finally obtained.

(Supplementary Note 19)

The moving region detection method as set forth in Supplementary note 13, wherein the moving region decision means determines whether or not the moving region can be reduced by a predetermined pixel width, for each side of the moving region, uses, in the determination, a merit value and a demerit value respectively representing a degree of adaptability as a moving region for use in motion compensation and a degree of non-adaptability as a moving region for use in motion compensation, as an evaluation scale, performs a process, on an entirety of the reduced moving region, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and determines whether or not reduction is possible based on a result of comparison between the merit value and demerit value finally obtained.

(Supplementary Note 20)

The moving region detection method as set forth in Supplementary note 11, comprising a step of extracting, by comprising motion vector detection means, from a previous frame and a current frame, an edge point whose positional relationship with another at least one edge point is unique, as a feature point, and extracting a feature point pair having the same unique positional relationship between the previous frame and the current frame, wherein the initial candidate decision means decides, as an initial candidate for a moving region in the previous frame, a rectangle circumscribing feature points existing in the previous frame, from among the feature point pair extracted by the motion vector detection means, and decides, as an initial candidate for a moving region in the current frame, a rectangle circumscribing feature points existing in the current frame, from among the feature point pair extracted by the motion vector detection means.

(Supplementary Note 21)

A computer-readable program recording medium recording a moving region detection program for causing a computer which detects, as a moving region, an identical or similar image region which exists in both the previous frame and the current frame and whose position on a screen changes, to function as:

initial candidate decision means for deciding an initial candidate for a moving region; and moving region decision means for deciding a moving region for use in motion compensation, from among the initial candidate for the moving region decided by the initial candidate decision means and another at least one candidate for the moving region generated by changing a size of the moving region of the initial candidate.

(Supplementary Note 22)

The program recording medium recording the moving region detection program as set forth in Supplementary note 22, wherein the moving region decision means calculates a maximum enlargement width based on which a moving region can be enlarged, for each side of the initial candidate for the moving region, according to a result of comparison between a pixel value after motion compensation and a true pixel value when the motion compensation is carried out, and performs an enlargement process for determining a position of each side after enlargement.

(Supplementary Note 23)

The program recording medium recording the moving region detection program as set forth in Supplementary note 22, wherein the moving region decision means decides whether or not to discard the initial candidate according to a result of comparison between a pixel value after motion compensation and a true pixel value when motion compensation is carried out using the moving region of the initial candidate, and performs the enlargement process when deciding not to discard the initial candidate.

(Supplementary Note 24)

The program recording medium recording the moving region detection program as set forth in Supplementary note 23, wherein the moving region decision means calculates, when deciding not to discard the initial candidate, a maximum reduction width based on which a moving region can be reduced, for each side of the initial candidate for the moving region, according to a result of comparison between a pixel value after motion compensation and a true pixel value when the motion compensation is carried out, performs a reduction process for determining a position of a side after reduction based on the maximum reduction width if the maximum reduction width is not 0, and performs the enlargement process on a side where the maximum reduction width is not 0.

(Supplementary Note 25)

The program recording medium recording the moving region detection program as set forth in Supplementary note 23, wherein the moving region decision means calculates a maximum reduction width based on which a moving region can be reduced, for each side of the initial candidate for the moving region, according to a result of comparison between a pixel value after motion compensation and a true pixel value when the motion compensation is carried out, and performs a reduction process for determining a position of a side after reduction.

(Supplementary Note 26)

The program recording medium recording the moving region detection program as set forth in Supplementary note 22, wherein the moving region decision means calculates a maximum reduction width based on which a moving region can be reduced, for each side of the initial candidate for the moving region, according to a result of comparison between a pixel value after motion compensation and a true pixel value when the motion compensation is carried out, performs a reduction process for determining a position of a side after reduction based on the maximum reduction width if the maximum reduction width is not 0, and performs the enlargement process on a side where the maximum reduction width is not 0.

(Supplementary Note 27)

The program recording medium recording the moving region detection program as set forth in Supplementary note 23, wherein the moving region decision means uses, as an evaluation scale, a merit value and a demerit value respectively representing a degree of adaptability as a moving region for use in motion compensation and a degree of non-adaptability as a moving region for use in motion compensation, performs a process, on an entirety of the moving region of the initial candidate, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and decides whether or not to discard the initial candidate based on a result of comparison between the merit value and demerit value finally obtained.

(Supplementary Note 28)

The program recording medium recording the moving region detection program as set forth in Supplementary note 22, wherein the moving region decision means determines whether or not the moving region can be enlarged by a predetermined pixel width, for each side of the moving region, uses, in the determination, a merit value and a demerit value respectively representing a degree of adaptability as a moving region for use in motion compensation and a degree of non-adaptability as a moving region for use in motion compensation, as an evaluation scale, performs a process, on an entirety of the enlarged moving region, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and determines whether or not enlargement is possible based on a result of comparison between the merit value and demerit value finally obtained.

(Supplementary Note 29)

The program recording medium recording the moving region detection program as set forth in Supplementary note 23, wherein the moving region decision means determines whether or not the moving region can be reduced by a predetermined pixel width, for each side of the moving region, uses, in the determination, a merit value and a demerit value respectively representing a degree of adaptability as a moving region for use in motion compensation and a degree of non-adaptability as a moving region for use in motion compensation, as an evaluation scale, performs a process, on an entirety of the reduced moving region, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and determines whether or not reduction is possible based on a result of comparison between the merit value and demerit value finally obtained.

(Supplementary Note 30)

The program recording medium recording the moving region detection program as set forth in Supplementary note 21, further causing the computer to function as motion vector detection means for extracting, from a previous frame and a current frame, an edge point whose positional relationship with another at least one edge point is unique, as a feature point, and extracting a feature point pair having the same unique positional relationship between the previous frame and the current frame, wherein the initial candidate decision means decides, as an initial candidate for a moving region in the previous frame, a rectangle circumscribing feature points existing in the previous frame, from among the feature point pair extracted by the motion vector detection means, and decides, as an initial candidate for a moving region in the current frame, a rectangle circumscribing feature points existing in the current frame, from among the feature point pair extracted by the motion vector detection means.

(Supplementary Note 31)

A video signal coding device comprising:

motion vector detection means for detecting a motion vector by comparing a previous frame with a current frame;

moving region detection means for detecting, as a moving region, an identical or similar image region which exists in both the previous frame and the current frame and whose position on a screen is changed by the motion vector detected by the motion vector detection means;

motion compensation means for copying the moving region detected by the moving region detection means, to a destination indicated by the motion vector on the previous frame;

update region detection means for detecting, as an update region, a region where the previous frame and the current frame which are obtained after motion compensation differ from each other; and region coding means for coding, as an image, the update region detected by the update region detection means, wherein the moving region detection device as set forth in Supplementary note 1 is used as the moving region detection means.

(Supplementary Note 32)

The video signal coding device as set forth in Supplementary note 31, wherein the update region detection means comprises update region detection area setting means for setting, on a frame, an update region detection area for detecting an update region.

The present invention is widely applicable as a server device in a thin client system. Further, a moving region detection device according to the present invention is applicable not only to coding but also to various fields such as detection of a moving object.

The invention claimed is:

1. A moving region detection device comprising:
   an initial candidate decision unit that decides an initial candidate for detecting a moving region which is an identical or similar image region whose position changes between a current frame and a previous frame, the previous frame being a frame preceding the current frame;

a moving region candidate generation unit that generates another at least one candidate for a moving region by changing a size of the moving region of the initial candidate; and a moving region decision unit that decides a moving region for use in motion compensation, from among the initial candidate for the moving region decided by the initial candidate decision unit and the candidate for the moving region generated by the moving region candidate generation unit;

wherein the moving region candidate generation unit generates a moving region candidate by calculating a maximum enlargement width based on which a moving region can be enlarged on each side, for each side of the initial candidate for the moving region, according to a result of comparison between a pixel value obtained by performing motion compensation on the previous frame and a pixel value of the current frame, and by performing an enlargement process for enlarging the initial candidate on each side by a corresponding maximum enlargement width;

wherein the moving region decision unit decides whether or not to discard the initial candidate according to a result of comparison between a pixel value after motion compensation and a true pixel value when the motion compensation is carried out using the moving region of the initial candidate, the true pixel value being a pixel value of the current frame, and decides a moving region candidate subjected to the enlargement process as a moving region when deciding not to discard the initial candidate.

2. The moving region detection device according to claim 1, wherein
the moving region candidate generation unit generates a moving region candidate by calculating a maximum reduction width based on which a moving region can be reduced on each side, for each side of the initial candidate for the moving region, according to a result of comparison between a pixel value after motion compensation and a true pixel value when the motion compensation is carried out, and by performing a reduction process for reducing the initial candidate on each side by a corresponding maximum reduction width, and
the moving region decision unit decides whether or not to discard the initial candidate according to a result of comparison between a pixel value after motion compensation and a true pixel value when the motion compensation is carried out using the moving region of the initial candidate, and decides a moving region candidate subjected to the reduction process as a moving region when deciding to discard the initial candidate.

3. The moving region detection device according to claim 1, wherein
the moving region candidate generation unit generates a moving region candidate by calculating a maximum reduction width based on which a moving region can be reduced on each side, for each side of the initial candidate for the moving region, according to a result of comparison between a pixel value after motion compensation and a true pixel value when the motion compensation is carried out, and by performing a reduction process for reducing the initial candidate on each side by a corresponding maximum reduction width, and
the moving region decision unit decides whether or not to discard the initial candidate according to a result of comparison between a pixel value after motion compensation and a true pixel value when the motion compensation is carried out using the moving region of the initial candidate, and decides a moving region candidate subjected to the reduction process and the enlargement process as a moving region when deciding not to discard the initial candidate.

4. The moving region detection device according to claim 1, wherein the moving region decision unit uses, as an evaluation scale, a merit value and a demerit value respectively representing a degree of adaptability as a moving region for use in motion compensation and a degree of non-adaptability as a moving region for use in motion compensation, performs a process, on an entirety of the moving region of the initial candidate, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and decides whether or not to discard the initial candidate based on a result of comparison between the merit value and demerit value finally obtained.

5. The moving region detection device according to claim 3, wherein
the moving region candidate generation unit determines whether or not the moving region can be reduced by a predetermined pixel width, for each side of the moving region, and reduces the moving region only on a side where it is determined to be able to reduce the moving region,
the moving region candidate generation unit uses, in the determination, a merit value and a demerit value respectively representing a degree of adaptability as a moving region for use in motion compensation and a degree of non-adaptability as a moving region for use in motion compensation, as an evaluation scale,
the moving region candidate generation unit performs a process, on each side by the predetermined pixel width, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and
the moving region candidate generation unit determines whether or not the moving region can be reduced by the predetermined pixel width, for each side of the moving region, based on a result of comparison between the merit value and demerit value finally obtained.

6. A moving region detection device comprising:
an initial candidate decision unit that decides an initial candidate for detecting a moving region which is an identical or similar image region whose position changes between a current frame and a previous frame, the previous frame being a frame preceding the current frame;
a moving region candidate generation unit that generates another at least one candidate for a moving region by changing a size of the moving region of the initial candidate; and a moving region decision unit that decides a moving region for use in motion compensation, from among the initial candidate for the moving region decided by the initial candidate decision unit and the candidate for the moving region generated by the moving region candidate generation unit;

wherein the moving region candidate generation unit generates a moving region candidate by calculating a maximum reduction width based on which a moving region can be reduced on each side, for each side of the initial candidate for the moving region, according to a result of comparison between a pixel value after motion compensation and a true pixel value when the motion compensation is carried out, the true pixel value being a pixel value of the current frame, and by performing a reduction process for reducing the initial candidate on each side by a corresponding maximum reduction width, and further generates a moving region candidate by calculating a maximum enlargement width based on which a moving region can be enlarged on each side, for each side of the region which is obtained by the reduction process and has a maximum reduction width of 0, according to a result of comparison between a pixel value after motion compensation and the true pixel value when the motion compensation is carried out, and by performing an enlargement process for enlarging the initial candidate on each side by a corresponding maximum enlargement width.

7. A moving region detection device comprising:

an initial candidate decision unit that decides an initial candidate for detecting a moving region which is an identical or similar image region whose position changes between a current frame and a previous frame, the previous frame being a frame preceding the current frame;

a moving region candidate generation unit that generates another at least one candidate for a moving region by changing a size of the moving region of the initial candidate; and a moving region decision unit that decides a moving region for use in motion compensation, from among the initial candidate for the moving region decided by the initial candidate decision unit and the candidate for the moving region generated by the moving region candidate generation unit;

wherein the moving region candidate generation unit generates a moving region candidate by calculating a maximum enlargement width based on which a moving region can be enlarged on each side, for each side of the initial candidate for the moving region, according to a result of comparison between a pixel value obtained by performing motion compensation on the previous frame and a pixel value of the current frame, and by performing an enlargement process for enlarging the initial candidate on each side by a corresponding maximum enlargement width; wherein the moving region candidate generation unit determines whether or not the moving region can be enlarged by a predetermined pixel width, for each side of the moving region, and enlarges the moving region only on a side where it is determined to be able to enlarge the moving region, the moving region candidate generation unit uses, in the determination, a merit value and a demerit value respectively representing a degree of adaptability as a moving region for use in motion compensation and a degree of non-adaptability as a moving region for use in motion compensation, as an evaluation scale, the moving region candidate generation unit performs a process, on each side by the predetermined pixel width, for adding the demerit value by a predetermined value upon each detection of a pixel where a difference between a pixel value after motion compensation and a true pixel value is equal to or greater than a predetermined threshold, the true pixel value being a pixel value of the current frame, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and the moving region candidate generation unit determines whether or not the moving region can be enlarged by the predetermined pixel width, for each side of the moving region, based on a result of comparison between the merit value and demerit value finally obtained.

8. A moving region detection device comprising:

a motion vector detection unit that extracts, from a previous frame and a current frame, an edge point whose positional relationship with another at least one edge point is unique, as a feature point, and for extracting a feature point pair having the same unique positional relationship between the previous frame and the current frame;

an initial candidate decision unit that decides an initial candidate for detecting a moving region which is an identical or similar image region whose position changes between a current frame and a previous frame, the previous frame being a frame preceding the current frame;

a moving region candidate generation unit that generates another at least one candidate for a moving region by changing a size of the moving region of the initial candidate; and a moving region decision unit that decides a moving region for use in motion compensation, from among the initial candidate for the moving region decided by the initial candidate decision unit and the candidate for the moving region generated by the moving region candidate generation unit;

wherein the initial candidate decision unit decides, as an initial candidate for a moving region in the previous frame, a rectangle circumscribing feature points existing in the previous frame, from among the feature point pair extracted by the motion vector detection unit, and decides, as an initial candidate for a moving region in the current frame, a rectangle circumscribing feature points existing in the current frame, from among the feature point pair extracted by the motion vector detection unit.

9. A moving region detection method comprising:

deciding an initial candidate for detecting a moving region which is an identical or similar image region whose position changes between a current frame and a previous frame, the previous frame being a frame preceding the current frame;

generating another at least one candidate for a moving region by changing a size of the moving region of the initial candidate; and deciding a moving region for use in motion compensation, from among the initial candidate for the moving region and the candidate for the moving region;

wherein a moving region candidate is generated by calculating a maximum enlargement width based on which a moving region can be enlarged on each side, for each side of the initial candidate for the moving region, according to a result of comparison between a pixel value obtained by performing motion compensation on the previous frame and a pixel value of the current frame, and by performing an enlargement process for enlarging the initial candidate on each side by a corresponding maximum enlargement width;

wherein a moving region candidate subjected to the enlargement process is decided as a moving region when deciding not to discard the initial candidate according to a result of comparison between a pixel value after motion compensation and a true pixel value when the motion compensation is carried out using the moving region of the initial candidate, the true pixel value being a pixel value of the current frame.

10. The moving region detection method according to claim 9, wherein the moving region candidate is generated by calculating a maximum reduction width based on which a moving region can be reduced on each side, for each side of the initial candidate for the moving region, according to a result of comparison between a pixel value after motion compensation and a true pixel value when the motion compensation is carried out, and by performing a reduction process for reducing the initial candidate on each side by a corresponding maximum reduction width, and wherein a moving region candidate subjected to the reduction process is decided as a moving region when deciding to discard the initial candidate according to a result of comparison between a pixel value after motion compensation and a true pixel value when the motion compensation is carried out using the moving region of the initial candidate.

11. The moving region detection method according to claim 9, wherein a moving region candidate is generated by calculating a maximum reduction width based on which a moving region can be reduced on each side, for each side of the initial candidate for the moving region, according to a result of comparison between a pixel value after motion compensation and a true pixel value when the motion compensation is carried out, and by performing a reduction process for reducing the initial candidate on each side by a corresponding maximum reduction width, and a moving region candidate subjected to the reduction process and the enlargement process is decided as a moving region when deciding not to discard the initial candidate according to a result of comparison between a pixel value after motion compensation and a true pixel value when the motion compensation is carried out using the moving region of the initial candidate.

12. The moving region detection method according to claim 9, wherein the initial candidate is decided whether or not to discard based on a result of comparison between a merit value and a demerit value respectively representing a degree of adaptability as a moving region for use in motion compensation and a degree of non-adaptability as a moving region for use in motion compensation finally obtained by using, as an evaluation scale, the merit value and the demerit value and performing a process, on an entirety of the moving region of the initial candidate, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels.

13. The moving region detection method according to claim 11, wherein a moving region candidate is generated by determining whether or not the moving region can be reduced by a predetermined pixel width, for each side of the moving region, and reduces the moving region only on a side where it is determined to be able to reduce the moving region, using, in the determination, a merit value and a demerit value respectively representing a degree of adaptability as a moving region for use in motion compensation and a degree of non-adaptability as a moving region for use in motion compensation, as an evaluation scale, performing a process, on each side by the predetermined pixel width, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and determining whether or not the moving region can be reduced by the predetermined pixel width, for each side of the moving region, based on a result of comparison between the merit value and demerit value finally obtained.

14. A moving region detection method comprising:

deciding an initial candidate for detecting a moving region which is an identical or similar image region whose position changes between a current frame and a previous frame, the previous frame being a frame preceding the current frame;

generating another at least one candidate for a moving region by changing a size of the moving region of the initial candidate; and deciding a moving region for use in motion compensation, from among the initial candidate for the moving region determined and the candidate for the moving region generated;

wherein a moving region candidate is generated by calculating a maximum reduction width based on which a moving region can be reduced on each side, for each side of the initial candidate for the moving region, according to a result of comparison between a pixel value after motion compensation and a true pixel value when the motion compensation is carried out, the true pixel value being a pixel value of the current frame, and by performing a reduction process for reducing the initial candidate on each side by a corresponding maximum reduction width, and further generates a moving region candidate by calculating a maximum enlargement width based on which a moving region can be enlarged on each side, for each side of the region which is obtained by the reduction process and has a maximum reduction width of 0, according to a result of comparison between a pixel value after motion compensation and the true pixel value when the motion compensation is carried out, and by performing an enlargement process for enlarging the initial candidate on each side by a corresponding maximum enlargement width.

15. A moving region detection method comprising:

deciding an initial candidate for detecting a moving region which is an identical or similar image region whose position changes between a current frame and a previous frame, the previous frame being a frame preceding the current frame;

generating another at least one candidate for a moving region by changing a size of the moving region of the initial candidate; and deciding a moving region for use in motion compensation, from among the initial candidate for the moving region determined and the candidate for the moving region generated;

wherein a moving region candidate is generated by calculating a maximum enlargement width based on which a moving region can be enlarged on each side, for each side of the initial candidate for the moving region, according to a result of comparison between a pixel value obtained by performing motion compensation on the previous frame and a pixel value of the current frame, and by performing an enlargement process for enlarging the initial candidate on each side by a corresponding maximum enlargement width;

wherein a moving region candidate is generated by determining whether or not the moving region can be enlarged by a predetermined pixel width, for each side of the moving region, and enlarges the moving region only on a side where it is determined to be able to enlarge the moving region, using, in the determination, a merit value and a demerit value respectively representing a degree of adaptability as a moving region for use in motion compensation and a degree of non-adaptability as a moving region for use in motion compensation, as an evaluation scale, performing a process, on each side by the predetermined pixel width, for adding the demerit value by a predetermined value upon each detection of a pixel where a difference between a pixel value after motion compensation and a true pixel value is equal to or greater than a predetermined threshold, the true pixel value being a pixel value of the current frame, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and determining whether or not the moving region can be enlarged by the predetermined pixel width, for each side of the moving region, based on a result of comparison between the merit value and demerit value finally obtained.

16. A moving region detection method comprising:

extracting, from a previous frame and a current frame, an edge point whose positional relationship with another at least one edge point is unique, as a feature point, and extracting a feature point pair having the same unique positional relationship between the previous frame and the current frame;

deciding an initial candidate for detecting a moving region which is an identical or similar image region whose position changes between a current frame and a previous frame, the previous frame being a frame preceding the current frame;

generating another at least one candidate for a moving region by changing a size of the moving region of the initial candidate; and deciding a moving region for use in motion compensation, from among the initial candidate for the moving region determined and the candidate for the moving region generated;

wherein a rectangle circumscribing feature points existing in the previous frame, from among the feature point pair extracted is decided as an initial candidate for a moving region in the previous frame, and a rectangle circumscribing feature points existing in the current frame from among the feature point pair extracted is decided as an initial candidate for a moving region in the current frame.

17. A non-transitory computer readable medium recording a moving region detection program for causing a computer to execute:

initial candidate decision process for deciding an initial candidate for detecting a moving region which is an identical or similar image region whose position changes between a current frame and a previous frame, the previous frame being a frame preceding the current frame;

moving region candidate generation process for generating another at least one candidate for a moving region by changing a size of the moving region of the initial candidate; and moving region decision process for deciding a moving region for use in motion compensation, from among the initial candidate for the moving region decided by the initial candidate decision process and the candidate for the moving region generated by the moving region candidate generation process;

wherein the moving region candidate generation process generates a moving region candidate by calculating a maximum enlargement width based on which a moving region can be enlarged on each side, for each side of the initial candidate for the moving region, according to a result of comparison between a pixel value obtained by performing motion compensation on the previous frame and a pixel value of the current frame, and by performing an enlargement process for enlarging the initial candidate on each side by a corresponding maximum enlargement width;

wherein the moving region decision process decides whether or not to discard the initial candidate according to a result of comparison between a pixel value after motion compensation and a true pixel value when the motion compensation is carried out using the moving region of the initial candidate, the true pixel value being a pixel value of the current frame, and decides a moving region candidate subjected to the enlargement process as a moving region when deciding not to discard the initial candidate.

18. The non-transitory computer readable medium according to claim 17, wherein the moving region candidate generation process generates a moving region candidate by calculating a maximum reduction width based on which a moving region can be reduced on each side, for each side of the initial candidate for the moving region, according to a result of comparison between a pixel value after motion compensation and a true pixel value when the motion compensation is carried out, and by performing a reduction process for reducing the initial candidate on each side by a corresponding maximum reduction width, and the moving region decision process decides whether or not to discard the initial candidate according to a result of comparison between a pixel value after motion compensation and a true pixel value when the motion compensation is carried out using the moving region of the initial candidate, and decides a moving region candidate subjected to the reduction process as a moving region when deciding to discard the initial candidate.

19. The non-transitory computer readable medium according to claim 17, wherein
the moving region candidate generation process generates a moving region candidate by calculating a maximum reduction width based on which a moving region can be reduced on each side, for each side of the initial candidate for the moving region, according to a result of comparison between a pixel value after motion compensation and a true pixel value when the motion compensation is carried out, and by performing a reduction process for reducing the initial candidate on each side by a corresponding maximum reduction width, and
the moving region decision process decides whether or not to discard the initial candidate according to a result of comparison between a pixel value after motion compensation and a true pixel value when the motion compensation is carried out using the moving region of the initial candidate, and decides a moving region candidate subjected to the reduction process and the enlargement process as a moving region when deciding not to discard the initial candidate.

20. A non-transitory computer readable medium recording a moving region detection program for causing a computer to execute:
initial candidate decision process for deciding an initial candidate for detecting a moving region which is an identical or similar image region whose position changes between a current frame and a previous frame, the previous frame being a frame preceding the current frame;
moving region candidate generation process for generating another at least one candidate for a moving region by changing a size of the moving region of the initial candidate; and
moving region decision process for deciding a moving region for use in motion compensation, from among the initial candidate for the moving region decided by the initial candidate decision process and the candidate for the moving region generated by the moving region candidate generation process;
wherein the moving region candidate generation process generates a moving region candidate by calculating a maximum reduction width based on which a moving region can be reduced on each side, for each side of the initial candidate for the moving region, according to a result of comparison between a pixel value after motion compensation and a true pixel value when the motion compensation is carried out, the true pixel value being a pixel value of the current frame, and by performing a reduction process for reducing the initial candidate on each side by a corresponding maximum reduction width, and further generates a moving region candidate by calculating a maximum enlargement width based on which a moving region can be enlarged on each side, for each side of the region which is obtained by the reduction process and has a maximum reduction width of 0, according to a result of comparison between a pixel value after motion compensation and the true pixel value when the motion compensation is carried out, and by performing an enlargement process for enlarging the initial candidate on each side by a corresponding maximum enlargement width.

21. The non-transitory computer readable medium according to claim 17, wherein the moving region decision process uses, as an evaluation scale, a merit value and a demerit value respectively representing a degree of adaptability as a moving region for use in motion compensation and a degree of non-adaptability as a moving region for use in motion compensation, performs a process, on an entirety of the moving region of the initial candidate, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and decides whether or not to discard the initial candidate based on a result of comparison between the merit value and demerit value finally obtained.

22. A non-transitory computer readable medium recording a moving region detection program for causing a computer to execute:
initial candidate decision process for deciding an initial candidate for detecting a moving region which is an identical or similar image region whose position changes between a current frame and a previous frame, the previous frame being a frame preceding the current frame;
moving region candidate generation process for generating another at least one candidate for a moving region by changing a size of the moving region of the initial candidate; and
moving region decision process for deciding a moving region for use in motion compensation, from among the initial candidate for the moving region decided by the initial candidate decision process and the candidate for the moving region generated by the moving region candidate generation process;
wherein the moving region candidate generation process generates a moving region candidate by calculating a maximum enlargement width based on which a moving region can be enlarged on each side, for each side of the initial candidate for the moving region, according to a result of comparison between a pixel value obtained by performing motion compensation on the previous frame and a pixel value of the current frame, and by performing an enlargement process for enlarging the initial candidate on each side by a corresponding maximum enlargement width;
wherein
the moving region candidate generation process determines whether or not the moving region can be enlarged by a predetermined pixel width, for each side of the moving region, and enlarges the moving region only on a side where it is determined to be able to enlarge the moving region,
the moving region candidate generation process uses, in the determination, a merit value and a demerit value respectively representing a degree of adaptability as a moving region for use in motion compensation and a degree of non-adaptability as a moving region for use in motion compensation, as an evaluation scale,
the moving region candidate generation process performs a process, on each side by the predetermined pixel width, for adding the demerit value by a predetermined value upon each detection of a pixel where a difference between a pixel value after motion compensation and a true pixel value is equal to or greater than a predetermined threshold, the true pixel value being a pixel value of the current frame, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and the moving region candidate generation process determines whether or not the moving region can be enlarged by the predetermined pixel width, for each side of the moving region, based on a result of comparison between the merit value and demerit value finally obtained.

23. The non-transitory computer readable medium according to claim 19, wherein the moving region candidate generation process determines whether or not the moving region can be reduced by a predetermined pixel width, for each side of the moving region, and reduces the moving region only on a side where it is determined to be able to reduce the moving region, the moving region candidate generation process uses, in the determination, a merit value and a demerit value respectively representing a degree of adaptability as a moving region for use in motion compensation and a degree of non-adaptability as a moving region for use in motion compensation, as an evaluation scale, the moving region candidate generation process performs a process, on each side by the predetermined pixel width, for adding the demerit value by a predetermined value upon each detection of a pixel where a difference between a pixel value after motion compensation and a true pixel value is equal to or greater than a predetermined threshold, and for adding the merit value by a predetermined value upon each detection of a pixel where the difference between the pixel value after motion compensation and the true pixel value is smaller than the predetermined threshold and which has a luminance gradient equal to or greater than a threshold between adjacent pixels, and the moving region candidate generation process determines whether or not the moving region can be reduced by the predetermined pixel width, for each side of the moving region, based on a result of comparison between the merit value and demerit value finally obtained.

24. A non-transitory computer readable medium recording a moving region detection program for causing a computer to execute:

motion vector detection process for extracting, from a previous frame and a current frame, an edge point whose positional relationship with another at least one edge point is unique, as a feature point, and for extracting a feature point pair having the same unique positional relationship between the previous frame and the current frame;

initial candidate decision process for deciding an initial candidate for detecting a moving region which is an identical or similar image region whose position changes between a current frame and a previous frame, the previous frame being a frame preceding the current frame;

moving region candidate generation process for generating another at least one candidate for a moving region by changing a size of the moving region of the initial candidate; and moving region decision process for deciding a moving region for use in motion compensation, from among the initial candidate for the moving region decided by the initial candidate decision process and the candidate for the moving region generated by the moving region candidate generation process;

wherein the initial candidate decision process decides, as an initial candidate for a moving region in the previous frame, a rectangle circumscribing feature points existing in the previous frame, from among the feature point pair extracted by the motion vector detection process, and decides, as an initial candidate for a moving region in the current frame, a rectangle circumscribing feature points existing in the current frame, from among the feature point pair extracted by the motion vector detection process.

* * * * *